United States Patent
Rolfe et al.

(10) Patent No.: US 9,930,188 B2
(45) Date of Patent: *Mar. 27, 2018

(54) SYSTEM AND METHOD FOR DYNAMICALLY ALLOCATING QUOTA FOR SHARED BALANCES IN DISTRIBUTED TELECOMMUNICATIONS NETWORKS

(71) Applicant: OPENET TELECOM LTD., Dublin (IE)

(72) Inventors: David Rolfe, Dublin (IE); Tony Gillick, Dublin (IE); Roland Holland, Wicklow (IE); Barry Mulvin, Dublin (IE)

(73) Assignee: OPENET TELECOM LTD., Dublin (IE)

( * ) Notice: Subject to any disclaimer, the term of this patent is extended or adjusted under 35 U.S.C. 154(b) by 54 days.

This patent is subject to a terminal disclaimer.

(21) Appl. No.: 14/560,237

(22) Filed: Dec. 4, 2014

(65) Prior Publication Data

US 2015/0105045 A1    Apr. 16, 2015

Related U.S. Application Data

(63) Continuation-in-part of application No. 14/311,301, filed on Jun. 22, 2014.

(Continued)

(51) Int. Cl.
*H04M 15/00* (2006.01)
*H04L 12/14* (2006.01)
*H04W 28/16* (2009.01)

(52) U.S. Cl.
CPC .... *H04M 15/7652* (2013.01); *H04L 12/1457* (2013.01); *H04L 12/1471* (2013.01);

(Continued)

(58) Field of Classification Search
CPC ....... H04L 12/14; H04M 15/58; H04M 15/64; H04M 15/66; H04M 15/765;
(Continued)

(56) References Cited

U.S. PATENT DOCUMENTS 8,452,872 B2 * 5/2013 Castro Castro ......... H04L 12/14
709/224
9,131,408 B1 * 9/2015 Falsafi .................. H04W 48/18
(Continued)

OTHER PUBLICATIONS

Extended European Search Report for European Application No. 14173426 dated Sep. 16, 2014.

*Primary Examiner* — Tammy Paige Goddard
*Assistant Examiner* — Frantz Bataille
(74) *Attorney, Agent, or Firm* — The Marbury Law Group, PLLC

(57) ABSTRACT

Systems and computing devices may be configured to intelligently and dynamically allocate quotas for the access and use of a telecommunications network by consumers that use a shared account balance. A server computing device may be configured to intelligently allocate quota by determining an allocation time interval for allocating quota from a shared account balance, receiving a quota request message from a metering and gating component that includes information requesting allocation of a first quota to a first consumer associated with a shared account balance, determining a validity period for the first quota based on the determined allocation time interval, and allocating the first quota to the first consumer from the updated shared account balance so as to eliminate or reduce conflicts and discrepancies between different instances of the shared account balance.

22 Claims, 34 Drawing Sheets

Related U.S. Application Data

(60) Provisional application No. 61/837,982, filed on Jun. 21, 2013.

(52) U.S. Cl.
CPC ......... *H04M 15/765* (2013.01); *H04M 15/78* (2013.01); *H04M 15/785* (2013.01); *H04M 15/866* (2013.01); *H04W 28/16* (2013.01); *H04M 15/58* (2013.01); *H04M 15/64* (2013.01); *H04M 15/66* (2013.01); *H04M 15/775* (2013.01)

(58) Field of Classification Search
CPC ........... H04M 15/7652; H04M 15/775; H04M 15/78; H04M 15/785; H04M 15/866; H04W 28/16
See application file for complete search history.

(56) References Cited

U.S. PATENT DOCUMENTS

| | | | |
|---|---|---|---|
| 2003/0157925 A1 | 8/2003 | Sorber et al. | |
| 2004/0153407 A1 | 8/2004 | Clubb et al. | |
| 2008/0285475 A1* | 11/2008 | Menditto | G06Q 30/0283 370/252 |
| 2009/0088128 A1* | 4/2009 | Mumford | G06Q 10/103 455/405 |
| 2014/0051379 A1* | 2/2014 | Ganesh | H04W 4/22 455/404.1 |

* cited by examiner

SYSTEM AND METHOD FOR DYNAMICALLY ALLOCATING QUOTA FOR SHARED BALANCES IN DISTRIBUTED TELECOMMUNICATIONS NETWORKS

RELATED APPLICATIONS

This application is a continuation in part of U.S. patent application Ser. No. 14/311,301 entitled "System and Method for Dynamically Allocating Quota for Shared Balances in Distributed Telecommunications Networks" filed on Jun. 22, 2014, which claims the benefit of priority to U.S. Provisional Application No. 61/837,982 entitled "System and Method for Dynamically Allocating Quota for Shared Balances in Distributed Telecommunications Networks" filed Jun. 21, 2013, the entire contents of both of which are incorporated herein by reference for all purposes.

BACKGROUND

Wireless and cellular communication technologies have seen dramatic improvements over the past several years. Cellular service providers now offer users a wide array of services, higher usage limits, and attractive subscription plans. Wireless dongles and embedded wireless modem cards allow users to use tablet computers, netbooks and laptops to access wireless Internet protocol (IP) and data services through the cellular networks. Internet-enabled smart phones, tablets and gaming consoles have become essential personal accessories, connecting users to friends, work, leisure activities and entertainment. Users now have more choices and expect to have access to content, data and communications at any time, in any place.

As more users utilize these services, telecommunication system operator networks must expand to meet the increase in user demand, support the array of new services and provide fast, reliable communications. This expansion has greatly increased the complexity of wireless and cellular networks, and the management of quotas, shared balances, and signaling traffic is becoming an ever more challenging task for telecommunication service providers, network operators and network engineers.

SUMMARY

The various embodiments include methods of dynamically allocating quotas by a server computing device deployed in a telecommunications network, which may include receiving in a processor of the server computing device a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared account balance.

In an embodiment, computing the total reclaimable quota size value may include identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value. In a further embodiment, reclaiming the portion of the currently active allocated quota may include determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, traversing the sorted eligible quota list sequentially may include determining whether the first quota may be allocated to the first consumer from the shared account balance without exceeding the balance threshold each time the shared account balance is incremented. In a further embodiment, reducing the allocated quota size of the selected element may include sending a communication message to a metering and gating component associated with selected element to cause that metering and gating component to return unused allocated quota that is in excess of the minimum quota allocation size. In a further embodiment, reducing the allocated quota size of the selected element may include sending a first communication message to a metering and gating component associated with selected element to cause that metering and gating component to return all its unused allocated quota, sending a second communication message to the metering and gating component associated with selected element to reallocate quota. In a further embodiment, reducing the allocated quota size of the selected element may include reducing the allocated quota size by half of its unused allocated quota that is in excess of the minimum quota allocation size.

In a further embodiment, sorting the eligible quota list based on the determined priority values may include sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements. In a further embodiment, determining whether the first quota may be allocated to the first consumer from the shared account balance without exceeding the balance threshold may include determining whether the shared account balance is greater than or equal to a quota allocation size value included in the received quota request message.

In a further embodiment, the method may include sending a communication message to the metering and gating component indicating that quota will not be allocated in response to determining that the total reclaimable quota size value is not greater than or equal to the minimum quota allocation size. In a further embodiment, allocating the first quota to the first consumer from the updated shared balance account may include using linear interpolation to compute a balance change rate value for the shared account balance, computing a threshold breach time based on the balance change rate value, determining whether a current time is less than a tolerance time before the threshold breach time, determining whether the server computing device is an authoritative component in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

Further embodiments include a server computing device having a processor that is configured with processor-executable instructions to perform operations that include receiving a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared balance account.

In an embodiment, the processor may be configured with processor-executable instructions to perform operations such that computing the total reclaimable quota size value includes identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value.

In a further embodiment, the processor may be configured with processor-executable instructions to perform operations such that reclaiming the portion of the currently active allocated quota includes determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, the processor may be configured with processor-executable instructions to perform operations such that traversing the sorted eligible quota list sequentially further includes determining whether the first quota may be allocated to the first consumer from the shared account balance without exceeding the balance threshold each time the shared account balance is incremented. In a further embodiment, the processor may be configured with processor-executable instructions to perform operations such that reducing the allocated quota size of the selected element includes sending a communication message to a metering and gating component associated with selected element to cause that metering and gating component to return unused allocated quota that is in excess of the minimum quota allocation size.

In a further embodiment, the processor may be configured with processor-executable instructions to perform operations such that reducing the allocated quota size of the selected element includes sending a first communication message to a metering and gating component associated with selected element to cause that metering and gating component to return all its unused allocated quota, sending a second communication message to the metering and gating component associated with selected element to reallocate quota In a further embodiment, the processor may be configured with processor-executable instructions to perform operations such that reducing the allocated quota size of the selected element includes reducing the allocated quota size by half of its unused allocated quota that is in excess of the minimum quota allocation size.

In a further embodiment, the processor may be configured with processor-executable instructions to perform operations such that sorting the eligible quota list based on the determined priority values includes sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements.

In a further embodiment, the processor may be configured with processor-executable instructions to perform operations such that determining whether the first quota may be allocated to the first consumer from the shared account balance without exceeding the balance threshold includes determining whether the shared account balance is greater than or equal to a quota allocation size value included in the received quota request message. In a further embodiment, the processor may be configured with processor-executable instructions to perform operations further including sending a communication message to the metering and gating component indicating that quota will not be allocated in response to determining that the total reclaimable quota size value is not greater than or equal to the minimum quota allocation size.

In a further embodiment, the processor may be configured with processor-executable instructions to perform operations such that allocating the first quota to the first consumer from the updated shared balance account includes using linear interpolation to compute a balance change rate value for the shared account balance, computing a threshold breach time based on the balance change rate value, determining whether a current time is less than a tolerance time before the threshold breach time, determining whether the server computing device is the authoritative component that has exclusive access to the shared account balance in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

Further embodiments include a non-transitory computer readable storage medium having stored thereon processor-executable software instructions configured to cause a processor of a server computing device to perform operations that include receiving a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared balance account.

In an embodiment, the stored processor-executable software instructions may be configured to cause a processor to perform operations such that computing the total reclaimable quota size value includes identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value.

In a further embodiment, the stored processor-executable software instructions may be configured to cause a processor to perform operations such that reclaiming the portion of the currently active allocated quota includes determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, the stored processor-executable software instructions may be configured to cause a processor to perform operations such that traversing the sorted eligible quota list sequentially further includes determining whether the first quota may be allocated to the first consumer from the shared account balance without exceeding the balance threshold each time the shared account balance is incremented. In a further embodiment, the stored processor-executable software instructions may be configured to cause a processor to perform operations such that reducing the allocated quota size of the selected element includes sending a communication message to a metering and gating component associated with selected element to cause that metering and gating component to return unused allocated quota that is in excess of the minimum quota allocation size.

In a further embodiment, the stored processor-executable software instructions may be configured to cause a processor to perform operations such that reducing the allocated quota size of the selected element includes sending a first communication message to a metering and gating component associated with selected element to cause that metering and gating component to return all its unused allocated quota, sending a second communication message to the metering and gating component associated with selected element to reallocate quota In a further embodiment, the stored processor-executable software instructions may be configured to cause a processor to perform operations such that reducing the allocated quota size of the selected element includes reducing the allocated quota size by half of its unused allocated quota that is in excess of the minimum quota allocation size.

In a further embodiment, the stored processor-executable software instructions may be configured to cause a processor to perform operations such that sorting the eligible quota list based on the determined priority values includes sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements. In a further embodiment, the stored processor-executable software instructions may be configured to cause a processor to perform operations such that determining whether the first quota may be allocated to the first consumer from the shared account balance without exceeding the balance threshold includes determining whether the shared account balance is greater than or equal to a quota allocation size value included in the received quota request message.

In a further embodiment, the stored processor-executable software instructions may be configured to cause a processor to perform operations further including sending a communication message to the metering and gating component indicating that quota will not be allocated in response to determining that the total reclaimable quota size value is not greater than or equal to the minimum quota allocation size. In a further embodiment, the stored processor-executable software instructions may be configured to cause a processor to perform operations such that allocating the first quota to the first consumer from the updated shared balance account includes using linear interpolation to compute a balance change rate value for the shared account balance, computing a threshold breach time based on the balance change rate value, determining whether a current time is less than a tolerance time before the threshold breach time, determining whether the server computing device is the authoritative component that has exclusive access to the shared account balance in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

The various aspects may also include methods of allocating quotas by a server computing device deployed in a telecommunications network including determining in a processor of the server computing device an allocation time interval for allocating quota from a shared account balance, receiving in the processor a quota request message from a metering and gating component, the quota request message including information requesting allocation of a first quota to a first consumer associated with the shared account balance, determining a validity period for the first quota based on the determined allocation time interval, and allocating the first quota to the first consumer from the updated shared account balance.

In an aspect, determining the validity period for the first quota based on the determined allocation time interval may include setting an expiration time value of the quota allocation so that the quota will expire within the allocation time interval. In a further aspect, determining the allocation time interval for allocating the quota from the shared account balance may include identifying one or more balance management components that use the shared account balance, determining a longest propagation latency time for communicating message between the identified balance management components, determining a window time interval in which the identified balance management components may allocate the quota, and setting the allocation time interval based on the number of identified balance management components, the longest propagation latency time, and the window time interval. In a further aspect, determining the validity period for the first quota based on the determined allocation time interval may include setting an expiration time value of the quota allocation so that the quota will expire with sufficient time to allow a notification message to propagate to the identified balance management components.

In a further aspect, allocating the first quota to the first consumer from the updated shared account balance may include incrementing a total allocations value of an authoritative local record stored in memory, generating a change notification message that includes values of the authoritative local record and values of at least one non-authoritative local record, and sending the change notification message to one or more balance management components that use the shared account balance. In a further aspect, the method may include determining whether the first quota may be allocated to the first consumer from the shared account balance without exceeding a threshold, in which operations of determining the validity period for the first quota based on the determined allocation time interval and allocating the first quota to the first consumer from the updated shared account balance are performed in response to determining that the first quota may be allocated to the first consumer from the shared account balance without exceeding the threshold.

In a further aspect, the method may include computing a total reclaimable quota size value and determining whether the total reclaimable quota size value is greater than or equal to a minimum quota allocation size in response to determining that the first quota may not be allocated to the first consumer from the shared account balance without exceeding the threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared account balance. In a further aspect, reclaiming the portion of the currently active allocated quota may include determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element by a quota reduction amount, and increment the shared account balance by the quota reduction amount.

Further aspects include a server computing device having one or more processors, one or more of which may be configured with processor-executable instructions to perform operations including determining an allocation time interval for allocating quota from a shared account balance, receiving a quota request message from a metering and gating component, the quota request message including information requesting allocation of a first quota to a first consumer associated with the shared account balance, determining a validity period for the first quota based on the determined allocation time interval, and allocating the first quota to the first consumer from the updated shared account balance.

In an aspect, the processor may be configured with processor-executable instructions to perform operations such that determining the validity period for the first quota based on the determined allocation time interval includes setting an expiration time value of the quota allocation so that the quota will expire within the allocation time interval. In a further aspect, the processor may be configured with processor-executable instructions to perform operations such that determining the allocation time interval for allocating the quota from the shared account balance includes identifying one or more balance management components that use the shared account balance, determining a longest propagation latency time for communicating message between the identified balance management components, determining a window time interval in which the identified balance management components may allocate the quota, and setting the allocation time interval based on the number of identified balance management components, the longest propagation latency time, and the window time interval.

In a further aspect, the processor may be configured with processor-executable instructions to perform operations such that determining the validity period for the first quota based on the determined allocation time interval includes setting an expiration time value of the quota allocation so that the quota will expire with sufficient time to allow a notification message to propagate to the identified balance management components. In a further aspect, the processor may be configured with processor-executable instructions to perform operations such that allocating the first quota to the first consumer from the updated shared account balance includes incrementing a total allocations value of an authoritative local record stored in memory, generating a change notification message that includes values of the authoritative local record and values of at least one non-authoritative local record, and sending the change notification message to one or more balance management components that use the shared account balance.

In a further aspect, the processor may be configured with processor-executable instructions to perform operations further including determining whether the first quota may be allocated to the first consumer from the shared account balance without exceeding a threshold. In a further aspect, the processor may be configured with processor-executable instructions to perform operations such that determining the validity period for the first quota based on the determined allocation time interval and allocating the first quota to the first consumer from the updated shared account balance are performed in response to determining that the first quota may be allocated to the first consumer from the shared account balance without exceeding the threshold. In a further aspect, the processor may be configured with processor-executable instructions to perform operations further including computing a total reclaimable quota size value and determining whether the total reclaimable quota size value is greater than or equal to a minimum quota allocation size in response to determining that the first quota may not be allocated to the first consumer from the shared account balance without exceeding the threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared account balance. In a further aspect, the processor may be configured with processor-executable instructions to perform operations such that reclaiming the portion of the currently active allocated quota includes determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element by a quota reduction amount, and increment the shared account balance by the quota reduction amount.

Further aspects include non-transitory computer readable storage medium having stored thereon processor-executable software instructions configured to cause a processor to perform operations for allocating quotas by a server computing device deployed in a telecommunications network, the operations including determining an allocation time interval for allocating quota from a shared account balance, receiving in the processor a quota request message from a metering and gating component, the quota request message including information requesting allocation of a first quota to a first consumer associated with the shared account balance, determining a validity period for the first quota based on the determined allocation time interval, and allocating the first quota to the first consumer from the updated shared account balance. In an aspect determining the validity period for the first quota based on the determined allocation time interval includes setting an expiration time value of the quota allocation so that the quota will expire within the allocation time interval. In an aspect, the stored processor-executable software instructions may be configured to cause a processor to perform operations such that determining the validity period for the first quota based on the determined allocation time interval includes setting an expiration time value of the quota allocation so that the quota will expire within the allocation time interval.

In a further aspect, the stored processor-executable software instructions may be configured to cause a processor to perform operations such that determining the allocation time interval for allocating the quota from the shared account balance includes identifying one or more balance management components that use the shared account balance, determining a longest propagation latency time for communicating message between the identified balance management components, determining a window time interval in which the identified balance management components may allocate the quota, and setting the allocation time interval based on the number of identified balance management components, the longest propagation latency time, and the window time interval. In a further aspect, the stored processor-executable software instructions may be configured to cause a processor to perform operations such that determining the validity period for the first quota based on the determined allocation time interval includes setting an expiration time value of the quota allocation so that the quota will expire with sufficient time to allow a notification message to propagate to the identified balance management components.

Further aspects may include a server computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DESCRIPTION

Figure 1:
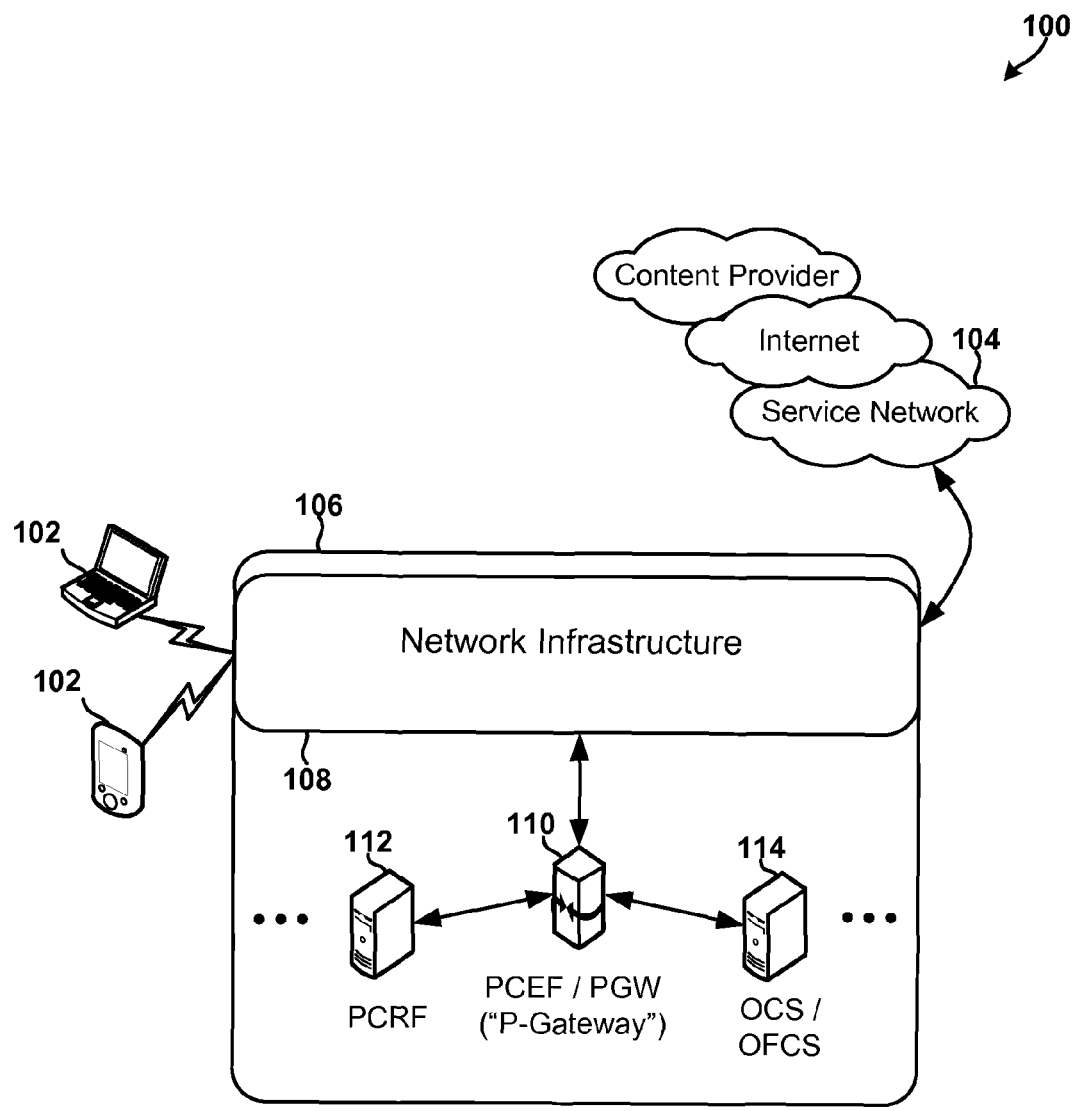
FIGS. 1 and 2 are system block diagrams illustrating telecommunication systems that are suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

The terms "user," "subscriber," "consumer," and "customer" may be used interchangeably and refer to the end consumer of services provided by a telecommunications network operator.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden).

To focus the discussion on the relevant features and functionalities, the various embodiments may be described with reference to specific architectures and components of a 3GPP mobile network. However, all references to terminology and/or technical details related to an individual standard or technology are for illustrative purposes only, and are not intended to limit the scope of the claims to a particular communication system, technology, architecture, or component unless specifically recited in the claim language.

The various embodiments include network components (e.g., server computing devices, etc.) configured to provide a telecommunication network with improved quota allocation and multi-site balance management solutions, and to overcome many of the challenges faced by mobile network operators who deploy policy and charging control systems or other similar systems for real-time service and subscriber controls.

A telecommunications network may include a metering and gating component that is responsible for enforcing policy and charging rules to control the bandwidth, the quality of service (QoS), and other characteristics of the services provided to end users based on their subscription plans and available balances. The metering and gating component may also meter the usage of services and resources by the end users, and generate detailed charging records (e.g., Charge Detail Records or "CDRs") that identify the services and resources consumed by the end users. As part of these operations, the metering and gating component may communicate with a balance management component to identify the policies that are to be enforced, to ensure proper billing, and/or to prevent revenue leakage.

For example, the metering and gating component may be configured to determine the services requested by an end user (e.g., subscriber), and communicate with the balance management component to determine whether the end user has sufficient funds, credits, access units, and/or service unit allowances to receive the requested services. The metering and gating component may then control the characteristics of services provided to that end user based on the determined availability of funds, credits, access units, or service units allowance. That is, the metering and gating component may grant or deny the user access to services, throttle the user's bandwidth, send the user notification messages, and/or perform other similar operations based on an account balance or the availability of funds, credits, access units, or service units allowance in that user's balance account.

Due to the speed, latency, responsiveness, and availability requirements placed on these networks, it is often difficult to ensure proper billing while providing users with adequate levels of service. For example, multiple independent components (e.g., multiple control systems, user equipment devices, software applications, services, etc.) may read and write information to single distributed balance account (i.e., may update a shared account balance), which may require the use of database locks and other complex controls to avoid race conditions, ensure the integrity of the data, and accurately bill the end users for the use of services. In addition, accessing or updating a user's balance information frequently or in real-time may require communicating large volumes of signaling information across the network, which may increase network traffic and data access times beyond that which is acceptable by the end users, client applications, or telecommunications operators.

To ensure proper billing and provide users with adequate levels of service, the network components may be configured to provide services based on quotas. A quota may be any information unit or structure that includes an allocated quota size value that identifies a pre-allocated amount of funds, credits, access units, or service unit allowances. The metering and gating component may request and receive a quota from the balance management component, and provide the end users with services that are commensurate with the funds, credits, access units, or service unit allowances identified in the quota. In an embodiment, the metering and gating component may request and receive the quota (or information suitable for generating a quota) via Credit-Control-Request (CCR) and Credit-Control-Answer (CCA) messages, respectively. The CCR and CCA messages may be Diameter protocol messages and/or specified as part of the Diameter Credit Control Application (DCCA).

As an example, the metering and gating component may request a quota as part of its service initiation processes by generating and sending a quota allocation request message (e.g., a CCR message, etc.) to the balance management component. In response, the balance management component may determine whether the user's remaining balance is greater than a default allocation unit or an allocation unit that is specified in the received quota allocation request message. If the available balance is greater than the allocation unit, the balance management component may allocate the quota by decrementing the user's available balance (or by reserving part of the available balance so that it is not available for future allocation), generating a quota allocation response message that includes an allocated quota size (e.g., amount of pre-allocated credits, access units, service unit allowances, etc.) and a time period during which the allocated quota remains valid, and sending a quota allocation response message to the metering and gating component. The metering and gating component may receive the quota allocation response message, begin providing the end user with access to the requested services, monitor or meter the usage or consumption the services by the end user, and decrement the allocated quota size (e.g., the pre-allocated funds, credits, access units) as the services are used or consumed by the end user.

When the allocated quota has been consumed, the metering and gating component may request an additional quota from the balance management component via an update quota request message (or "quota allocation update message"). The metering and gating component may also generate and send an update quota request message to the balance management component in response to determining that the quota's validity period has expired or that the services have been terminated. Thus, in addition to a request for the allocation of additional quota, the update quota request message may include information identifying the amount of the previously allocated quota that was consumed and/or that remains unused. The balance management component may use this information to allocate additional quotas and/or to return the unused funds, credits, access units, or service units allowance to the user's balance account. In an embodiment, the balance management component may be configured to request that the metering and gating component return unused portions of the allocated quota at any time, and subsequently send a new quota allocation to the metering and gating component.

As mentioned above, the metering and gating component may request a specific quota size (e.g., amount of funds, credits, access units, or service units allowance) by specifying an allocation unit in the quota allocation request message, or the balance management component may determine the quota size based on default allocation unit. In both cases, the quota size is determined statically based upon business criteria. Yet, the selection of the quota size is an important consideration since it may have a significant impact on the performance of the telecommunication system. For example, if the quota size is too small, the metering and gating component will repeatedly request additional quotas from the balance management component, which may increase the volume or amount of signaling communications in the network. On the other hand, if the quota size is too high, then the requested balance will be depleted too frequently while there are active sessions, which may block other services and cause subscriber confusion.

In view of these facts, the various embodiments include components configured to intelligently and dynamically determine the quota sizes so as to balance tradeoffs between providing users with satisfactory levels of service, reducing network traffic, and ensuring correct billing for the access and use of services.

In addition to providing services based on quotas, the network components may be configured to define and use balance thresholds or limits. A balance threshold may be defined against a user balance so that the breaching of a threshold (in either the upwards or downwards direction) causes one or more actions to be performed. These actions may include generating subscriber notifications without changing the behavior of the mobile network. For example, subscribers may receive SMS-based notifications when they consume 75% and 90% of their balances. These actions may also include changing the characteristics or the services provided to the end users without blocking the service (e.g., subscribers may receive a reduced service level when they consume 95% of their balances) or terminating the service (e.g., subscribers may have the service blocked when they consume 100% of their balances). As another example, a user's subscription plan may provide for 100 free outbound messages, with a per message charge for messages in excess of this limit. The user may receive notifications as they approach this limit (e.g., after sending 95 messages) and then a separate notification after the 100th message to inform her/him that a per message charge will be incurred for each subsequent message sent. As a further example, a user's subscription plan may provide for 500 free voice minutes, with a $0.05 per minute charge between 500 and 750 minutes, and a $0.02 per minute charge for voice usage in excess of 750 minutes. The user may receive notifications as they approach the first limit (e.g., after 475 minutes are used) and then a separate notification after the 500th minute to inform her/him that a $0.05 per minute charge will be incurred for each subsequent voice call. A further notification may be sent as the user's balance approaches the second limit (e.g., after 725 minutes are used) and then a final notification after the 750th minute to inform her/him that a $0.02 per minute charge will be incurred for each subsequent voice call.

These subscriber notifications and/or changes to service levels are typically implemented via policy rules. As a result, frequent threshold breaches may cause a significant increase in the volume of signaling traffic (e.g., due to policy rules being communicated between components in the network). Accordingly, in the various embodiments, the components may be configured to perform quota allocation and balance threshold tracking operations so as to reduce the volume of signaling traffic in the network. These components may also be configured to intelligently and dynamically allocate granular quotas and/or to accurately and efficiently monitor the usage or consumption of the services (including roaming usage) against balance thresholds so as to avoid frequent threshold breaches, ensure that the required subscriber notifications and/or changes to service levels are triggered and executed in a timely manner, and that there is little or no revenue loss to the mobile network operator.

Generally, quota allocation and balance threshold tracking operations become more challenging and complex when a single account balance is shared and used concurrently by multiple consumers (e.g., services, sessions, subscribers, etc.). As a first example of such a scenario, multiple concurrent services (e.g., voice, email, web browsing) within a single subscriber session may share a single balance account. These services are often assigned to rating groups such that all services within a single rating group are billed or charged in the same manner. Thus, each rating-group may correspond to one or more services, any or all of which may concurrently access and use a single balance account and/or concurrently update a shared account balance.

As another example of a user balance being concurrently shared between multiple consumers, multiple subscribers may share a single balance account (e.g., family accounts, corporate accounts) and each subscriber may have multiple sessions, any or all of which may concurrently access and use the same balance account. As yet another example, multiple concurrent sessions for a single subscriber may share a single balance. These sessions may be associated with a single device (e.g., a smartphone) or with multiple devices (e.g., a smartphone and a tablet) that are covered by the same subscription plan and a single balance. Each session may contain multiple services.

In all these cases, it is challenging to use existing solutions to allocate quotas, accurately track the usage of services against balance thresholds, prevent revenue loss, and provide the end users with adequate levels of service. For example, since the network components (e.g., balance management component, etc.) operate in real-time to control subscribers' use of network resources, services, and applications, they are required to be highly available. In order to meet this requirement, the components are typically deployed in an active-active configuration, i.e., deployment across two or more geographically dispersed sites, each of which is actively supporting and processing subscribers in the network. In addition, a single shared balance may exist in each site (i.e., in different physical locations) and may be modified at any of these sites, for example with a shared family/group balance that is being used concurrently by multiple individuals in different geographic locations. For these and other reasons, using existing solutions to access and update the user's balance information in real-time may require communicating large volumes of information across the network and/or performing cumbersome operations that increase network congestion and data access times beyond that which is acceptable by subscribers, client applications, and telecommunications operators.

In addition, existing solutions typically require that quota allocations have fixed sizes regardless of other factors (e.g., the size of the remaining balance, the number of active sessions). As discussed above, the quota allocations (e.g., quota sizes) can be set sufficiently small to ensure that the risk that balance thresholds are inadvertently exceeded is minimized. However, if the quota allocations are set too low then there will be an excessive amount of signaling in the network due to new quota allocations being requested too frequently. If the quota allocations (e.g., quota sizes) are set high, then the amount of signaling in the network due to new quota allocations being requested can be reduced. However, if the quota allocation is set too high then the shared balance may frequently and erroneously breach the balance thresholds. In some cases this may cause services, sessions, and subscribers to be throttled or blocked, ultimately leading to unnecessary subscriber confusion.

The various embodiments overcome the above-mentioned limitations of existing solutions by configuring network components to dynamically determine the quota sizes/quota allocations, maintain the data integrity of a user balance account across multiple geographically dispersed active sites, reduce the number of balance threshold breaches, and to balance tradeoffs between tolerating balance threshold breaches and generating acceptable levels of signaling in the network.

In some embodiments, the components may be configured to intelligently, flexibly, and dynamically determine the quota sizes for a consumer (e.g., services, sessions, subscribers, etc.) associated with a balance account that is shared by multiple consumers or an account balance that used by multiple consumers. The components may be further configured to minimize the volume of quota-based signaling messages, to enforce quota thresholds to the required degree of accuracy and timeliness, to intelligently distribute a quota across concurrent consumers (e.g., services, sessions, subscribers, etc.) of a shared balance, to intelligently balance trade-offs between threshold accuracy and other business or technical objectives, to ensure that the quota allocation algorithms are as efficient as possible while still meeting the business or technical objectives, and to mitigate the risks of a shared balance threshold being inadvertently breached based on the rate of change of that shared balance.

In some embodiments, the components may also be configured to allow the mobile network operator to set the appropriate policy rules that will be applied when the thresholds are breached and/or to specify the maximum threshold breach that is to be tolerated before the appropriate policy rules are applied. For example, if a business requirement specifies that a subscriber should have a service blocked when he/she consumes 100% of his/her balance, then the component may allow that mobile network operator to determine the appropriate policy rule that will be applied when the shared balance is at a minimum of 100% of the balance threshold and a maximum of 105% of the balance threshold.

In an embodiment, the components may include a balance management component that is configured to receive a quota request message that includes information requesting allocation of a first quota to a first consumer (e.g., service, session, subscriber, etc.) from a shared balance account. The shared balance account may include a shared account balance that is used by multiple consumers. In an embodiment, the shared account balance may identify the quantity of service unit allowances that are available for allocation to the consumers. A service unit allowance may be a service or access unit that may be allocated to a consumer and used to determine the amount of services that are to be provided to that consumer by components in the telecommunication network, such as by a metering and gating component or a policy and charging enforcement function component.

In an embodiment, the balance management component may be configured to determine whether the first quota may be allocated to the first consumer from the shared account balance without exceeding a balance threshold. For example, the balance management component may determine whether the shared account balance is greater than or equal to a quota allocation size value included in the received quota request message and/or whether the shared account balance is greater than or equal to a minimum quota allocation size value. The minimum quota allocation size value may be included in the received quota request message or determined by the balance management component.

In an embodiment, the balance management component may be configured to allocate the first quota in response to determining that the first quota may be allocated to the first consumer from the shared account balance without exceeding the balance threshold. Allocating the first quota may include allocating a first quantity of service unit allowances, access units, or any other information unit that may be used to determine the amount of resources and/or services that are to be provided to a consumer by the telecommunication network In an embodiment, the balance management component may be configured to compute a total reclaimable quota size value in response to determining that the first quota may not be allocated to the first consumer from the shared account balance without exceeding the balance threshold. The balance management component may be configured to compute a total reclaimable quota size value by identifying the active quotas that were allocated from the shared account balance, determining the current quota allocation sizes and the minimum quota sizes of the identified active quotas, computing a total quota allocation size value based on the determined current quota allocation sizes, and computing a total minimum quota size value based on the determined minimum quota sizes. The balance management component may then compute the total reclaimable quota size value as being the difference between the total quota allocation size value and total minimum quota size value.

In an embodiment, the balance management component may be configured to determine whether the total reclaimable quota size value is greater than or equal to a minimum quota allocation size in response to determining that the first quota may not be allocated to the first consumer from the shared account balance without exceeding a balance threshold.

In an embodiment, the balance management component may be configured to send a communication message to the metering and gating component indicating that quota (or services unit allowances, service access units, etc.) will not be allocated to the first consumer in response to determining that the total reclaimable quota size value is not greater than or equal to a minimum quota allocation size.

In an embodiment, the balance management component may be configured to reclaim one or more portions of one or more currently active allocated quotas in response to determining that the total reclaimable quota size value is greater than or equal to a minimum quota allocation size. The balance management component may then update the shared account balance to include the reclaimed portions. Thus, the balance management component may reclaim the quota (e.g., service unit allowance, etc.) that was previously allocated to other consumers from the share account balance and add the reclaimed quota to the shared balance account in response to determining that the total reclaimable quota size value is greater than or equal to a minimum quota allocation size. The balance management component may add the reclaimed quota to the shared balance account by incrementing the shared account balance by the number of credits, service access units, service unit allowances, etc. that are included in (or that are represented by) the reclaimed quota.

In an embodiment, the balance management component may be configured to determine a priority value for one or more elements in an eligible quota list. These elements may include, or may be, currently active allocated quotas that are edible for reduction. A currently active allocated quota may be a quota allocated to a consumer from the shared account balance that is being held or used by that consumer (e.g., to receive services from the telecommunication network).

In an embodiment, the balance management component may be configured to sort the eligible quota list based on the determined priority values, and traverse the sorted eligible quota list sequentially (i.e., based on the priorities) to reclaim all or portions of the active allocated quotas. For example, the balance management component may select the first/next element from the sorted list, reduce an allocated quota size of the selected element, and increment the shared account balance by the reduced amount.

In an embodiment, the balance management component may be configured to reevaluate whether the first quota may be allocated to the first consumer from the shared account balance each time the shared account balance is incremented. The balance management component may be configured to continue traversing the list and reducing the allocated quota sizes of the selected elements until all the elements are reduced or until it is determined that the first quota may be allocated to the first consumer without breaching the balance threshold.

In an embodiment, the balance management component may be configured to reduce allocated quota size of the selected element by sending a communication message to a metering and gating component associated with selected element to cause that metering and gating component to return all or portions of its unused allocated quota. In an embodiment, the communication message may cause the metering and gating component to return unused allocated quota that is in excess of the minimum quota allocation size. In other embodiments, the communication message may cause the metering and gating component to return half of its unused allocated quota, or to return half of its unused allocated quota that is in excess of the minimum quota allocation size. In another embodiment, the communication message may cause the metering and gating component to return all unused allocated quota (i.e., the entire portion of unused allocated quota), and the balance management component may respond by sending a second communication message to the metering and gating component associated with selected element to reallocate all or a subset of the returned quota.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106. In the example illustrated in FIG. 1, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 may also include connections to a policy and charging enforcement function (PCEF) 110 component that is connected to a policy and charging rules function (PCRF) 112 component, online/offline charging systems (OCS/OFCS) 114, and other similar components that participate in, collect information from, or otherwise contribute to, communications between the service network 104 and the user equipment 102. In an embodiment, the PCEF 110 may include a metering and gating component. In an embodiment, the online/offline charging systems (OCS/OFCS) 114 may include an online charging system (OCS) that includes a balance management component. In an embodiment, the OCS/OFCS 114 may be a balance management component.

The PCEF 110 component may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to the PCRF 112, OCS/OFCS 114, and other similar components.

The PCRF 112 component may be responsible for identifying the appropriate policy and charging rules for a given communication session of a given subscriber or terminal device, and sending the identified policy rules to the PCEF 110 for enforcement. Specifically, the PCRF 112 may be responsible for generating, compiling, and selecting a set of business and technology rules that define the policies that are to be enforced for particular call sessions. The PCRF 112 may make rule decisions on a per-subscriber, per-session and/or per-service basis. For example, the PCRF 112 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 110 as a profile that defines the policies to be enforced.

In addition to receiving rules from the PCRF 112, the PCEF 110 component may also communicate with the OCS/OFCS 114 to identify the policies that are to be enforced and/or to ensure proper charging. For example, the PCEF 110 may periodically inform the OCS/OFCS 114 of services consumed or requested by a subscriber. The OCS/OFCS 114 may include a balance management component that is responsible for determining if the subscriber has sufficient funds/credits/access units to receive a requested service, and may grant or deny access based on the amount of fund/credits/access units available in a subscriber balance account. For example, the OCS/OFCS 114 may issue a quota by identifying an amount of funds, credits, access units, or service units allowance that are authorized for use by the PCEF 114 for a requested service or consumer.

To focus the discussion on the relevant features and functionalities, various embodiments are described below using 3GPP terminology, and with reference to the Diameter protocol. However, it is to be understood that the various embodiments are network and protocol agnostic, and should not be limited to 3GPP networks, the Diameter protocol, or any specific network technology unless expressly recited as such in the claim language.

Figure 2:
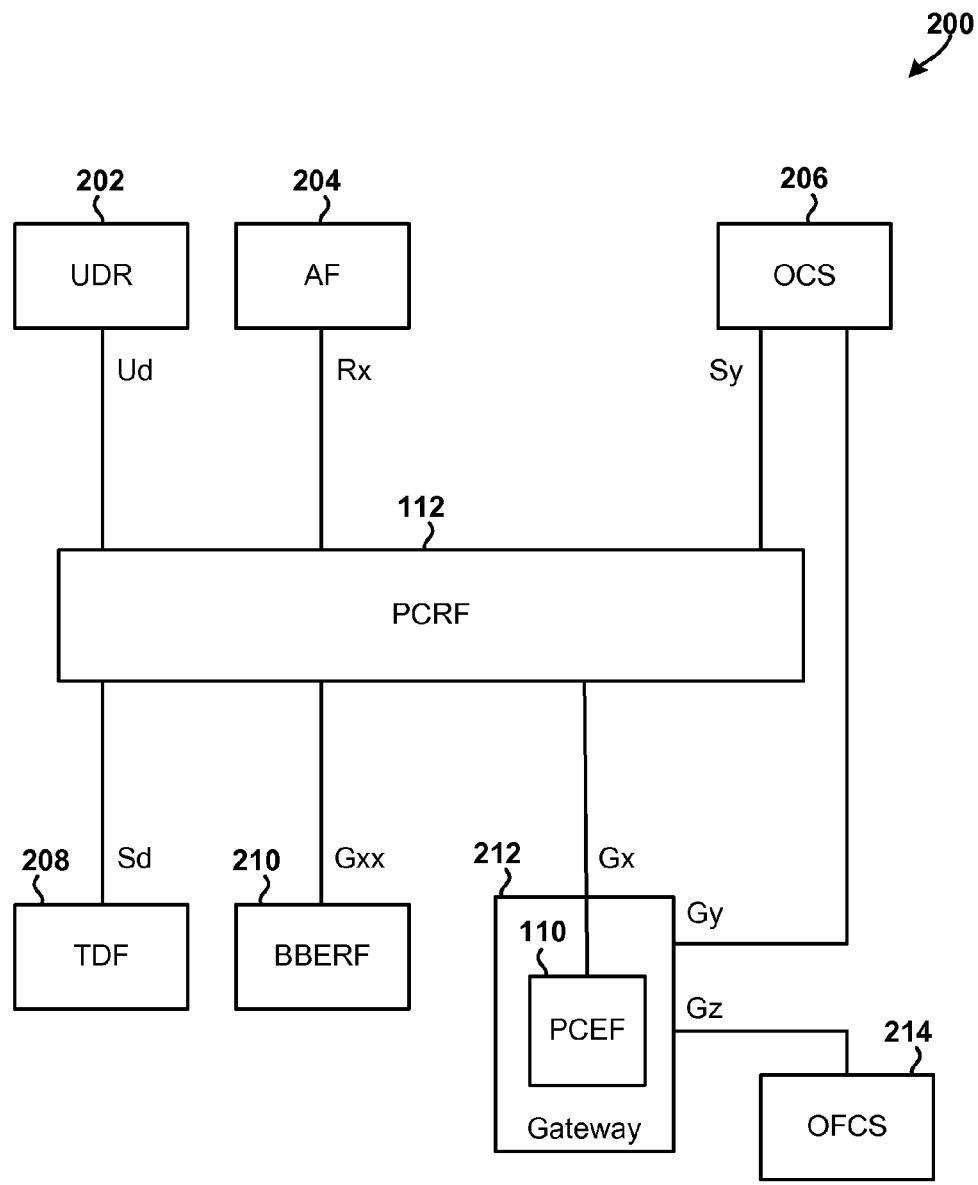

FIG. 2 illustrates various components in a single site deployment of a 3GPP-based policy and charging control (PCC) network 200 that may be configured to perform quota allocation and balance threshold management operations in accordance with various embodiments. In the example illustrated in FIG. 2, the PCC network 200 includes a policy and charging enforcement function (PCEF) 110 component, a policy and charging rules function (PCRF) 112 component, a user data repository (UDR) 202 component, an application function (AF) 204 component, an online charging system (OCS) 206 component, a traffic detection function (TDF) 208 component, a bearer binding and event reporting function (BBERF) 210 component, a gateway 212 component, and an offline charging system (OFCS) 214 component. In an embodiment, the PCEF 110 may be included in the gateway 212 component. In an embodiment, the PCEF 110 component may be a metering and gating component, and the OCS 206 component may be a balance management component.

In an embodiment, the PCRF 112 component may be connected to the UDR 202, AF 204, OCS 206, TDF 208, BBERF 210, and PCEF 110 components via the Diameter Ud, Rx, Sy, Sd, Gxx, and Gx interfaces/reference points, respectively. In an embodiment, the gateway 212 component may be connected to the OCS 206 and OFCS 214 components via the Diameter Gy and Gz interfaces/reference points, respectively.

In an embodiment, the PCEF 110 component may include a metering and gating component (not illustrated in FIG. 2), and the OCS 206 component may include a balance management component (not illustrated in FIG. 2). The metering and gating component may be configured to communicate with the balance management component to provide user equipment devices access to various services based on quotas. As part of these operations, the metering and gating component may send an initial quota allocation request message, a quota allocation update message, and/or a termination message to the balance management component. In various embodiments, the initial quota allocation request message may be a Diameter CCR-I message, the quota allocation update message may be a Diameter CCR-U message, and the termination message may be a CCR-T message. The balance management component may respond to any or all of these messages via the appropriate response message, such as a quota allocation response message or a Diameter CCA message.

The metering and gating component and the balance management component may, individually or collectively, perform various quota allocation management operations, which may include implementing one or more quota allocation management schemes. These schemes may include a hard limit scheme, a session priorities scheme, a session profiles scheme, a minimum quota allocation scheme, a maximum threshold overrun scheme, a quota return scheme, and a threshold breach timer scheme.

In an embodiment, the components may be configured to implement a hard limit scheme in which a balance threshold is enforced based on a reserved (rather than a consumed) quota. Sessions may be terminated or redirected when there is no remaining quota available for allocation, which may result in some sessions being terminated in advance of their entire balance being consumed. As such, in an embodiment, the components may be configured to use quota return messages to share remaining unused portions of an allocated quota across the active consumers (e.g., services, sessions, subscribers, etc.) that are associated with a shared account balance.

In an embodiment, the components may be configured to implement a session priorities scheme in which sessions associated with a shared account balance are prioritized, and these priorities are used to determine which of the sessions are to be allocated quota when the shared balance is low. For example, sessions for an account's primary subscriber may be given a higher priority, and thus given preferential treatment for quota allocations. Similarly, services within a session may be prioritized under this scheme.

In an embodiment, the components may be configured to implement a session profiles scheme in which sessions are categorized in terms of bandwidth requirements of the service being consumed. This allows the components to allocate quota according to the particular requirements of the service being used, rather than simply splitting quota evenly across multiple sessions. In various embodiments, the session profile may be defined based on the characteristics of a session, such an access point name (APN), radio access technology (RAT), rating group (or service), subscriber location, and/or subscriber profile attributes.

In an embodiment, the components may be configured to implement a minimum quota allocation scheme. That is, some schemes may require that the sizes of the quota allocations be reduced as a threshold is approached. The components may implement the minimum quota allocation scheme (e.g., along with another scheme) to define minimum quota allocation sizes so as to prevent the sizes of the quota allocations from being reduced to a level that causes excessive signaling traffic in the network.

In an embodiment, the components may be configured to implement a maximum threshold overrun scheme that allows a balance threshold to be overrun by a specified tolerance value (T) before a balance threshold breach flag is set or a balance threshold breach action is triggered. The tolerance value (T) may be an absolute value or a percentage of a balance threshold. The maximum threshold overrun scheme allows the components to prevent the total amount of quota that is reserved below the balance threshold from exceeding the specified tolerance value (T) across all the active sessions. By permitting the balance threshold to be overrun, the various embodiments create a window during which a threshold breach may be detected and reported via normal signaling communications. This may be accomplished without having to significantly reduce the quota allocations, or to communicate large volumes of signaling information (e.g., via usage report requests) or perform additional operations to explicitly detect the threshold breach.

In an embodiment, the components may be configured to implement a quota return scheme in which the components retrieve and use an existing quota allocation from one consumer (e.g., service, session, or subscriber) to satisfy a quota allocation request from another consumer so as to consume a left-over or remaining quota allocation down to a threshold before causing/triggering a threshold breach.

In an embodiment, the components may be configured to implement a threshold breach timer scheme. That is, if there are no reports detailing the amount of the allocated quota that is consumed and/or unused from the metering and gating component for a time period (e.g., due to idle sessions), a balance threshold breach may go undetected. Under this scheme, a timer is used to prompt the balance management component to regularly retrieve quota allocation reports from the metering and gating components. This scheme may be implemented along with another scheme to ensure that a timely notification is sent. In an embodiment, the components may be configured to disable the timer or threshold breach timer scheme in response to determining that a hard limit scheme is being used.

In an embodiment, the balance management component may be configured to perform dynamic quota allocation operations in response to determining that a quota allocation request message has been received for a consumer (e.g., services, sessions, subscribers, etc.) that is associated with a shared account balance, and that the shared balance is sufficiently close to a balance threshold so that allocating the quota would cause the shared balance to breach the balance threshold (e.g., the zero units threshold would be breached when a quota allocation request for 50 units is received for a shared balance is that is 47 units). As part of these operations, the balance management component may determine the total amount of quota (e.g., amount of pre-allocated funds, credits, access units, or service units allowance) that is currently allocated to all metering and gating components for the shared account balance, identify consumers associated with the shared balanced account for which existing quota allocations may be reduced without violating their minimum quota allocation requirements, reduce or reclaim the quota allocated to the identified consumers, and use the reclaimed quota to allocate quota (i.e., by allocating the funds, credits, access units, or service units allowance, etc.) to the consumer associated with the received quota allocation request message.

In an embodiment, the balance management component may be configured to generate a list of eligible quota allocations (i.e., an eligible quota list) that includes information suitable for identifying existing quota allocations that are eligible for reduction. In a further embodiment, the balance management component may be configured to organize or prioritize the eligible quota list. The balance management component may be configured to determine that an existing quota allocation is eligible for reduction and/or to determine the priority of an eligible quota allocation for reduction based on any or all of a number of factors, including the actual quota allocation size, the size of the difference between the minimum quota allocation and the actual quota allocation, the expiry time of the quota allocation (i.e., the quota allocation's age), the types of the subscribers (e.g., reclaim quota allocation from a child's account so that the parent can continue to use services, or reclaim quota allocation from low-level employees so that managers/executives can start sessions), the types of the sessions, and the types of services (e.g., file transfer services may have a lower priority than VoIP services, personal services such as social networking may have lower priorities than corporate services such as sales tools and VPNs).

In an embodiment, the balance management component may be configured to select the quota allocations that are to be reduced, such as from the sorted eligible quota list, based on business rules. For example, the balance management component may be configured to use business rules to determine whether to reduce a small number of eligible quota allocations by large amounts or to reduce a large number of eligible quota allocations by small amounts. The reductions may be applied to the eligible quota allocation relative to the size of the eligible quota allocation (e.g., half of the allocated quota) or by a fixed amount (e.g. 100 KB). In an embodiment, the balance management component may be configured to not reduce an eligible allocated quota if the reduction will cause the quota allocation to be less than the minimum quota allocation defined for that service, session, or subscriber.

Figure 3A:
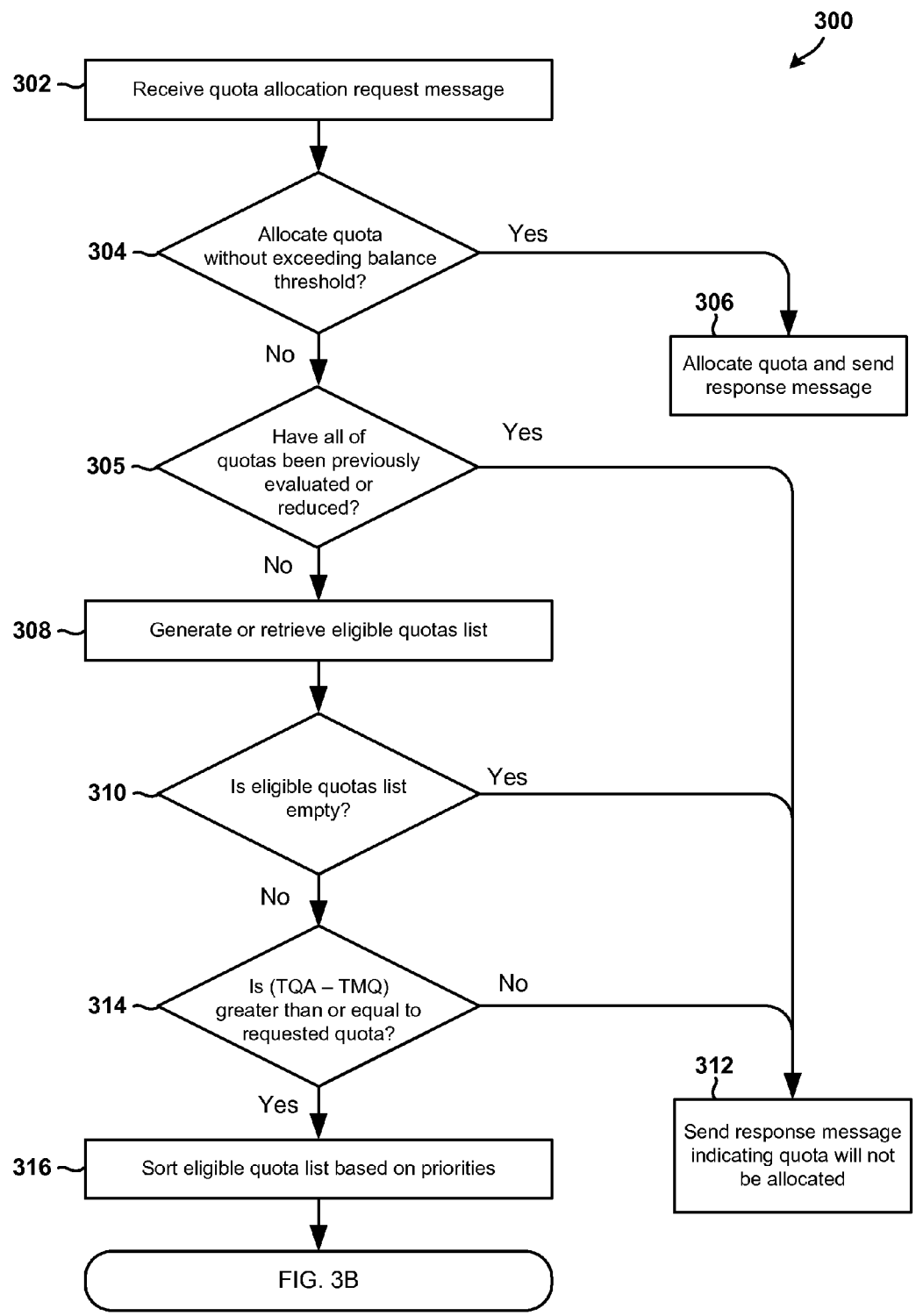
FIGS. 3A and 3B are process flow diagrams illustrating a method for intelligently reducing quota allocation sizes in accordance with an embodiment.
Figure 3B:
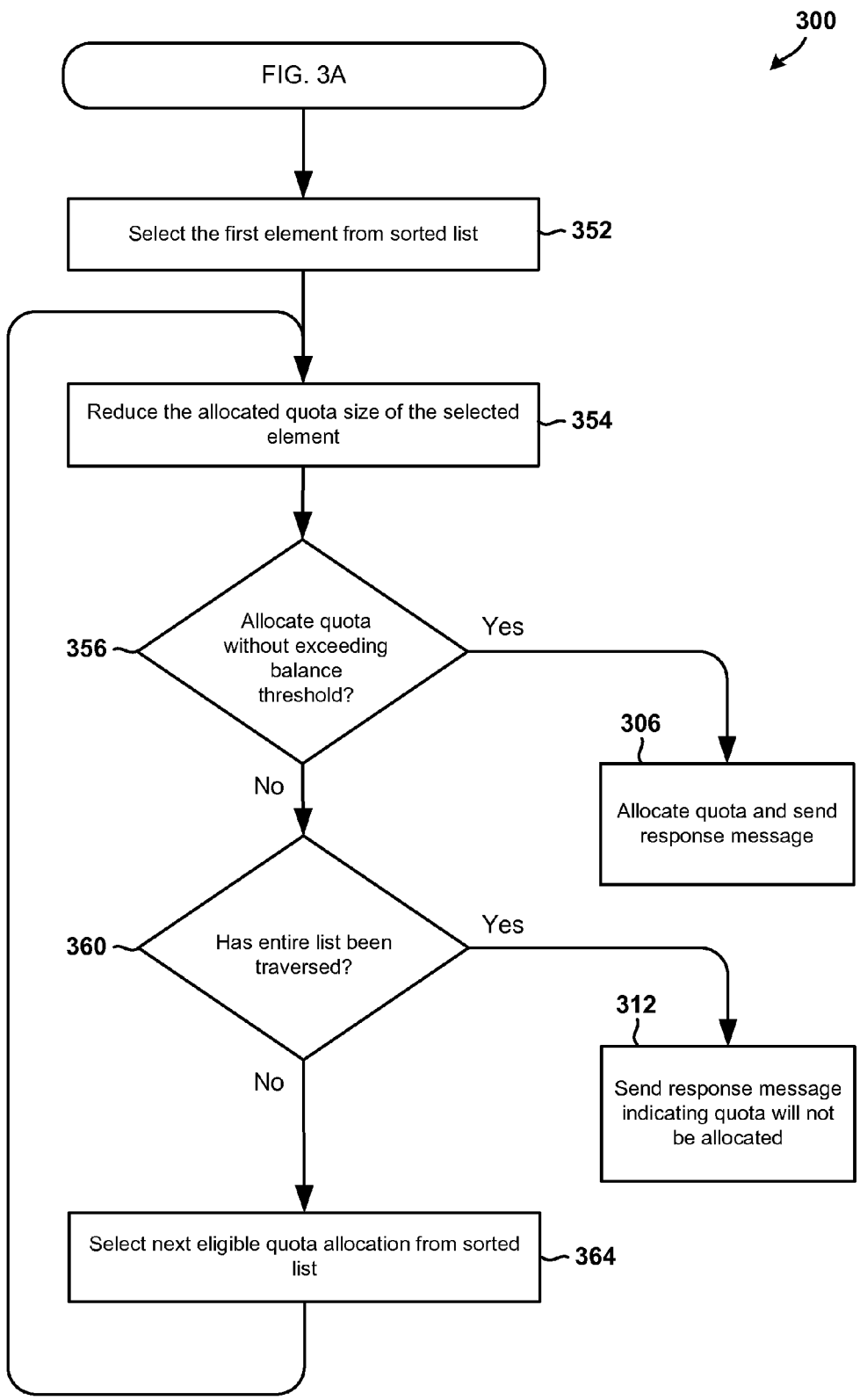

FIGS. 3A and 3B illustrate a method 300 of intelligently reducing quota allocation sizes in accordance with an embodiment. Method 300 may be performed in a processing core of a server computing device that implements all or portions of a balance management component that maintains a balance account that is shared by multiple consumers (e.g., across services, sessions, and/or subscribers).

In block 302, the processing core of the balance management component may receive a quota request message (e.g., an initial quota allocation request message, an update quota request message, etc.) from a metering and gating component, determine whether the received request is associated with an ongoing session (i.e., an update request), add any unused portions of the allocated quota (e.g., allocated funds, credits, access units, or service units allowance) to the available balance, and/or add the amount of the allocated quota that has been consumed to a running total (e.g., for billing and reporting purposes). In the example illustrated in FIGS. 3A and 3B, in block 302, the balance management component also determines that the received quota request message includes a request for the allocation of quota.

In determination block 304, the balance management component may determine whether quota (e.g., credits, access units, etc.) may be allocated without exceeding a balance threshold. For example, the balance management component may determine whether the remaining balance in the balance account is greater than or equal to a quota allocation size value included in the received message or to a minimum quota allocation size value that is associated with the received message or its associated consumer (e.g., service, session, subscriber, etc.).

In response to determining that quota may be allocated without exceeding a balance threshold (i.e., determination block 304="Yes"), in block 306, the balance management component may allocate quota by decrementing the user's available balance (or by reserving part of the available balance so that it is not available for future allocation), generating a quota allocation response message that includes an allocated quota size (e.g., amount of pre-allocated funds, credits, access units, or service units allowance), and sending a quota allocation response message to the metering and gating component. In an embodiment, the balance management component may be configured to generate the quota allocation response message to include a quota information structure and/or information suitable for use in identifying various characteristics and features of the allocated quota, such as the allocated quota size, expiration time, location or address of the metering and gating component, the consumer to which the quota was allocated, etc. The balance management component may also be configured to add the quota information structure or information identifying the characteristics of the allocated quota to an active quota allocations list or to an eligible quota list.

In response to determining that quota may not be allocated without exceeding a balance threshold (i.e., determination block 304="No"), in determination block 305, the balance management component may determine whether all of the relevant quotas have previously been evaluated or reduced. In response to determining that all of the relevant quotas have previously been evaluated or reduced (i.e., determination block 305="Yes"), in block 312, the balance management component may send a response message to the metering and gating component indicating that quota will not be allocated. In an embodiment, in block 312, the balance management component may determine whether there is sufficient balance available to support the quota allocation, allocate the quota if the balance is sufficient, and send the response message to the metering and gating component indicating that quota will not be allocated in response to determining that the balance is not sufficient.

In response to determining that all of the relevant quotas have not yet been evaluated or reduced (i.e., determination block 305="No"), in block 308, the balance management component may generate or retrieve a list of eligible quota allocations (i.e., the eligible quota list) that includes information identifying existing quota allocations that are eligible for reduction. In an embodiment, the balance management component may determine that an existing quota allocation is eligible for reduction (and thus suitable for inclusion in the eligible quota list) based on determining that the quota has been allocate to a consumer that is associated with the shared account balance, that the allocated quota size (i.e., amount of allocated funds, credits, access units, or service units allowance) is greater than a minimum quota allocation size, etc.

In determination block 310, the balance management component may determine whether any of allocated quotas for consumers associated with the shared account balance are eligible for reduction by determining whether the eligible quota list is empty. In response to determining that the eligible quota list is empty (i.e., determination block 310="Yes"), in block 312, the balance management component may send a response message to the metering and gating component indicating that quota will not be allocated.

In response to determining that the eligible quota list is not empty (i.e., determination block 310="No"), in determination block 314, the balance management component may determine whether the total quota currently allocated (TQA) to all consumers of the shared account balance less the total minimum quota currently allocated (TMQ) to all the consumers is greater than or equal to the requested quota allocation size or the minimum quota allocation size. For example, in determination block 314, the balance management component may compute a total reclaimable quota (TRQ) size value by identifying the active quotas that were allocated from the shared account balance, determining the current quota allocation sizes and the minimum quota sizes of the identified active quotas, computing a total quota allocation (TQA) size value based on the determined current quota allocation sizes, and computing a total minimum quota (TMQ) size value based on the determined minimum quota sizes, and setting the value of the total reclaimable quota (TRQ) size value to be equal to the difference between the total quota allocation (TQA) size value and total minimum quota (TMQ) size value. The balance management component may then determine whether the total quota currently allocated (TQA) to all consumers of the shared account balance less the total minimum quota currently allocated (TMQ) to all the consumers is greater than or equal to the requested quota allocation size or the minimum quota allocation size by determining whether the total reclaimable quota (TRQ) size value is greater than or equal to a requested quota allocation size and/or to a minimum quota allocation size.

In response to determining that TQA minus TMQ is not greater than or equal to the requested or minimum quota allocation size (i.e., determination block 314="No"), in block 312, then the balance management component may send a response message to the metering and gating component so as to indicate that quota will not be allocated.

In response to determining that TQA minus TMQ is greater than or equal to the requested or minimum quota allocation size (i.e., determination block 314="Yes"), in block 316, the balance management component may determine a priority value for each element in the eligible quota list, and organize, filter, and/or sort the eligible quota list (e.g., based on the determined priorities). The balance management component may determine these priorities and sort the list based on any combination of factors or criteria, including the actual quota allocation size, the size of the difference between the minimum quota allocation and the actual quota allocation, quota expiry time, subscriber type, session type, and service type. The balance management component may sort the eligible quota list so that the quota allocations that are closer to the front of the list will be reduced before quota allocations that are closer to the end of the list, or vice versa.

With reference to FIG. 3B, in block 352 of method 300, the balance management component may select the first element from the sorted/ordered eligible quota list. In block 354, the balance management component may reduce the quota allocation size of the selected element. In an embodiment, this may be accomplished by requesting that the metering and gating component associated with selected element reduce its quota allocation size and/or return unused allocated quota that is in excess of its minimum quota allocation size, and updating the shared account balance to include the reclaimed quota. In other embodiments, this may accomplished by reducing the allocated quota size by half, by half of the allocated quota that is in excess of the minimum quota allocation size, etc. For example, the balance management component may be configured to request that the component associated with selected element reduce its allocated quota size by half in response to determining that the quota allocation size of the selected element is a multiple of a minimum quota allocation.

In determination block 356, the balance management component may determine, based on the updated balance information, whether the requested or required quota may be allocated without exceeding a balance threshold. For example, in determination block 356, the balance management component may determine whether the updated balance in the balance account is now greater than or equal to a quota allocation size value included in the received message, a fixed quota allocation size, and/or to a minimum quota allocation size.

In response to determining that quota may be allocated without exceeding a balance threshold (i.e., determination block 356="Yes"), in block 306, the balance management component may allocate the quota by decrementing the user's available balance (or by reserving part of the available balance so that it is not available for future allocation), generating a quota allocation response message that includes an allocated quota size, and sending the quota allocation response message to the metering and gating component.

In response to determining that quota may not be allocated without exceeding a balance threshold (i.e., determination block 356="No"), in determination block 360, the balance management component may determine whether all the elements in the eligible quota list have been evaluated or reduced. In an embodiment, this may be accomplished by determining whether the entire list has been traversed. In response to determining that all the elements in the eligible quota list have been evaluated or reduced (i.e., determination block 360="Yes"), in block 312, the balance management component may send a response message to the metering and gating component indicating that quota will not be allocated. In response to determining that all the elements in the eligible quota list have not yet been evaluated or reduced (i.e., determination block 360="No"), in block 364, the balance management component may continue traversing the list, select the next element from the list, and reduce the allocation size of the selected element in block 354. The operations of blocks 354-364 may be repeated until an appropriate response message is sent in one of blocks 306 and 312.

As discussed above, in determination block 314, the balance management component may determine whether the total quota currently allocated (TQA) to all consumers of the shared account balance less the total minimum quota currently allocated (TMQ) to all the consumers is greater than or equal to the requested quota allocation size or the minimum quota allocation size. In an embodiment, the balance management component may compute the TQA value by adding the quota allocation sizes of the all quotas that are currently allocated to consumers of the shared account balance. For example, if there are quota allocations of 1,000 KB for voice-over-IP, 250 KB for web browsing, and 100 KB for email, then the balance management component may determine the TQA value to be 1,000 KB+250 KB+100 KB=1,350 KB. If the minimum quota allocations are 500 KB for voice-over-IP, 100 KB for web browsing, and 100 KB for email, then the balance management component may determine the TMQ value to be 500 KB+100 KB+100 KB=700 KB. Thus, the TQA minus the TMQ would be 1,350 KB-700 KB=650 KB.

In the above example, if the requested quota allocation size is 500 KB, then the balance management component will be able to allocate this quota because 500 KB is less than TQA minus TMQ (i.e., less than 650 KB). If the requested quota allocation size is 800 KB and the minimum quota allocation size is 400 KB, then the balance management component would be able to allocate an amount of quota between the minimum quota allocation and the TQA minus TMQ inclusive (i.e., between 400 KB and 650 KB inclusive). If the requested quota allocation size is 800 KB, and the minimum quota allocation size is also 800 KB, then the balance management component will not be able to allocate this quota because 650 KB is less than 800 KB.

In an embodiment, the balance management component may be configured so that quota allocations are granted at a pre-defined default size (as defined in the configuration of the session profile) for each received request message (e.g., CCR message) until the remaining available balance plus the total maximum quota allocations for the shared balance is equal to or less than the total number of active sessions using the shared balance multiplied by the largest quota allocation. After the above condition is met, the balance management component may perform quota allocation size halving operations to reduce the quota allocation sizes by half for all of the active sessions that have a quota allocation that is greater than half of the largest quota allocation. Then, for each subsequent request message (e.g., CCR message) that is received, the balance management component may send a response message (e.g., RAR message) relating to the appropriate active sessions that satisfy the above quota allocation condition and halve the oldest reported usage (as reported in a CCR-U message), until the quota allocation is halved for all appropriate active sessions. The balance management component may continue allocating quotas for each request message (e.g., CCR message) that is received until the remaining balance is equal to (or less than) the total number of active sessions multiplied by the largest quota allocation.

In addition, the balance management component may be configured so that the quota allocation size halving operations are performed until the quota allocation sizes are low enough to reach a defined tolerance precision (e.g., the total number of active sessions multiplied by the largest quota allocation size has to be less than 2% of the total shared balance size) or until further quota allocation size halving is not possible (the minimum quota allocation size has been set for all active sessions). When one of the above conditions is met, the quota allocation operations may continue at the quota allocation size for each request message (e.g., CCR message) until the balance threshold is breached. The balance management component may send a "policy refresh" request message to its corresponding PCRF 122 component (e.g., via Sy signaling) when the next request message is received for an active session relating to the shared balance.

Figure 4:
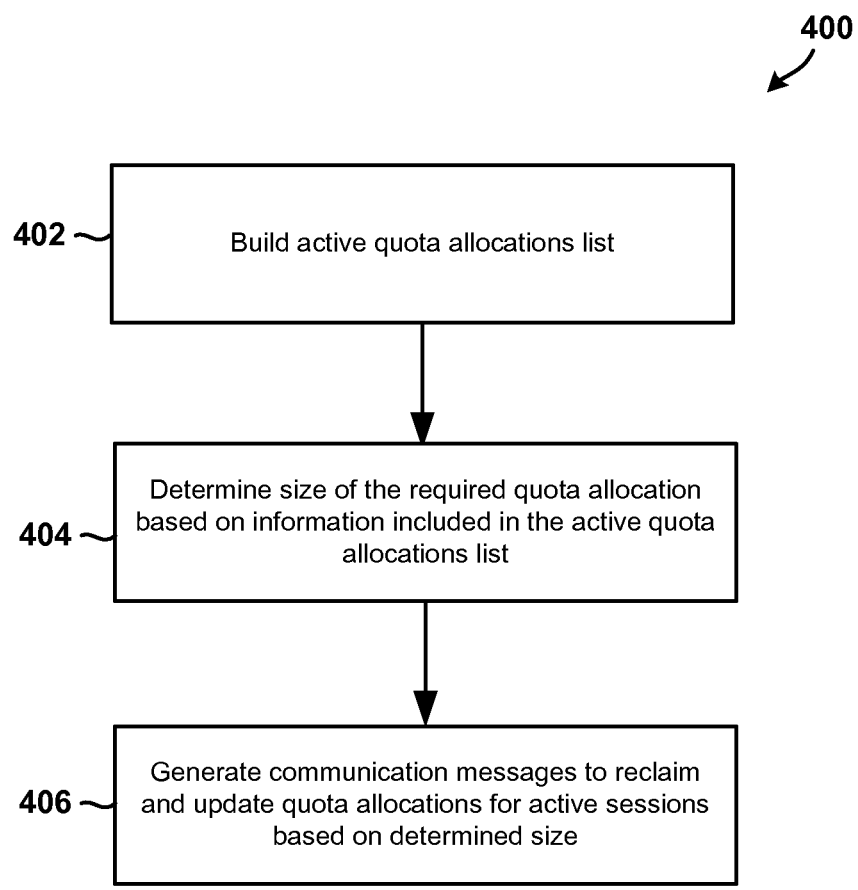
FIG. 4 is a process flow diagram illustrating an embodiment method of reclaiming and updating quota allocations for active sessions.

FIG. 4 illustrates an embodiment method 400 of reclaiming and updating quota allocations for active sessions. Method 400 may be performed in a processing core of a server computing device that implements all or portions of a balance management component. In block 402, a processing core in the balance management component may build or update an active quota allocation list.

The active quota allocation list may include information suitable for determining the total number of active sessions that are using or that are associated with a shared account balance, the total maximum quota allocations for the shared balance, and the largest quota allocation. In an embodiment, the active quota allocation list may be equal to or the same as the eligible quotas list. In various embodiments, the eligible quotas list may include all or a subset of the elements included in the active quota allocation list. In various embodiments, the active quota allocation list and/or eligible quotas list may include information suitable for identifying all of the active quotas that were allocated from a shared account balance, and may include the current quota allocation sizes and/or minimum quota sizes of the active quotas.

In block 404, the balance management component may determine the size of a required quota allocation based on the information included in the active quota allocation list. In block 406, the balance management component may generate and send communication messages to reclaim and update quota allocations for active sessions based on the determined size.

Figure 5:
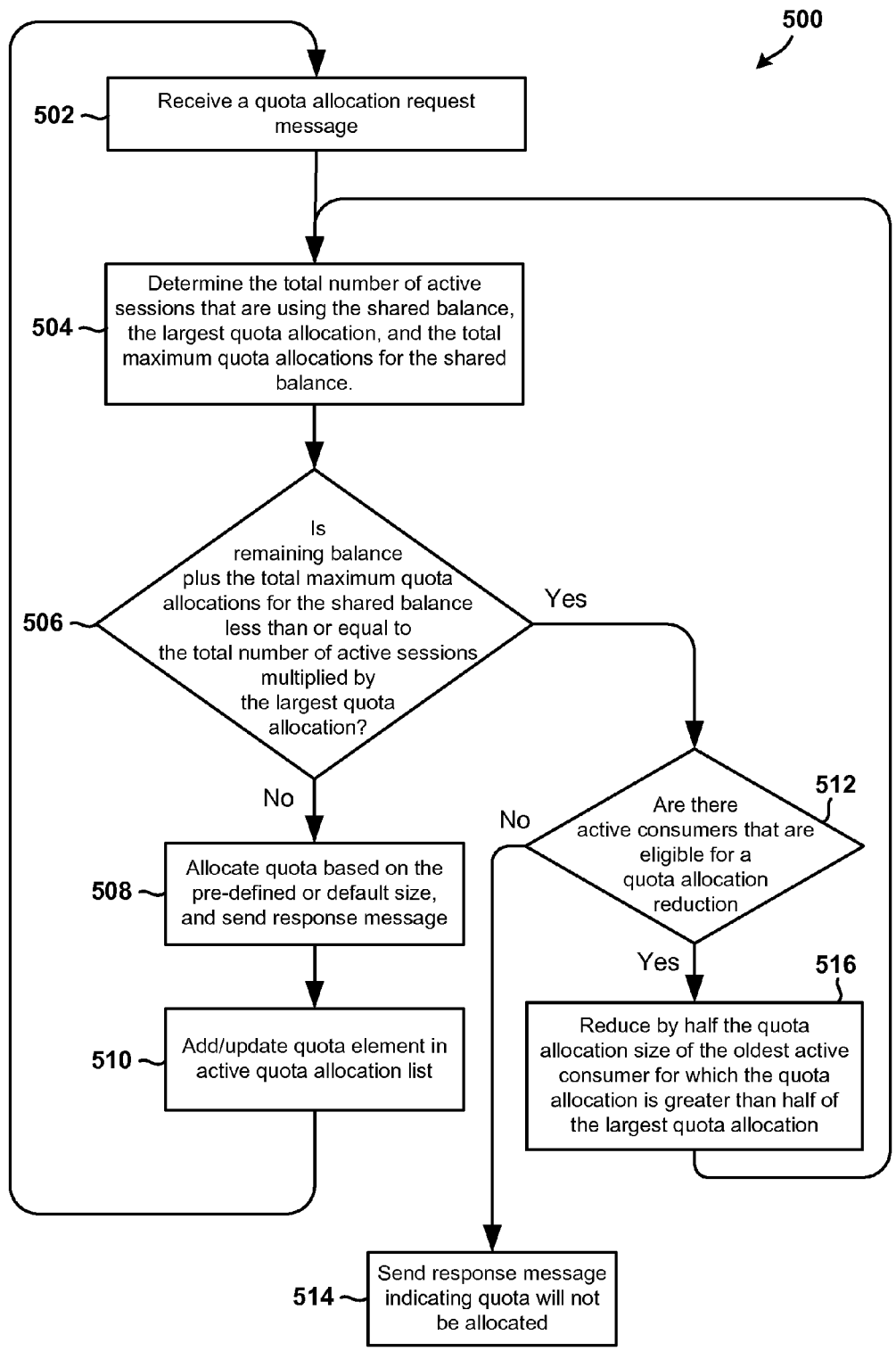
FIG. 5 is a process flow diagram illustrating an embodiment method of dynamically determining the quota allocation sizes for active consumers associated with a single shared account balance.

FIG. 5 illustrates an embodiment method 500 of dynamically determining the quota allocation sizes for active consumers of a shared balance. Method 500 may be performed in a processing core of a server computing device that implements all or portions of a balance management component.

In block 502, the balance management component may receive a quota allocation request message (e.g., CCR message). In block 504, the balance management component may determine the total number of active consumers (e.g., active sessions) that are using the shared account balance, the largest amount of quota allocated to an active consumer using the shared account balance, and the total maximum quota allocations for the shared account balance. In an embodiment, this may be accomplished by traversing an active quota allocation list that stores quota information suitable for identifying the characteristics of the each active quota allocation or each active consumer for which quota has been allocated.

In determination block 506, the balance management component may determine whether an existing quota allocation should be resized by determining whether the remaining available balance plus the total maximum quota allocations for the shared balance is less than or equal to the total number of active sessions using the shared balance multiplied by the largest quota allocation. In response to determining that the existing quota allocations should not be resized (i.e., determination block 506="No"), in block 508, the balance management component may allocate a quota for the received message based on a pre-defined or default size. In block 510, the balance management component may update the active quota allocation list to include the allocated quota. The balance management component may continue receiving messages, allocating quotas, and updating the active quota allocation list in blocks 502-510 until the remaining available balance plus the total maximum quota allocations for the shared balance is equal to or less than the total number of active consumers using the shared balance multiplied by the largest quota allocation (i.e., determination block 506="Yes").

In response to determining that an existing quota allocation should be resized (i.e., determination block 506="Yes"), in determination block 512, the balance management component may determine whether there are any active quota allocations or active consumers that are eligible for a quota allocation reduction. In an embodiment, the balance management component may determine that there are no active consumers/quota allocations that are eligible for reduction based on determining that allocated quotas have previously been reduced for all the suitable active consumers.

In response to determining that there are no active quota allocations or active consumers that are eligible for a quota allocation reduction (i.e., determination block 512="No"), in block 514, the balance management component may send a response message to the metering and gating component that is associated with the received message to indicate that quota will not be allocated for that consumer.

In response to determining that there is an active quota allocation or active consumer that is eligible for a quota allocation reduction (i.e., determination block 512="Yes"), in block 516, the balance management component may reduce by half the quota allocation size of the oldest active consumer (e.g., the active session that has held a quota allocation for the longest time) for which the quota allocation is greater than half of the largest quota allocation. The balance management component may then repeatedly perform the operations of blocks 504, 506, 512, and 514 until it determines that none of the existing quota allocations should be resized (i.e., determination block 506="No") or that none of the remaining active consumers are eligible for a quota allocation reduction (i.e., determination block 512="No").

For distributed balance management components in which updates to a single shared balance may occur in multiple balance management components in geographically dispersed sites, locking the shared balance may cause high latencies and may be complex to manage. More importantly, there may be adverse business impacts (e.g., revenue loss) arising from allowing shared balances to breach thresholds. As such, the various embodiments include methods, and computing devices configured to implement the methods, of maintaining the speed of transactional updates to shared balances so as to reduce or prevent inadvertent balance threshold breaches, reduce latency, and improve the performance of the telecommunication system.

For example, a balance management component may be configured to maintain the speed of transactional updates to shared balances while mitigating or preventing the risk of balance threshold breaches. The balance management component may compute a balance change rate value that identifies the rate in which the shared account balance is being updated, modified, or changed. The balance management component may serialize subsequent updates to that shared account balance based on the balance change rate value so as to prevent an inadvertent threshold breach. The balance management component may perform these operations for prepaid monetary balances for individuals or groups, for non-monetary subscriber balances (e.g., family data allowances), etc.

In an embodiment, each of the multiple balance management components may retain/store a copy of a shared account balance. Under normal circumstances, each balance management component may interact with the shared account balance (e.g., reads the balance, updates the balance, etc.) as if the balance is stored locally. Thus, the transaction processing performance and data storage updates may be performed at local data centre speeds during normal system operation.

Since multiple balance management components in geographically dispersed sites may access and update the shared account balance, the balance management components may be configured so that balance updates are replicated and/or communicated asynchronously to all of the multiple balance management components. A single balance management component may act as the owner of each balance (i.e., each balance has a homed balance management component), and balances may be distributed or domained across the multiple balance management components. For a defined sampling period, each balance management component may collate all the transactions for the balances that it owns, and then determine a balance change rate value that identifies the rate at which each balance is changing.

In an embodiment, the balance management components may be configured to use linear interpolation to determine the balance change rate value, and to determine, estimate, or predict when the shared account balance will breach a balance threshold (e.g., a 500 units balance threshold, a zero balance threshold, etc.). When the shared account balance is modified or updated, the balance management component may compute the balance change rate value using the following formula:

$$m = \left\{ \frac{(y_2 - y_1)}{(x_2 - x_1)} \right\}$$

where $x_1$, $x_2$ are times at which balance updates occurred and $y_1$, $y_2$ are previous and current balance values The balance management component may average the set of values for m for each balance periodically, and calculate one or more estimated threshold breach times. Alternatively, the balance management component may determine the rate of change of the balances using any suitable algorithm that is known in the art.

Given that each balance may be updated in multiple active balance management components, various embodiment components may be configured to determine which of the balance management components is the most active in terms of frequency and/or magnitude of updates to the balance. The estimated threshold breach times and most active balance management component information for each balance may then be communicated to each balance management component. Each balance management component may continue to operate independently on that balance until an estimated breach time is reached.

As the balance updates continue to occur at each balance management component, the next estimated breach time may be compared with the current time. Once the difference between these two values is within a defined tolerance range for that balance, the balance management component that is identified as the authoritative component (e.g., the most active balance management component for that balance) may take over exclusive access to that balance. The other balance management components may then route balance update transactions for processing to the authoritative balance management component for that balance. Once the threshold is breached, the authoritative balance management component may update the balance on all of the other balance management components, and the authoritative balance management component may relinquish its exclusive access to that balance. Each balance management component may then resume processing balance updates until the next estimated breach time is approached.

Figure 6:
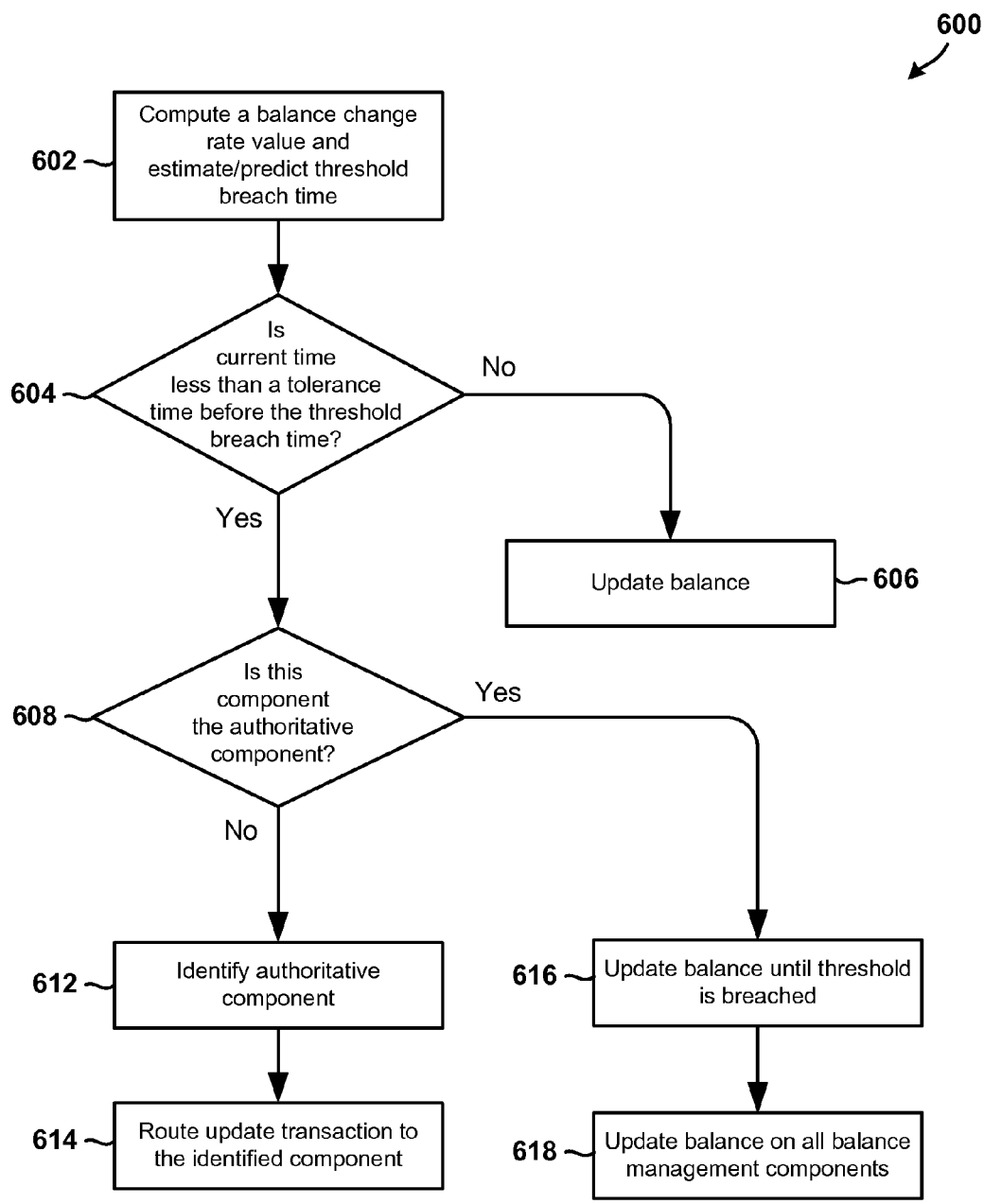
FIG. 6 is a process flow diagram illustrating an embodiment method of updating a shared account balance so as to prevent inadvertent balance threshold breaches.

FIG. 6 illustrates an embodiment method 600 of maintaining the speed of transactional updates to a shared account balance so as to reduce or prevent balance threshold breaches. Method 600 may be performed by processing cores in one or more server computing devices, each of which may include all or portions of a balance management component. In an embodiment, method 600 may be performed in response to determining that a shared account balance requires updates or modification, such as in response to receiving a quota allocation request message, in response to reclaiming allocated quota, or in response to receiving a balance update transaction or request from another balance management component.

In block 602, a balance management component may compute a balance change rate value for a shared account balance, and estimate or predict a threshold breach time (i.e., when the shared account balance will breach a balance threshold) based on the balance change rate value. In an embodiment, the balance management component may use linear interpolation to compute the balance change rate value for the shared account balance. In an embodiment, the shared account balance may be a distributed balance that is used by multiple balance management components that are in geographically dispersed sites. In an embodiment, each of the multiple balance management components may retain/store a copy of a shared account balance.

In determination block 604, the balance management component may determine whether the current time is less than a tolerance time before the threshold breach time. In response to determining that the current time is not less than a tolerance time before the estimated/predicted threshold breach time (i.e., determination block 604="No"), in block 606, the balance management component may update the shared account balance by updating the copy of the balance that is stored in its local memory. In an embodiment, information regarding the balance update may be communicated asynchronously to all balance management components that access or use the shared account balance.

In response to determining that the current time is not less than a tolerance time before the threshold breach time (i.e., determination block 604="Yes"), in determination block 608, the balance management component may determine whether it is an authoritative component that has exclusive access to the shared account balance, such as by determining whether it is the most active component that accesses or uses the shared balance account in terms of frequency and/or magnitude of updates to the balance.

In response to determining that balance management component is the authoritative component (i.e., determination block 608="Yes"), in block 616, the balance management component may update the database until the balance threshold is breached. In block 618, the balance management component may perform various operations to synchronize or update the shared account balance information stored in the local memories of all balance management components associated with the shared account balance.

In response to determining that balance management component is not the authoritative component (i.e., determination block 608="No"), in block 612, the balance management component may identify another balance management component that is the authoritative component. In block 614, the balance management component may route the database update transaction to the balance management component identified as being the authoritative component. The authoritative balance management component may then perform the operations of blocks 616 to 620 discussed above.

Various embodiments may include components configured to use session prioritization to determine which specific sessions are granted quota in a low balance condition and which sessions are denied. For example, sessions for the primary account holder for a group account may have a higher priority than sessions for other subscribers within that group.

Various embodiments may include components configured to categorize sessions in terms of the services, or types of services, being delivered and consumed within each session, and allocate quota based on the specific requirements of the specific service being consumed. This provides a more intelligent way of allocating quota, rather than granting equal quota amounts to each session.

In the various embodiments, a specific shared services threshold and quota allocation algorithm may be defined in order to achieve "as close as possible" threshold breach notifications for large shared balances.

Quota consumed on full speed quality of service (QoS) for shared service groups may be between 100% and a defined percentage (i.e., the tolerance value) of the shared balance size. This may be described using the following equation that tests whether the granted quota allocation size needs to be decremented:

$$(T * \text{Shared Balance Size}) > (M * \text{Largest Granted Quota Allocation Size})$$

where
M={Number of active Rating Groups across all sessions}
T={the configured Tolerance value}

As an example, consider a family of five subscribers who share a balance of 10 GB. Each of the members has active sessions, with each session having two rating groups. The defined default (and largest) quota allocation size for both rating groups is 10 MB. Assuming a tolerance value of 2% in this case, there is no need for any decrementing of the granted quota allocation size, because applying these values to the above equation gives:

$$(2\% * 10 \text{ GB}) > (5 * 2 * 10 \text{ MB}).$$

As another example, consider a family of five subscribers who share a balance of 1 GB. Each of the members has active sessions, with each session having two rating groups. The defined default (and largest) quota allocation size for both rating groups is 10 MB. Assuming a tolerance value of 2% in this case, applying these values to the above equation gives:

$$(2\% * 1 \text{ GB}) > (5 * 2 * 10 \text{ MB}), \text{ which fails the test}$$

Therefore, in this example the granted quota allocation size would have to be decremented (for example, by halving until this condition is satisfied, as shown:

$$(2\% * 1 \text{ GB}) > (5 * 2 * 1.25 \text{ MB}), \text{ which passes the test}$$

The formula provided below enables the determination of the algorithm's precision for a given set of input parameters. In the majority of the cases, the tolerance values may be greater than the output value of the formula. However in some edge cases (for example, very small granted quota sizes and many concurrent active sessions and rating groups) the output value of the formula may be greater than the tolerance value, meaning that the shared balance threshold is at risk of being exceeded by that percentage amount.

$$\text{Maximum Quota Consumed} = \text{Max}\left\{ \left( \frac{\text{Shared Bal. Size} + \sum_{i=1}^{N} \sum_{j=1}^{M_i} \text{Min. AllocationSize}_{(Session_i; Rating\ Group_j)}}{\text{Shared Balance Size}} \right) * 100; T \right\}$$

where
N={Number of active sessions for the Shared Services Group}
$M_i$={Number of active Rating Groups within Session$_i$}
T={the specified Tolerance value}

As an example, consider a shared services group with 100 MB total quota, ten members, one session each with one rating group, and a minimum allocation size is set to 10 KB. In this example, the formula for determining the algorithm's precision becomes:

$$\text{Maximum Quota Consumed} = \text{Max}\left\{ \left( \frac{100 \text{ MB} + 10 * 1 * 1 * 0.01 \text{ MB}}{100 \text{ MB}} \right) * 100; 102 \right\}$$

$$= \text{Max}\{100.1; 102\}$$

$$= 102$$

Thus quota consumed will be between 100%-102% of 100 MB. Note that although 100%-100.1% precision could be reached by decreasing the allocation sizes until the minimum of 10 kilobytes is reached, the aim is to maintain acceptable system performance (by not going down to the minimum allocation size and thus sending fewer RARs) while the precision is still kept within the acceptable range of 100-102%.

In an additional example, consider a shared services group with 100 MB total quota, 250 members, one session each with 4 rating groups, and a minimum allocation size is set to 10 kilobytes. In this example, the formula for determining the algorithm's precision becomes:

$$\text{Maximum Quota Consumed} = \text{Max}\left\{\left(\frac{\frac{100 \text{ MB} + 250*1*}{4*0.01 \text{ MB}}}{100 \text{ MB}}\right)*100; 102\right\}$$

$$= \text{Max}\{110; 102\}$$

$$= 110$$

Thus quota consumed will be between 100%-110% of 100 MB. Note that this is the maximum precision reachable (for this edge case) by decreasing the allocation sizes to the minimum size of 10 kilobytes, since in the (highly unlikely) worst case scenario, when breaching the 100 MB balance size, all 250*4 rating groups will have 10 kilobytes quota allocated, and 99.99% used.

In an enhanced embodiment, session prioritization may be further used to determine which specific sessions are granted quota in a low balance condition, and which sessions are denied. For example, sessions for the primary account holder for a group account may have a higher priority than sessions for other subscribers within that group.

In an enhanced embodiment, sessions may be categorized in terms of the services being delivered and consumed within each session, and quota may be allocated based on the specific requirements of the specific service being consumed. This provides a more intelligent way of allocating quota, rather than granting equal quota amounts to each session.

Figure 7:
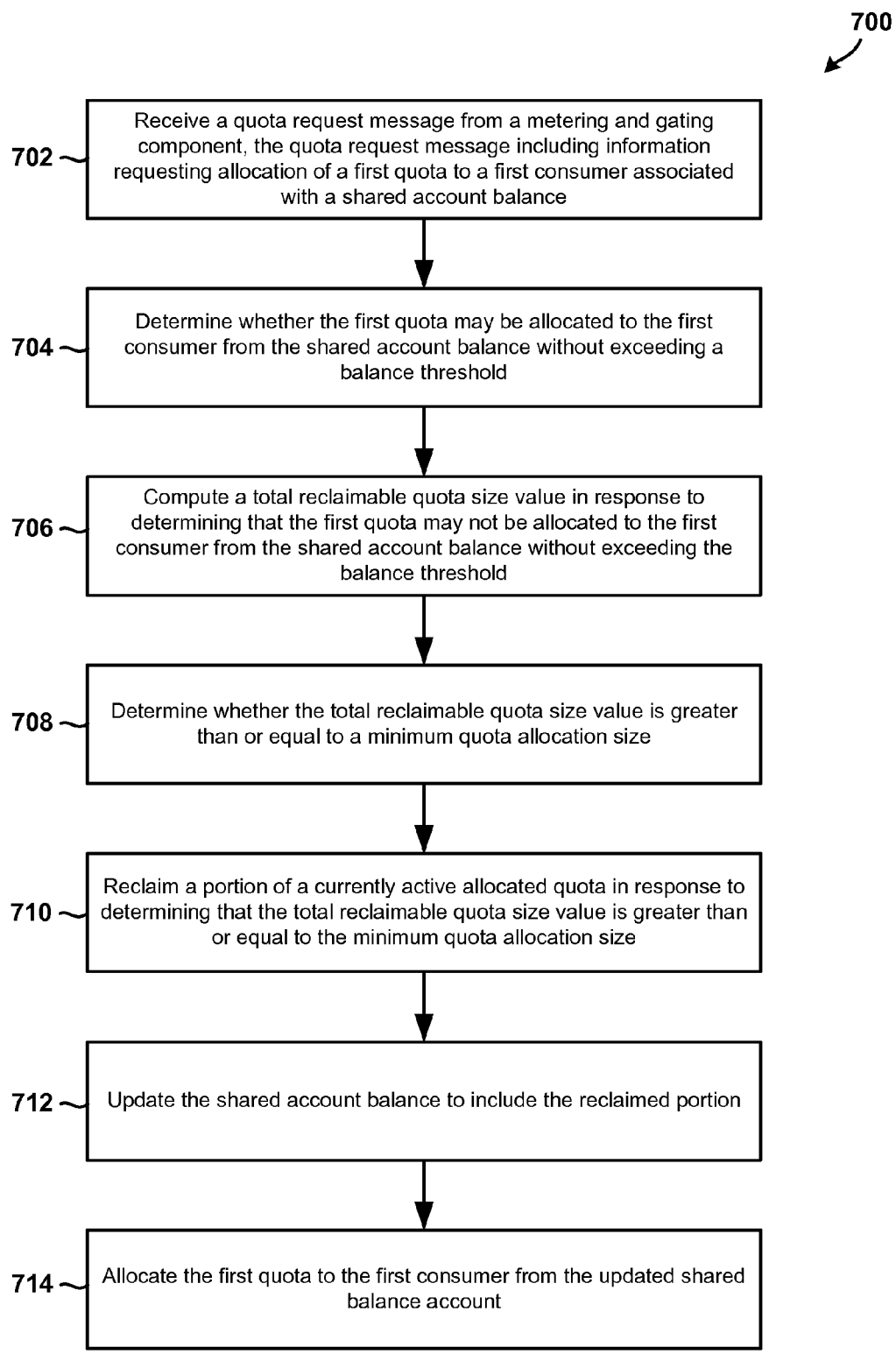
FIG. 7 is a process flow diagram illustrating a method for dynamically allocating quotas to consumers for the access and use of telecommunications network in accordance with an embodiment.

FIG. 7 illustrates method for dynamically allocating quotas in accordance with an embodiment. Method 700 may be performed by a processing core in a server computing device that includes or implements all or portions of a balance management component.

In block 702, the processing core may receive a quota request message from a metering and gating component. The quota request message may include information requesting allocation of a first quota to a first consumer associated with a shared account balance. In block 704, the processing core may determine whether the first quota may be allocated to the first consumer from the shared account balance without exceeding a balance threshold. In block 706, the processing core may compute a total reclaimable quota size value in response to determining that the first quota may not be allocated to the first consumer from the shared account balance without exceeding the balance threshold. In block 708, the processing core may determine whether the total reclaimable quota size value is greater than or equal to a minimum quota allocation size. In block 710, the processing core may reclaim a portion of a currently active allocated quota in response to determining that the total reclaimable quota size value is greater than or equal to the minimum quota allocation size. In block 712, the processing core may update the shared account balance to include the reclaimed portion. In block 714, the processing core may allocate the first quota to the first consumer from the updated shared balance account.

Figure 8:
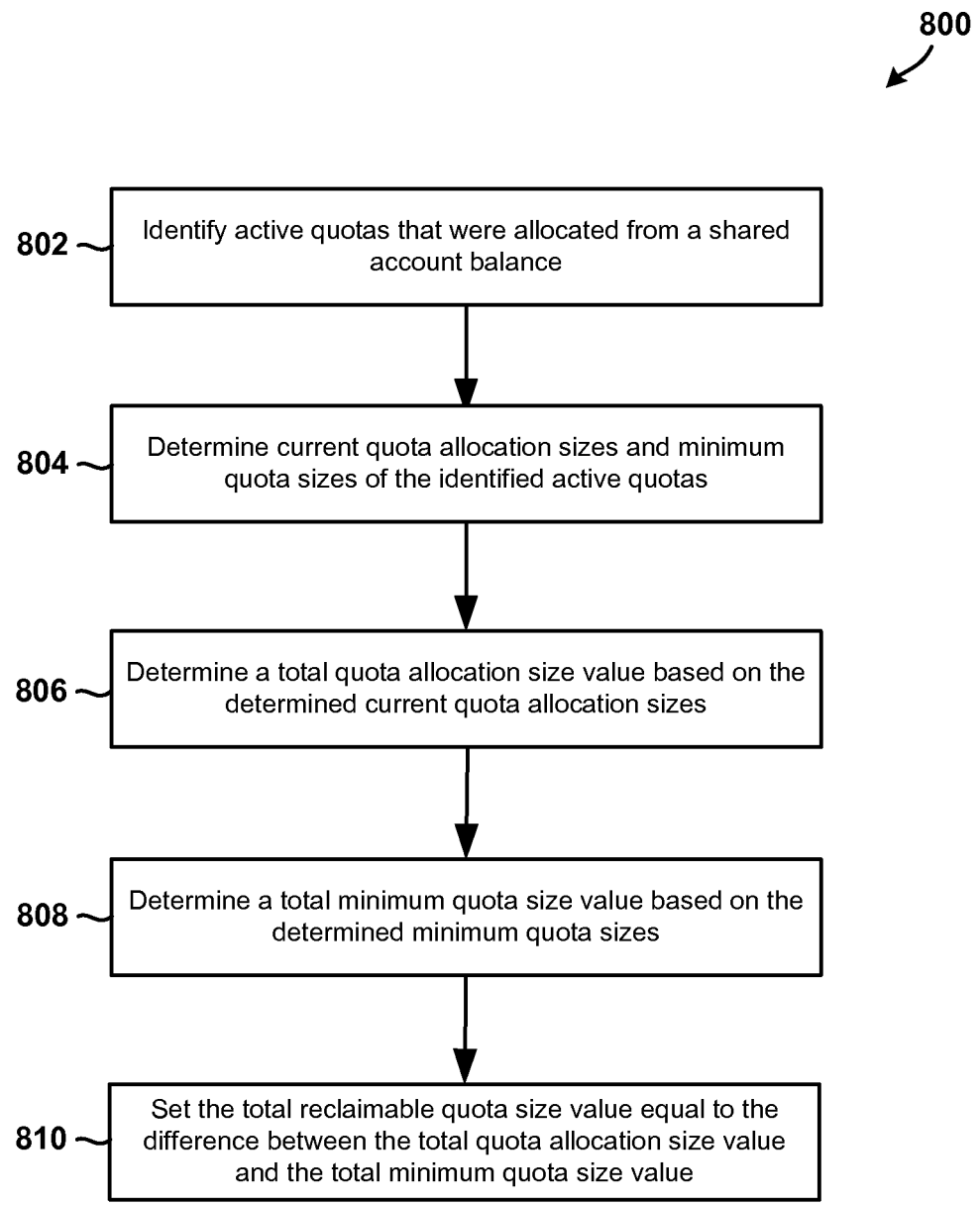
FIG. 8 is a process flow diagram illustrating a method for computing a total reclaimable quota size value that may be used to determine whether to reclaim quota in accordance an embodiment.

FIG. 8 illustrates method for determining the total reclaimable quota size value in accordance with an embodiment. Method 800 may be performed by a processing core in a server computing device that includes or implements all or portions of a balance management component.

In block 802, the processing core may identify active quotas that were allocated from a shared account balance. In block 804, the processing core may determine current quota allocation sizes and minimum quota sizes of the identified active quotas. In block 806, the processing core may determine a total quota allocation size value based on the determined current quota allocation sizes. In block 808, the processing core may determine a total minimum quota size value based on the determined minimum quota sizes. In block 810, the processing core may determine a total reclaimable quota size value based on a difference between the total quota allocation size value and total minimum quota size value. For example, the processing core may set the value of the total reclaimable quota size value to be equal to the difference between the total quota allocation size value and the total minimum quota size value.

Figure 9:
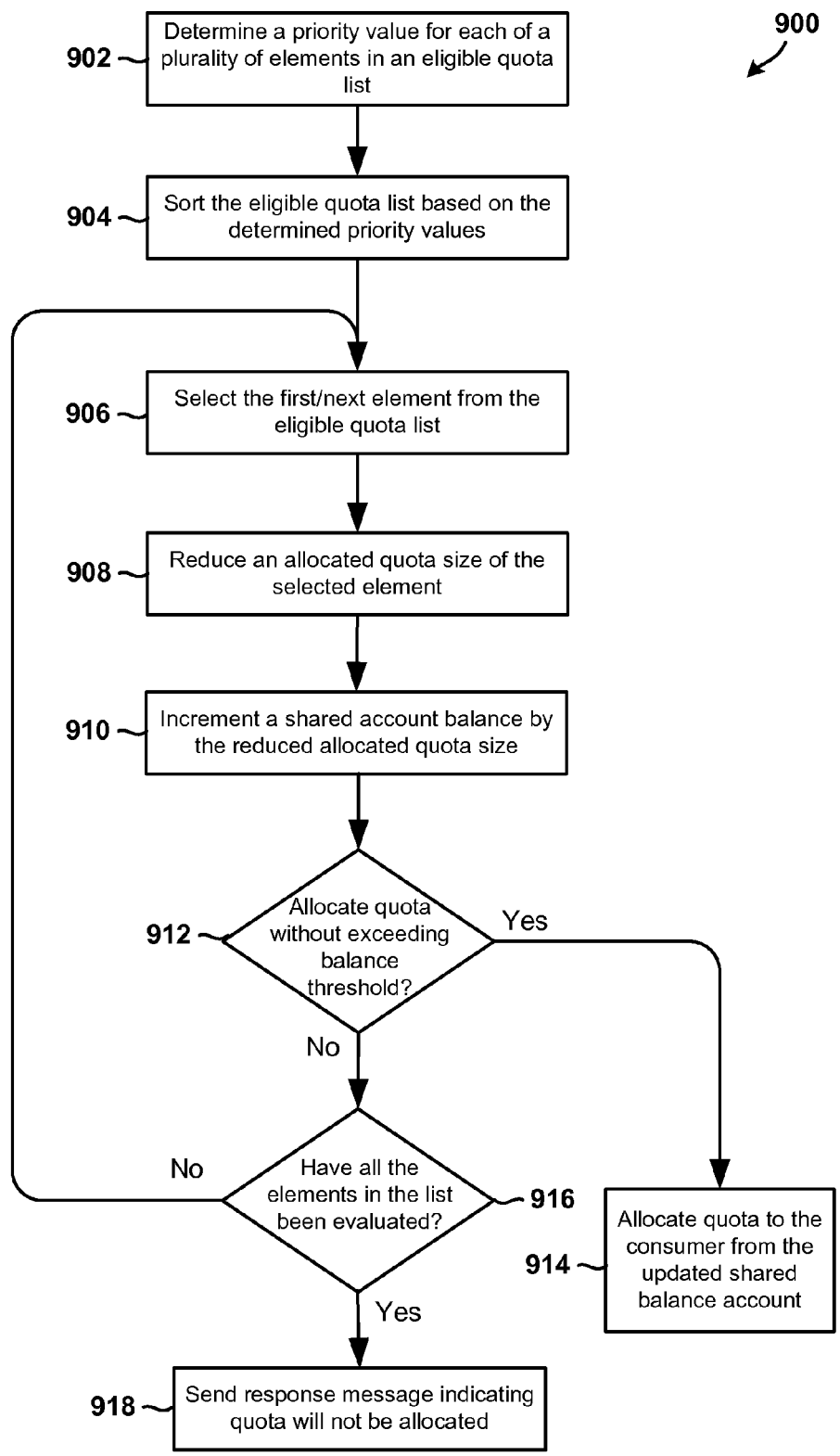
FIG. 9 is a process flow diagram illustrating a method of reclaiming allocated quotas in accordance with an embodiment.

FIG. 9 illustrates method for reclaiming portions of currently active allocated quota in accordance with an embodiment. Method 900 may be performed by a processing core in a server computing device that includes or implements all or portions of a balance management component.

In block 902, the processing core may determine a priority value for each of a plurality of elements in an eligible quota list. In block 904, the processing core may sort the eligible quota list based on the determined priority values. In block 906, the processing core may select the first or next element from the eligible quota list. In block 908, the processing core may reduce an allocated quota size of the selected element. In block 910, the processing core may increment a shared account balance by the reduced allocated quota size.

In determination block 912, the processing core may determine whether quota (e.g., access units, service unit allowances, etc.) may be allocated from the shared balance without exceeding a balance threshold, such as by determining whether the balance is greater than or equal to a quota allocation size value and/or a minimum quota allocation size value. In response to determining that quota may be allocated from the shared balance without exceeding a balance threshold (i.e., determination block 912="Yes"), in block 914, the processing core may allocate quota to the consumer from the updated shared balance account.

In response to determining that quota may not be allocated from the shared balance without exceeding a balance threshold (i.e., determination block 912="No"), in determination block 916, the processing core may determine whether all the elements in the eligible quota list been evaluated and/or reduced. In response to determining that all the elements in the eligible quota list been evaluated and/or reduced (i.e., determination block 916="No"), in block 918, the processing core may send a response message to the metering and gating component indicating that quota will not be allocated. In response to determining that all the elements in the eligible quota list been not yet evaluated and/or reduced (i.e., determination block 916="Yes"), the processing core may select the next element from the eligible quota list in block 906.

Figure 10:
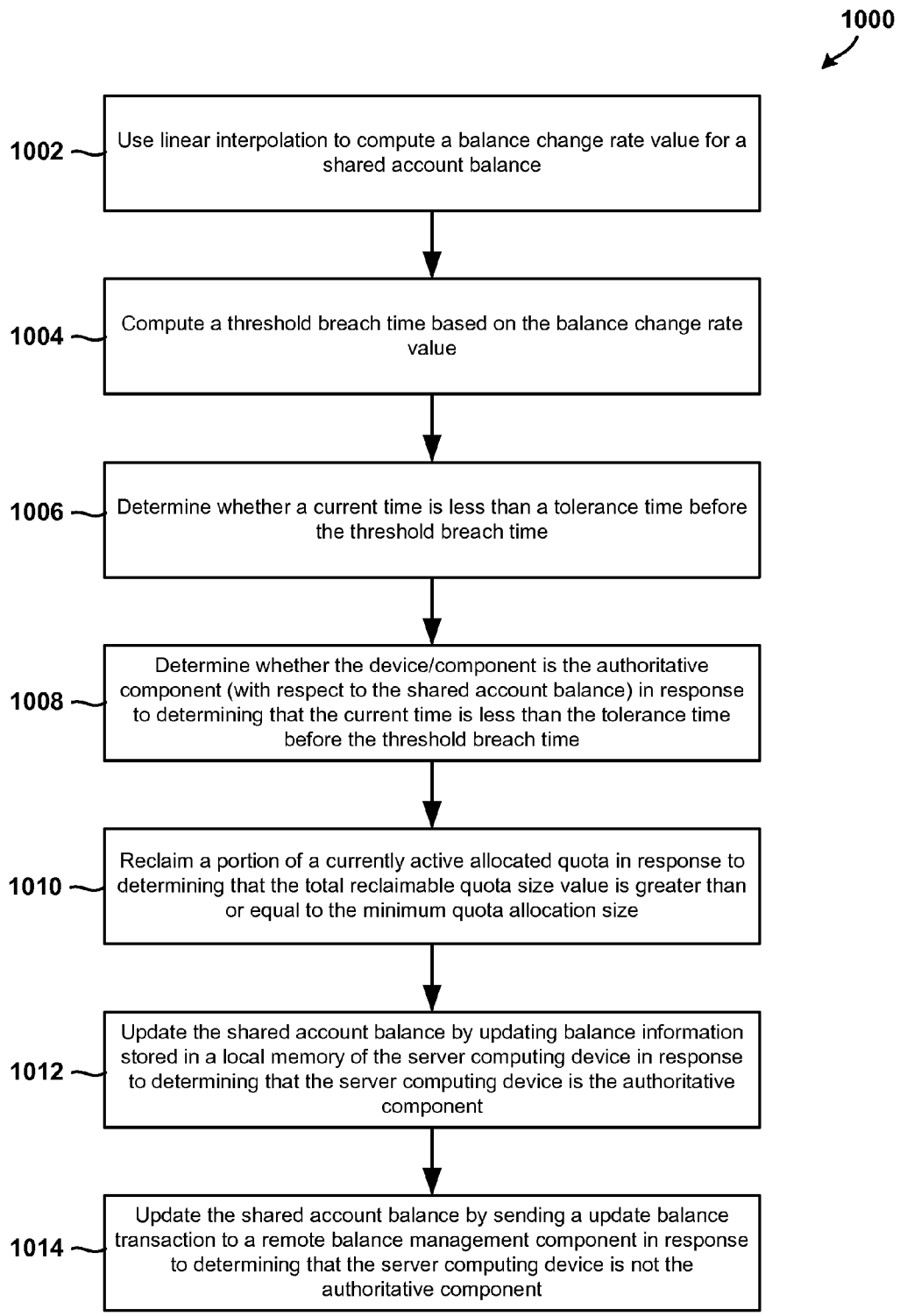
FIG. 10 is a process flow diagram illustrating a method of updating a distributed shared account balance in accordance with an embodiment.

FIG. 10 illustrates method 1000 for allocating quota to a consumer from a shared balance account in accordance with an embodiment. Method 1000 may be performed by a processing core in a server computing device that includes or implements all or portions of a balance management component.

In block 1002, the processing core may use a linear interpolation technique to compute a balance change rate value for a shared account balance. In block 1004, the processing core may compute a threshold breach time based on the balance change rate value. In block 1006, the processing core may determine whether a current time is less than a tolerance time before the threshold breach time. In block 1008, the processing core may determine whether the server computing device or balance management component is the authoritative component that has exclusive access to the shared account balance (or the most active component that is using the shared account balance) in response to determining that the current time is less than the tolerance time before the threshold breach time. In block 1010, the processing core may reclaim a portion of a currently active allocated quota in response to determining that the total reclaimable quota size value is greater than or equal to the minimum quota allocation size. In block 1012, the processing core may update the shared account balance by updating balance information stored in a local memory of the server computing device in response to determining that the server computing device is the authoritative component. In block 1014, the processing core may update the shared account balance by sending an update balance transaction to a remote balance management component in response to determining that the server computing device is not the authoritative component.

In an embodiment, the balance management component may be configured to receive a quota request message that requests the allocation of a first quota to a first consumer that is associated with a shared account balance, determine whether the first quota may be allocated to the first consumer from the shared account balance without exceeding a balance threshold, and compute a total reclaimable quota size value and determine whether the total reclaimable quota size value is greater than or equal to a minimum quota allocation size in response to determining that the first quota may not be allocated to the first consumer from the shared account balance without exceeding a balance threshold. The balance management component may reclaim a portion of a currently active allocated quota, update the shared account balance to include the reclaimed portion, and allocate the first quota to the first consumer from the updated shared balance account in response to determining that the total reclaimable quota size value is greater than or equal to a minimum quota allocation size.

In an embodiment, the balance management component may be configured to receive the quota request message, determine whether the first quota may be allocated to the first consumer from the shared account balance without exceeding a balance threshold, determine whether a second quota allocated to a second consumer from the shared account balance is eligible for reduction in response to determining that the first quota may not be allocated to the first consumer from the shared account balance without exceeding the balance threshold, and calculate a reduced quota allocation for the shared account balance in response to determining that the second quota allocated to a second consumer from the shared account balance is eligible for reduction. The balance management component may reclaim a portion of the second quota and update the shared account balance to include the reclaimed portion of the second quota in response to determining that the second quota is eligible for reduction. The balance management component may then allocate quota to the first consumer from the updated shared account balance and allocate a reduced quota to the second consumer from the updated shared balance account.

Various embodiments may include components configured to determine, identify, and/or classify the balance management component with the greatest amount of quota request or balance update transaction activity against the shared balance, or the balance management component that is most active in terms of frequency and/or magnitude of updates to the shared account balance, as being a principal, lead, primary, governing, authoritative, or controlling component (collectively "authoritative component") that is to be given exclusive access to the shared balance.

As described above, the various embodiments include methods, and server computing devices configured to implement the methods, for intelligently allocating quotas. For example, in an embodiment, a server computing device may be configured to receive a quota allocation request message that requests allocation of a quota to a consumer associated with a shared account balance (or a shared balance account), determine that the requested quota amount cannot be allocated from the shared account balance without exceeding a balance threshold, reclaim a portion of the currently active allocated quota (e.g., quota currently allocated to other consumers associated with the shared account balance), update the shared account balance to include the reclaimed portion, and allocate the requested quota to the consumer from the updated shared account balance.

Further embodiments include multi-site balance management solutions that reduce the probability of conflicts or discrepancies occurring between different instances of a single shared account balance when allocating quotas or performing other operations that include updating a balance (e.g., topping-up balances, etc.). For example, in an embodiment, a server computing device may be configured to receive a quota allocation request message that requests allocation of a quota to a consumer associated with a shared account balance, determine that the requested quota amount may be allocated from the shared account balance without exceeding a balance threshold, decrement a value stored in an instance of shared account balance (e.g., a local copy of the balance that is stored in memory) by the requested quota amount, determine a validity period or expiration time for the quota allocation so that the quota allocation will expire with enough time (before and after the expiration) to allow notification messages (e.g., change notification messages, etc.) to propagate to other components that update or use the shared account balance, allocate the quota by generating and sending a quota allocation message that identifies the allocated quota amount and the determined validity period (or expiration time), and notify others of the changes to the shared account balance by generating and sending notification messages (change notification messages, etc.) to the components that update or use the shared account balance.

In various embodiments, the server may determine the validity period for the quota allocation by determining the number of components that access/update the shared account balance, determining a notification message propagation latency time value that identifies the amount of time (e.g., the maximum or longest time) required for the notification messages to propagate between the identified components, determining an allocation time interval (or duration) in which the previous quota allocations are due to expire (and thus a new quota allocation may be requested), and/or determining a window time interval (or duration) during which all the identified components have sufficient time to issue new quota allocations in their respective allocation time intervals.

In an embodiment, the server computing device may be configured to set the validity period/expiration time based on the allocation time interval. For example, the server may be configured to set the expiration time so that the quota expires within its allocation time interval. The server may also be configured to set the expiration time of a quota allocation to be equal to a reference time plus the allocation time interval.

By intelligently setting the quota allocation validity periods in this manner, the various embodiments may ensure the balance information to remain consistent and up-to-date in all the components that update or use the shared balance account. As a result, these components may concurrently allocate quota from the shared account balance with little or no loss (e.g., revenue loss, etc.) to the mobile network. The components may also concurrently allocate quota from the shared account balance without performing complex reconciliation operations or erroneously triggering threshold breaches. This, in turn, improves the performance, reliability, and functionality of the telecommunication network in which the components are deployed.

Figure 11:
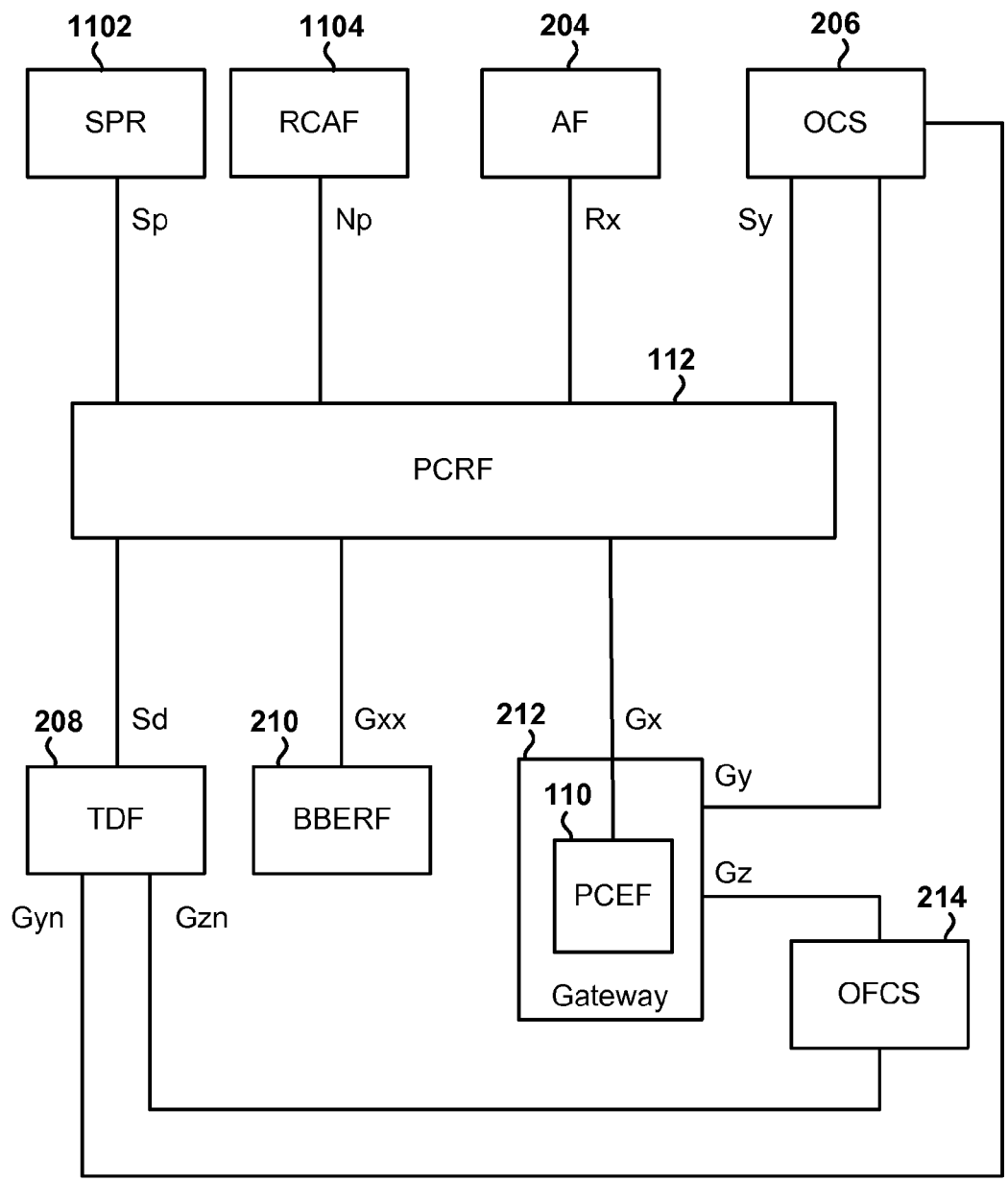
FIG. 11 is a system block diagram illustrating various additional or alternative components that may be included in a single site deployment of a 3GPP-based policy and charging control (PCC) network that is suitable for implementing the various embodiments.

FIG. 11 illustrates various additional or alternative components that may be included in a single site deployment of a 3GPP-based PCC network 200 (illustrated in FIG. 2) that is suitable for implementing the various embodiments. Specifically, FIG. 11 illustrates that, in addition to the components illustrated in FIG. 2, the PCC network 200 may include a subscriber profile repository (SPR) 1102 component and a RAN Congestion Awareness Function (RCAF) 1104 component. The PCRF 112 component may be connected to the SPR 1102 and RCAF 1104 components via the Diameter Sp and Np interfaces/reference points, respectively. The TDF 208 component may be connected to the OCS 206 and OFCS 214 components via the Diameter Gyn and Gzn interfaces/reference points, respectively. The PCEF 110 component and/or the TDF 208 component may include all or portions of a metering and gating component (MAGC). The OCS 206 component may include all or portions of a balance management component (BMC).

The metering and gating component may be configured to communicate with the balance management component to request, receive, update, refresh, report and/or terminate quota allocations. This may be accomplished by sending and receiving various communication messages, such as an initial quota allocation request message, an update quota allocation message (which may include details of the quota allocation that was used), a quota allocation refresh message, a termination message, or any of their corresponding response messages. An initial quota allocation request message may be a Diameter CCR-I message. An update quota allocation message may be a Diameter CCR-U message. A quota allocation refresh message may be a Diameter RAR message. The termination message may be a Diameter CCR-T message. The response messages may be a Diameter CCA message, a Diameter RAA message, etc.

As discussed above, balance management components operate in real-time to control consumers' use of network resources, services, and applications. As such, these components are required to be highly available and have very high throughputs. In order to meet these requirements, these components (both the application and the persistent storage components) are typically deployed in an active-active configuration. That is, these components are typically deployed across two or more geographically dispersed sites, and each of them may actively support and process all or a subset of the consumers (e.g., user equipment devices) in the network.

Figure 12:
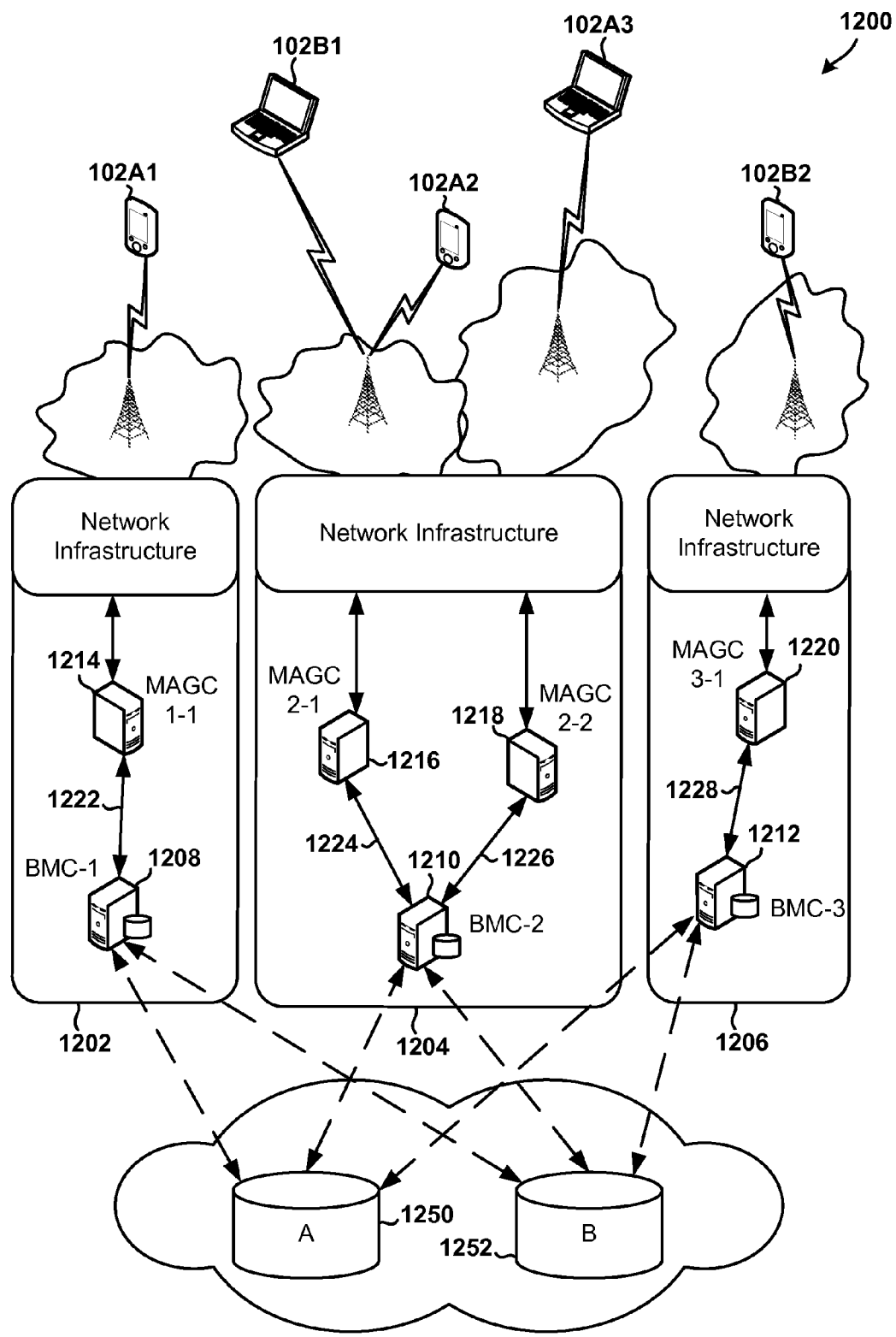
FIG. 12 is a system block diagram illustrating an embodiment telecommunication system that includes geographically dispersed components that may be configured to allocate quota from a shared account balance in accordance with the various embodiments.

FIG. 12 illustrates an example system 1200 that includes balance management components 1208-1212 deployed in an active-active configuration in geographically dispersed sites 1202-1206. Each geographically dispersed site 1202-1206 includes components responsible for managing the use of services by one or more user equipment 102A1, 102A2, 102A3, 102B1, 102B2 devices. The first site 1202 includes a balance management component (BMC-1) 1208 and a metering and gateway component (MAGC-1-1) 1214. The second site 1204 includes another balance management component (BMC-2) 1210, a first metering and gateway component (MAGC-2-1) 1216, and a second metering and gateway component (MAGC-2-2) 1218. The third site 1206 includes yet another balance management component (BMC-3) 1212 and a metering and gateway component (MAGC-3-1) 1220.

Components that are in the same site 1202, 1204, 1206 may communicate via wired or wireless communication links. For example, in the first site 1202, MAGC-1-1 1214 may request quota for user equipment 102A1 from BMC-1 1208 via a communication link 1222, and BMC-1 1208 may send a quota allocation response message to the MAGC-1-1 1214 via the communication link 1222. Similarly, BMC-2 1210 may include communication links 1224, 1226 for communicating with MAGC-2-1 1216 and MAGC-2-2 1218, respectively. BMC-3 1212 may include a communication link 1228 for communicating with MAGC-3-1 1220 in the third site 1206.

Shared account balances 1250, 1252 may include, store, and/or represent information as units or values that may be incremented or decremented as quota is allocated, as a service is consumed by a customer (e.g., by a UE 102 device, etc.), as top-up payments are made, etc. As examples, the shared account balances 1250, 1252 may include information related to time (e.g., number of voice minutes used, etc.), data (e.g., number of bytes used, etc.), monetary values, event services (e.g., SMS messages, etc.), session-based services (e.g., an Internet browsing session, etc.), or any other information that may be used to authorize or meter the use of a service by a UE 102 device. In an embodiment, the shared account balances 1250, 1252 may include a quantity of service unit allowances. As discussed above, a service unit allowance may be a value, unit, or structure that is suitable for determining the amount of services that are to be provided by the components in the telecommunication network to the consumer.

The metering and gating components 1214-1220 may request and receive quota allocations from the balance management components 1208-1212. The balance management components 1208-1212 may allocate quota by accessing and updating information stored in the shared account balances 1250, 1252. Shared account balance (A) 1250 may store service unit allowances that are used concurrently by UEs 102A1, 102A2, 102A3. Shared account balance (B) 1252 may store service unit allowances that are used by two UEs 102B1 and 102B2. UEs 102A1, 102A2, 102A3 may belong to different users/consumers that are in different sites 1202, 1204, 1206. UEs 102B1, 102B2 may belong to the same user/consumer.

Since UEs 102 in different sites 1202-1206 use the same shared account balances 1250, 1252, the information stored in the shared account balances 1250, 1252 may be modified concurrently by balance management components 1208-1212 in different sites 1202-1206. To accomplish this, each of the balance management components 1208-1212 may update a local copy of the shared account balance 1250, 1252, and send communication messages to the other balance management components 1208-1212 to inform them of the changes to the shared account balances 1250, 1252.

Figure 13A:
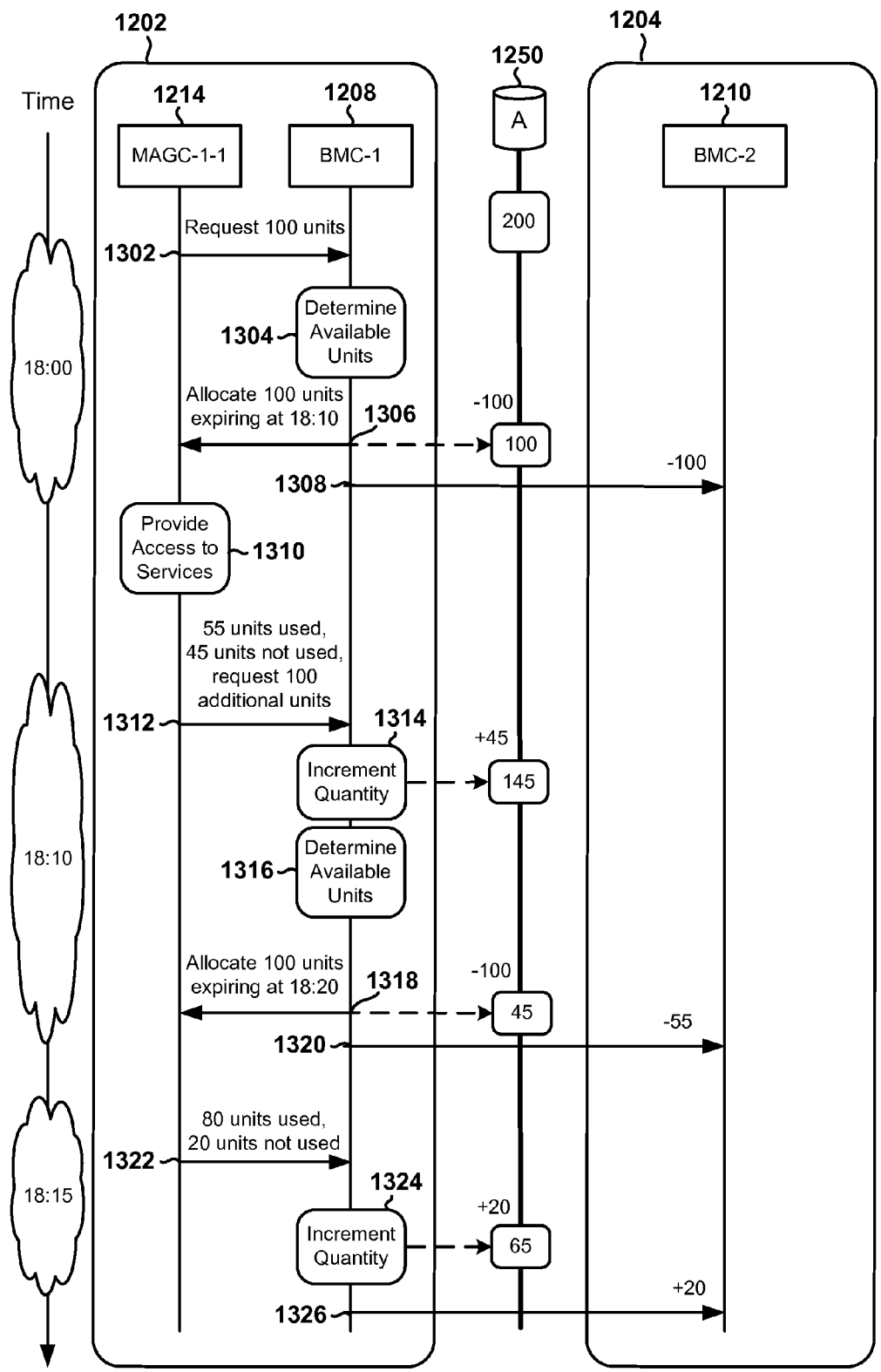
FIGS. 13A through 13E illustrate various operations and information flows in a telecommunication system that includes geographically dispersed components that allocate quota from a shared account balance in accordance with various embodiments.
Figure 13B:
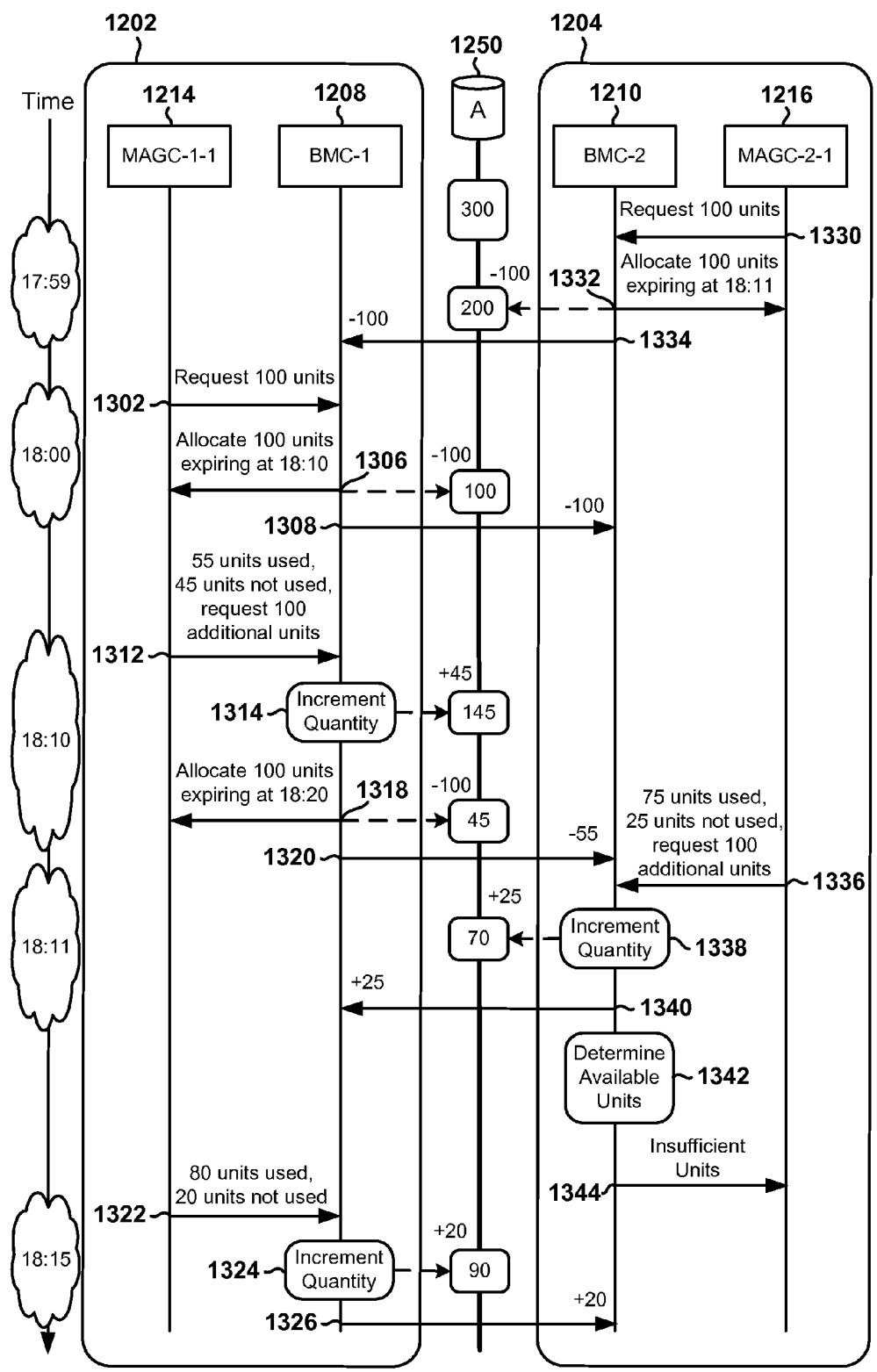
Figure 13C:
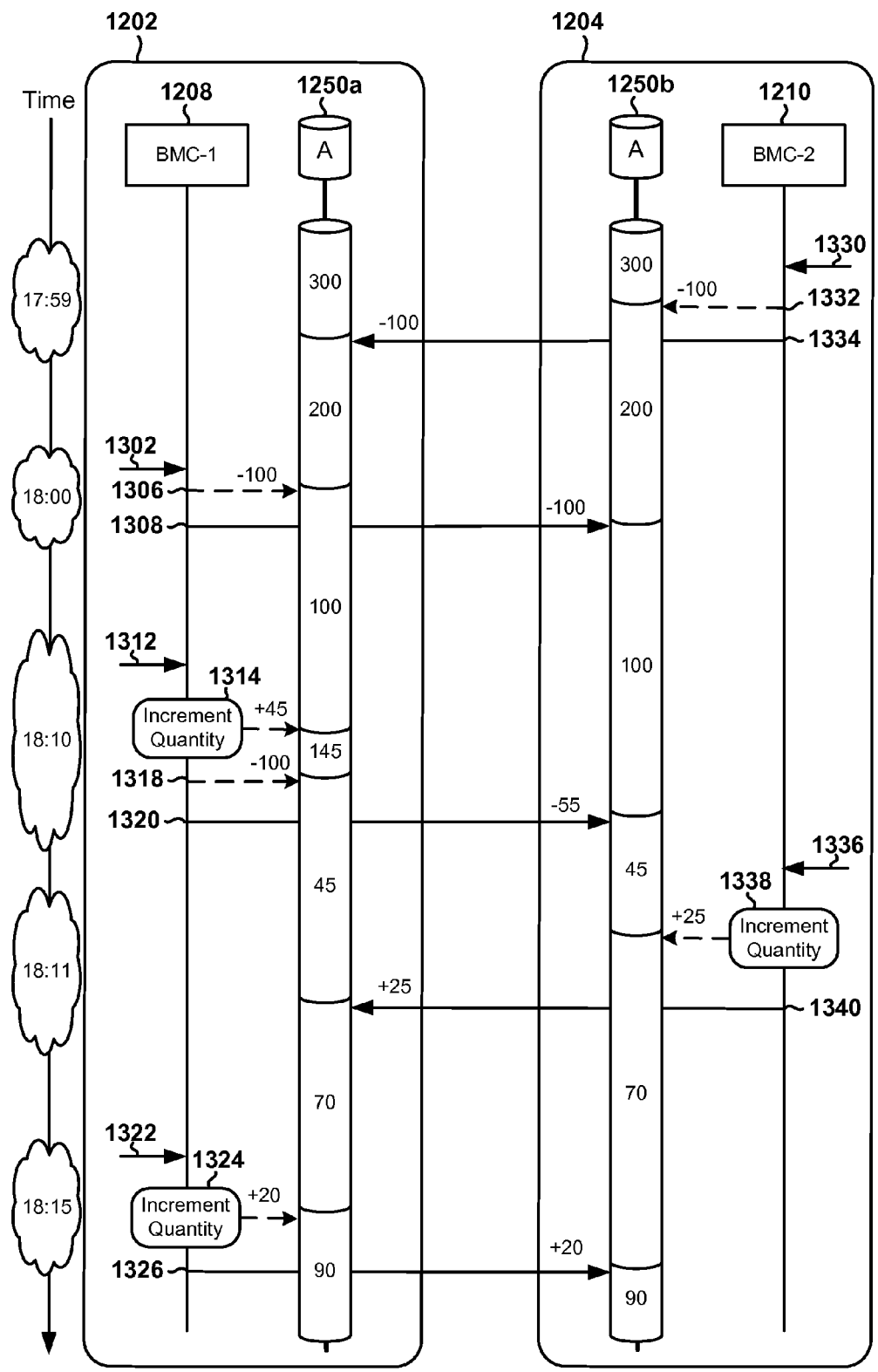
Figure 13D:
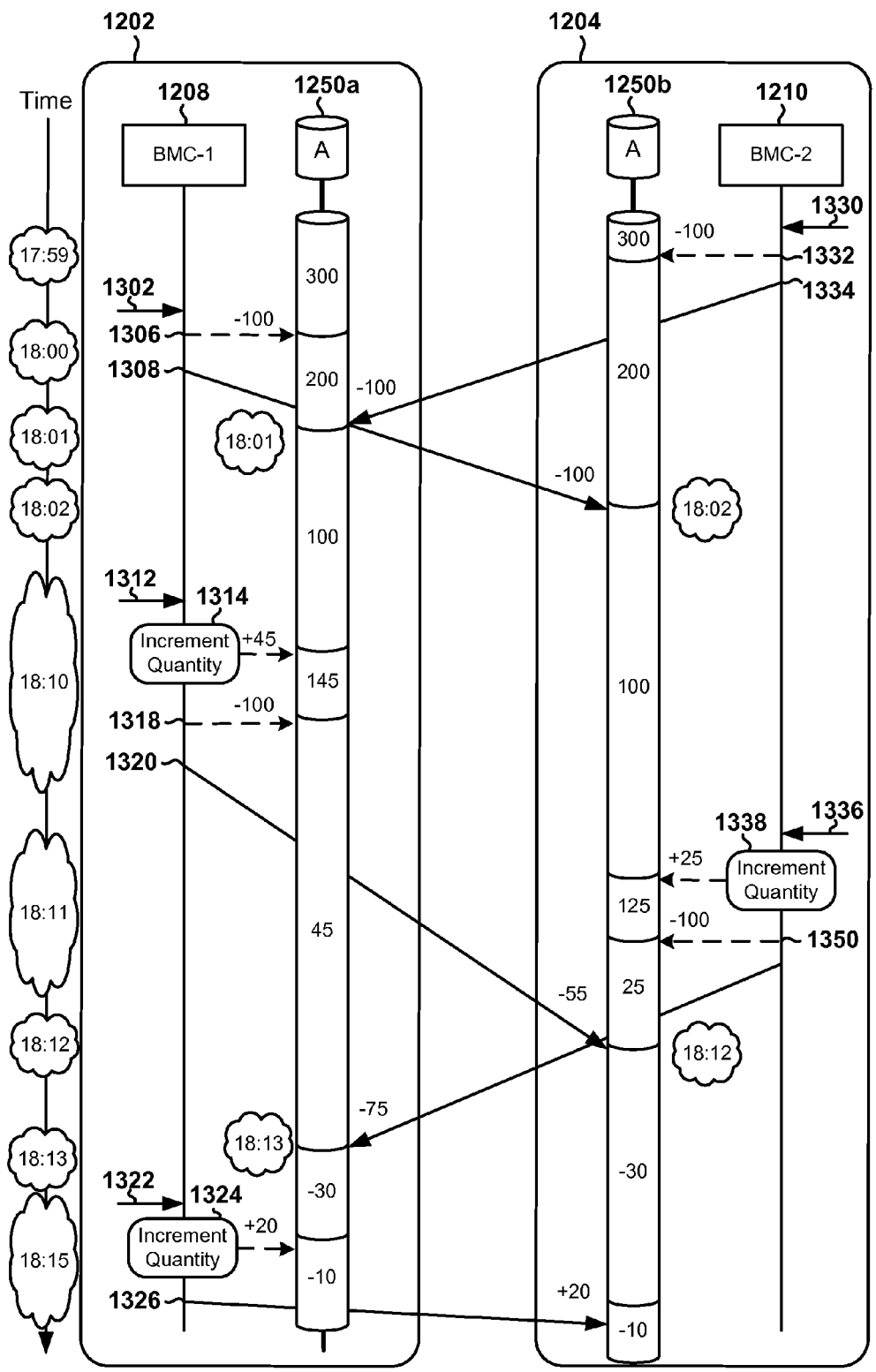
Figure 13E:
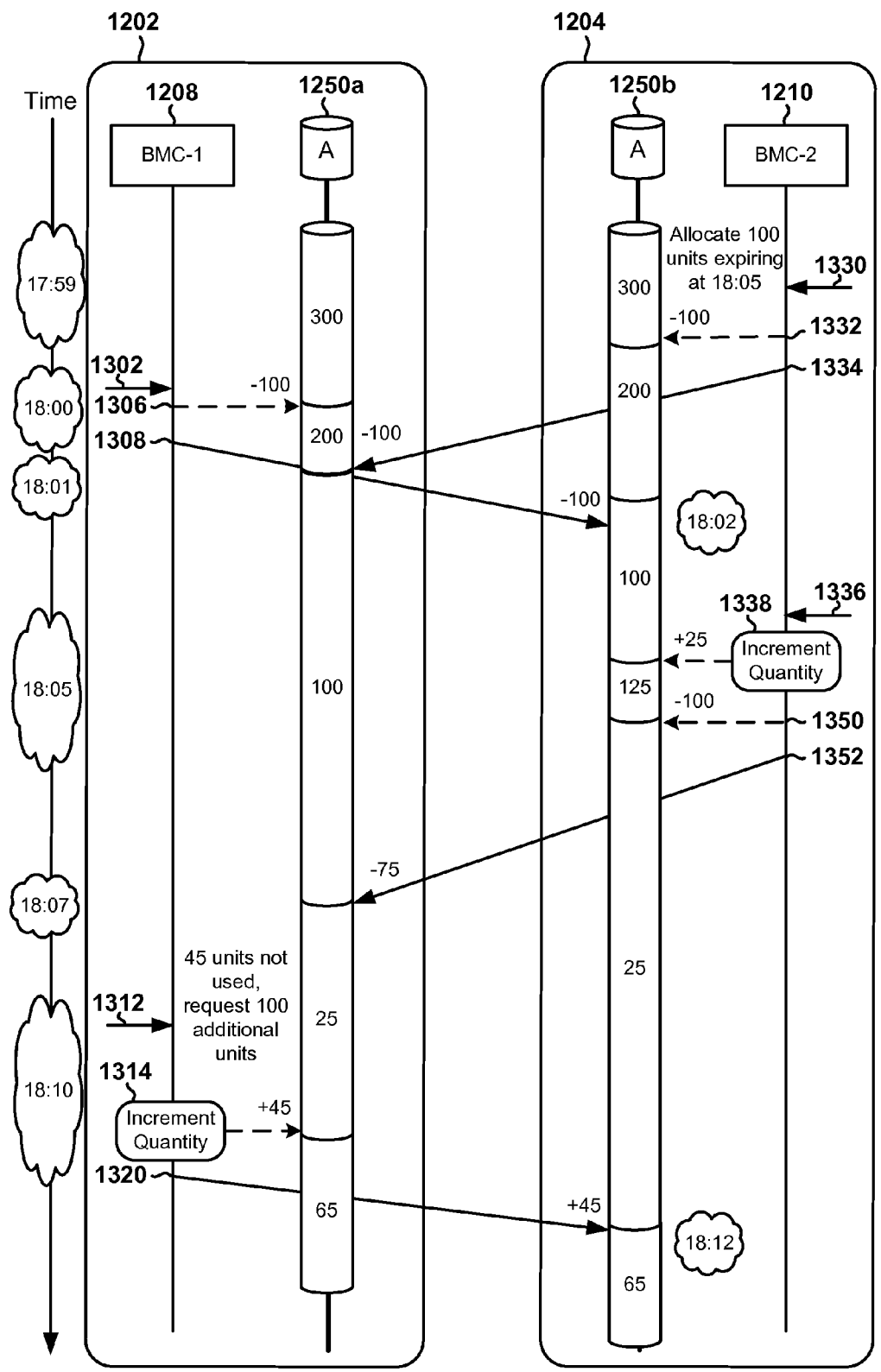

FIGS. 13A through 13D illustrate various operations and information flows in the system 1200 illustrated in FIG. 12. In the example illustrated in FIG. 13A, MAGC-1-1 1214 in the first site 1202 requests quota from the shared account balance 1250. In the example illustrated in FIG. 13B, MAGC-1-1 1214 and MAGC-2-1 1216 concurrently request quota from the shared account balance 1250. FIG. 13C illustrates that BMC-1 1208 and BMC-2 1210 may concurrently allocate quota from the shared account balance 1250 by updating local shared account balances 1250a, 1250b and communicating the updates via change notification messages. FIG. 13D illustrates that the propagation times of the notification messages may cause the system to incorrectly breach a quantity threshold. FIG. 13E illustrates that incorrect quantity threshold breaches may be averted by intelligently setting the quota validity periods or expiration times.

With reference to FIG. 13A, prior to time 18:00, the quantity of service unit allowances in the shared account balance 1250 is 200 units. In operation 1302, at time 18:00, MAGC-1-1 1214 may request a quota allocation from BMC-1 1208 for a first consumer (e.g., UE 102A1, etc.) that is associated with the shared account balance 1250. This may be accomplished via MAGC-1-1 1214 generating and sending a quota allocation request message to BMC-1 1208. As discussed above, a quota allocation request message may request a specific quota size by specifying an allocation unit. In the example illustrated in FIG. 13A, MAGC-1-1 1214 generates and sends a quota allocation request message that specifies an allocation unit of 100 units (i.e., the message requests the specific quota size of 100 units).

In operation block 1304, BMC-1 1208 may receive the quota allocation request message from MAGC-1-1 1214, and in response, determine whether the requested quota size/amount may be allocated from the shared account balance without exceeding a threshold. For example, the threshold may be a zero threshold, and BMC-1 1208 may determine whether the quantity of service unit allowances in the shared account balance 1250 is greater than the requested quota size/amount. In response to determining that quota may be allocated from the shared account balance without exceeding the threshold (e.g., that the 200 units in the shared account balance 1250 is greater than the 100 requested units), in operation 1306, BMC-1 1208 may allocate quota by decrementing the quantity of service unit allowances (200 units) by the requested quota size (i.e., 100 units), and generating and sending a quota allocation response message to MAGC-1-1 1214. As discussed above, a quota allocation response message may include an allocated quota size value, a validity period or expiration time value, location/address information, and information identifying the consumer to which the quota was allocated. In the example illustrated in FIG. 13A, the message includes an allocated quota size value of 100 units and an expiration time value of "18:10." Alternatively, the message could include a validity period value of 10 minutes. After operation 1306, the quantity of service unit allowances in the shared account balance 1250 is 100 units (i.e., 200 units–100 units=100 units).

In some embodiments, rather than decrementing the quantity of service unit allowances in the shared account balance 1250, BMC-1 1208 may increment a total allocations value in operation 1306. These embodiments are discussed in more detail further below (e.g., with reference to FIGS. 16A-20, etc.).

Returning to FIG. 13A, in operation 1308, BMC-1 1208 may generate and send a notification message (e.g., a change notification message, etc.) to BMC-2 1210 to notify BMC-2 1210 of the changes to shared account balance 1250 (i.e., that the quantity of service unit allowances in the shared account balance 1250 has been decremented by 100 units, that 100 units remain, etc.). In operation block 1310, MAGC-1-1 1214 may receive the quota allocation response message from BMC-1 1208, and in response, begin providing the first consumer access to services. Also in operation block 1310, MAGC-1-1 1214 may monitor and meter usage of the services by the first consumer, and decrement the allocated quota size (e.g., the 100 allocated service unit allowances) as the services are used or consumed.

At time 18:10, MAGC-1-1 1214 may determine that the validity period has expired (e.g., that the current time is equal to the expiration time value of the received quota allocation response message, etc.). In response, in operation 1312, MAGC-1-1 1214 may generate and send an update quota request message to BMC-1 1208. The update quota request message may include a request for the allocation of additional quota, information identifying the amount of the previously allocated quota that was consumed, and information identifying the amount of previously allocated quota that has not been used. The update quota request message may also request a specific quota size (e.g., by specifying an allocation unit). In the example illustrated in FIG. 13A, the update quota request message specifies an allocation unit of 100 units (i.e., requests a quota size of 100 units). The update quota request message also indicates that the first consumer has consumed 55 units, and that 45 of the previously allocated units remain unused.

In operation block 1314, BMC-1 1208 may receive the update quota request message, and in response, increment the quantity of service unit allowances in the shared account balance 1250 by the amount of units indicated as not used in the received update quota request message. In the example illustrated in FIG. 13A, BMC-1 1208 increments the service unit allowances in the shared account balance 1250 by 45 units. After operation block 1314, the quantity of service unit allowances in the shared account balance 1250 is 145 units in the illustrated example.

In operation block 1316, BMC-1 1208 may determine whether the requested quota size/amount may be allocated from the shared account balance without exceeding the threshold (e.g., zero threshold, etc.). For example, BMC-1 1208 may determine whether the 145 units in the shared account balance 1250 is greater than the 100 units requested in the update quota request message. In response to determining that quota may be allocated from the shared account balance without exceeding the threshold (e.g., 145>100), in operation 1318, BMC-1 1208 may allocate the requested quota by decrementing the quantity of service unit allowances in the shared account balance 1250 by the quota allocation unit, and generating and sending an update quota response message to MAGC-1-1 1214. In the example illustrated in FIG. 13A, BMC-1 1208 decrements the available quantity of service unit allowances by the 100 units (45 units remain available in the shared account balance 1250). BMC-1 1208 also generates/sends an update quota response message that includes an allocated quota size value of 100 units and an expiration time value of "18:20." In operation 1320, BMC-1 1208 may generate and send a notification message to BMC-2 1210 to notify BMC-2 1210 of the changes to the shared account balance 1250 (i.e., that 55 units have been decremented, that 45 units remain available, etc.).

Operations 1310-1320 may be performed repeatedly until MAGC-1-1 1214 terminates the service and sends a corresponding update message to BMC-1 1208 or until the available shared balance is insufficient to support any further quota allocation requests. In operation 1322, MAGC-1-1 1214 may terminate the service and send a termination message to BMC-1 1208. In the example illustrated in FIG. 13A, MAGC-1-1 1214 sends a termination message that indicates that 80 of the previously allocated units have been consumed and 20 of the previously allocated units remain unused. Since the service has been terminated, no additional quota allocation is requested by this message.

In operation block 1324, BMC-1 1208 may increment the quantity of service unit allowances in the shared account balance 1250 by the amount of units indicated as not used in the received termination message. In the example illustrated in FIG. 13A, BMC-1 1208 increments the quantity of service unit allowances in the shared account balance 1250 by 20 units. After operation block 1324, the quantity of service unit allowances in the shared account balance 1250 is 65 units. In operation 1326, BMC-1 1208 may notify BMC-2 1210 of the updates or changes to the quantity of service unit allowances in the shared account balance 1250 by generating and sending a notification message to BMC-2 1210.

FIG. 13B illustrates that balance management components 1208, 1210 in different sites 1202 and 1204 may allocate quota from the same shared account balance 1250 for a first and second consumer (e.g., UE 102A1 and UE 102A2). In the example illustrated in FIG. 13B, MAGC-1-1 1214 and BMC-1 1208 perform operations 1302-1326 discussed above with reference to FIG. 13A. However, unlike the example illustrated in FIG. 13A, MAGC-2-1 1216 concurrently requests quota allocations from the shared account balance 1250 for a second consumer.

With reference to FIG. 13B, prior to time 17:59, the quantity of service unit allowances in the shared account balance 1250 is 300 units. In operation 1330, MAGC-2-1 1216 may generate and send a quota allocation request message to BMC-2 1210 to request a quota allocation of 100 units for the second consumer. In operations 1330 and 1332, BMC-2 1210 may receive the quota allocation request message, determine that the requested quota size/amount may be allocated from the shared account balance without exceeding the threshold (e.g., the 300 available units is greater than the 100 requested units), and in response, allocate quota by decrementing the quantity of available service unit allowances (e.g., 300 units) by the quota allocation unit (e.g., 100 units), generating a quota allocation response message that includes an allocated quota size value (e.g., 100 units) and an expiration time value (e.g., 18:11), and sending the generated quota allocation response message to MAGC-2-1 1216. In operation 1334, BMC-2 1210 may notify BMC-1 1208 of the updates or changes to shared account balance 1250, such as that the quantity of service unit allowances in the shared account balance 1250 has been decremented by 100 units or that the available balance is now 200 units.

Between time 18:00 and time 18:11, MAGC-1-1 1214 and BMC-1 1208 may perform operations 1302-1320 discussed above with reference to FIG. 13A. After operation block 1320, the quantity of service unit allowances in the shared account balance 1250 is 45 units.

In operation 1336, MAGC-2-1 1216 may determine that its quota validity period has expired (i.e., that the current time is 18:11), and in response, generate and send an update quota request message to BMC-2 1210. In the example illustrated in FIG. 13B, the update quota request message specifies an allocation unit of 100 units (i.e., requests a quota size of 100 units). The update quota request message also indicates that the second consumer has consumed 75 units of the previously allocated quota, and that 25 previously allocated units remain unused. In operation block 1338, BMC-2 1210 may receive the update quota request message from MAGC-2-1 1216, and in response, increment the quantity of service unit allowances in the shared account balance 1250 by the unused units (i.e., by 25 units in this example). After operation block 1338, the quantity of service unit allowances in the shared account balance 1250 is 70 units in the illustrated example. In operation 1340, BMC-2 1210 may notify BMC-1 1208 of the updates to the shared account balance 1250 (e.g., that an additional 25 units are now available).

In operation block 1342, BMC-2 1210 may determine whether the requested quota size/amount can be allocated from the shared account balance without exceeding the threshold (e.g., zero threshold, etc.). For example, BMC-2 1210 may determine whether the quantity of service unit allowances in the shared account balance 1250 is greater than the quota allocation unit specified in the received update quota request message. In response to determining that the available balance is not greater than the quota allocation unit (i.e., that the 70 available units is not greater than 100 requested units), BMC-2 1210 may notify MAGC-2-1 1216 that quota will not be allocated in operation 1344 (alternatively, BMC-2 1210 could allocate a smaller quota via the dynamic quota allocation methods discussed above).

At 18:15, in operation 1322, MAGC-1-1 1214 may terminate the service and send a termination message or an update quota request message to BMC-1 1208. In the example illustrated in FIG. 13B, MAGC-1-1 1214 sends a termination message that indicates that 80 of the previously allocated units have been consumed, 20 of the previously allocated units remain unused, and that no further quota allocation is requested. In operation block 1324, BMC-1 1208 may increment the quantity of service unit allowances in the shared account balance 1250 by the unused units. In this example, BMC-1 1208 increments the quantity of service unit allowances in the shared account balance 1250 by 20 units and 90 units are now available. In operation 1326, BMC-1 1208 may notify BMC-2 1210 of the changes to the shared account balance 1250.

FIG. 13C illustrates that each of the balance management components 1208 and 1210 modifies a local copy of the shared account balance 1250. For example, in operation 1332, BMC-2 1210 decrements 100 units from its local shared account balance 1250b. In operation 1334, BMC-2 1210 sends a notification message to BMC-1 1208 to inform it of the updated quantity of service unit allowances in the shared account balance 1250, and in response, BMC-1 1208 updates the information in its local shared account balance 1250a.

After operation 1332, the quantity of service unit allowances in the local shared account balance 1250b of BMC-2 1210 is 200 units in the illustrated example. However, the quantity of service unit allowances in local shared account balance 1250a of BMC-1 remains 300 units until BMC-1 1208 receives the notification message in operation 1334. This difference will not impact the operations of the system if the notification messages are transmitted instantaneously or near instantaneously. However, due to the high volume of transactions in high-speed networks and the geographical distributed nature of the balance management components, any significant delay in the transmission and reception of the notification messages may cause incorrect threshold breaches.

FIG. 13D illustrates that the propagation times of the notification messages may cause the system to malfunction (e.g., by causing incorrect threshold breaches, etc.). As mentioned above, due to the geographically distributed nature of the balance management components 1208-1212, it may take a significant amount of time for the notification messages to propagate to the other components. For example, it may take up to two minutes for a notification message to propagate from BMC-1 1208 to BMC-2 1210, and vice-versa. During this propagation delay, one or more of the balance management components 1208-1212 may store outdated information in their local shared account balances, and as a result, allocate quota based on units that are no longer available or otherwise cause a threshold to be erroneously breached.

In the example illustrated in FIG. 13D, at 17:59, in operation 1332, the BMC-2 1210 decrements 100 units from the quantity of service unit allowances in its local shared account balance 1250*b*. Also at 17:59, in operation 1334, the BMC-2 1210 sends a notification message to BMC-1 1208 to inform it of the updated quantity of service unit allowances in the shared account balance 1250. Due to the two (2) minute propagation delay, BMC-1 1208 does not receive this notification message until 18:01—after it has allocated the 100 units in operation 1306 and sent a notification message to BMC-2 1210 in operation 1308. In this case, other than including erroneous information in the notification message, the outdated quantity information does not cause the system to function improperly. However, when the transactions are closer in time or when the quantity of service unit allowances in the shared account balance 1250 is sufficiently low, this may cause the system to allocate quota based on units that are no longer available or to otherwise cause an erroneous threshold breach.

For example, at 18:10, in operation block 1314, BMC-1 1208 receives an update quota request message. In response, BMC-1 1208 increments the quantity of service unit allowances in its local shared account balance 1250*a* by 45 units, and the quantity of service unit allowances in local shared account balance 1250*a* is increased (e.g., to 145 units). Then, as discussed above with reference to FIG. 13B, BMC-1 1208 determines that the quantity of service unit allowances in the shared account balance 1250 (145 units) is greater than the quota allocation unit (100 units), and allocates the requested quota by decrementing the quantity of service unit allowances in the shared account balance 1250 by the quota allocation unit (100 units) in operations 1316 and 1318. After these operations, the quantity of service unit allowances in the shared account balance 1250*a* is 45 units in the illustrated example. In operation 1320, BMC-1 1208 sends a notification message to BMC-2 1210 to notify BMC-2 1210 of these changes to the shared account balance 1250.

In the illustrated example, due to the two (2) minute propagation delay, BMC-2 1210 does not receive the notification message sent in operation 1320 until 18:12—after it has received the update quota request message in operation block 1338. As a result, at 18:11 in operation block 1338, BMC-2 1210 increments the outdated quantity information (i.e., 100 units) by 25 units. Then, unlike the examples illustrated in FIGS. 13B and 13C, BMC-2 1210 determines that the quantity of service unit allowances in the shared account balance 1250*b* (125 units) is greater than the quota allocation unit (100 units), and allocates the requested quota by decrementing the quantity of service unit allowances by 100 units in operation 1350. When, at 18:12, BMC-2 1210 receives the notification message that was sent as part of operation 1320, the quantity of service unit allowances in the shared account balance 1250*b* becomes negative thirty (−30).

Said another way, when the 55 units are removed from A's available balance at 18:12, the balances become negative by 30 units (i.e., 25 units-55 units). This represents a revenue loss for the mobile network operator. Further, once the balances in account balances 1250*a* and 1250*b* are out of synch, there is a high probability that they will remain out of synch (e.g., due to erroneous balance information being reported in the notification messages, etc.) unless complex reconciliation operations are performed. Such operations may consume an excessive amount of processing and memory resources of the balance management components. For all these reasons, the propagation times of the notification messages could cause the system to function improperly.

FIG. 13E illustrates that negative account balances and incorrect threshold breaches may be prevented, mitigated, or reduced by intelligently setting the validity periods or expiration times of the quota allocations to account for the propagation times of the notification messages. For example, in operation 1332, BMC-2 1210 could set the expiration time value in quota allocation response message to "18:05." At 18:05, the quota allocation expires and BMC-2 1210 increments the quantity of service unit allowances in local shared account balance 1250*b* by the unused units (25 units) in operation block 1338. After operation block 1338, the quantity of service unit allowances in the local shared account balance 1250 is 125 units.

In operation 1350, BMC-2 1210 determines that the quantity of service unit allowances in the shared account balance 1250*b* (125 units) is greater than the quota allocation unit (100 units), and allocates the requested quota by decrementing local shared account balance 1250*b* by 100 units. In operation 1352, BMC-2 1210 sends a notification message to BMC-1 1208 to inform it of the updated quantity of service unit allowances in the shared account balance 1250*b*. This message is received by BMC-1 1208 at 18:07 in the illustrated example—three minutes before additional quota is requested in operation 1312. Therefore, in this example, BMC-1 1208 has sufficient time to update the shared account balance 1250*a* to include the changes made by BMC-2 1210 before it receives the request for additional quota in operation 1312, and as a result, rejects the request for additional quota.

The various embodiments include balance management components configured to intelligently set the validity periods/expiration times of the quota allocations so that the propagation times of the notification messages do not cause the system to function improperly (e.g., by incorrectly breaching a quantity or balance threshold, etc.). For example, the balance management components may be configured to determine and set the validity periods/expiration times of the quota allocations so that quotas allocated to two different components that use the same shared balance account do not expire at the same time. In addition, the balance management components may determine and set the validity periods/expiration times so that they expire at sufficiently different times so that the notification messages have sufficient time to propagate to all the other balance management components before any of them allocate quota from the same shared account balance, and again after any of them allocates quota from the shared account balance.

Figure 14:
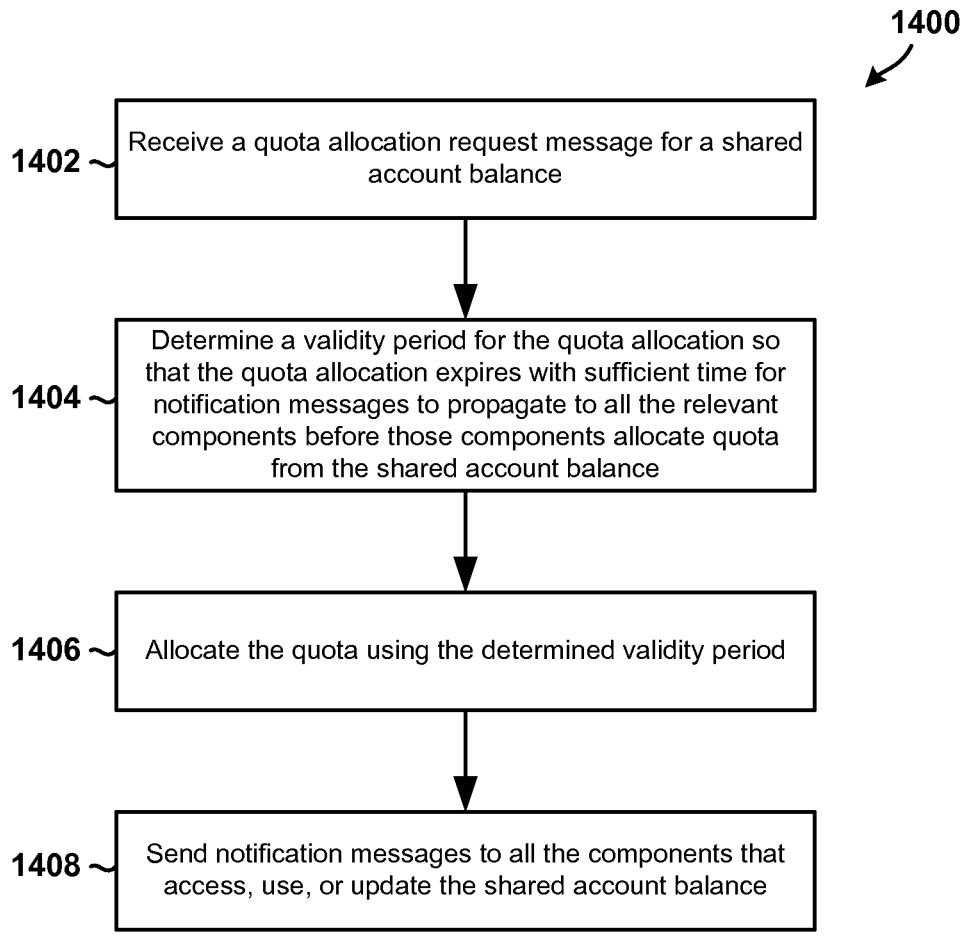
FIG. 14 is a process flow diagram illustrating a method of allocating quota from a shared account balance in accordance with an embodiment.

FIG. 14 illustrates an embodiment method 1400 for allocating quota from a shared account balance so as to reduce the probability of conflicts or discrepancies occurring between different instances of the shared account balance. Method 1400 may be performed by one or more processors in a server computing device or system that is deployed within the telecommunication system and which implements all or portions of a balance management component.

In block, 1402, the processor may receive a quota allocation request message that requests allocation of quota from a shared account balance that is concurrently accessed, used or updated by different components in different geographically distributed sites. In block 1404, the processor may determine a validity period for the quota so that the quota expires with enough time (i.e., before and after the expiration) to allow notification messages (e.g., change notification messages, etc.) to propagate to the other components that access, use or update the shared account balance. In block 1406, the processor may allocate the quota using the determined validity period. For example, the processor may decrement the quantity of service unit allowances in the shared account balance by a quota size/amount, and generate/send a quota allocation response message that includes an allocated quota size value and a validity period/expiration time value to the component that sent the quota allocation request message. In block 1406, the processor may generate and send a change notification message to the other components that access, use or update shared account balance.

Figure 15:
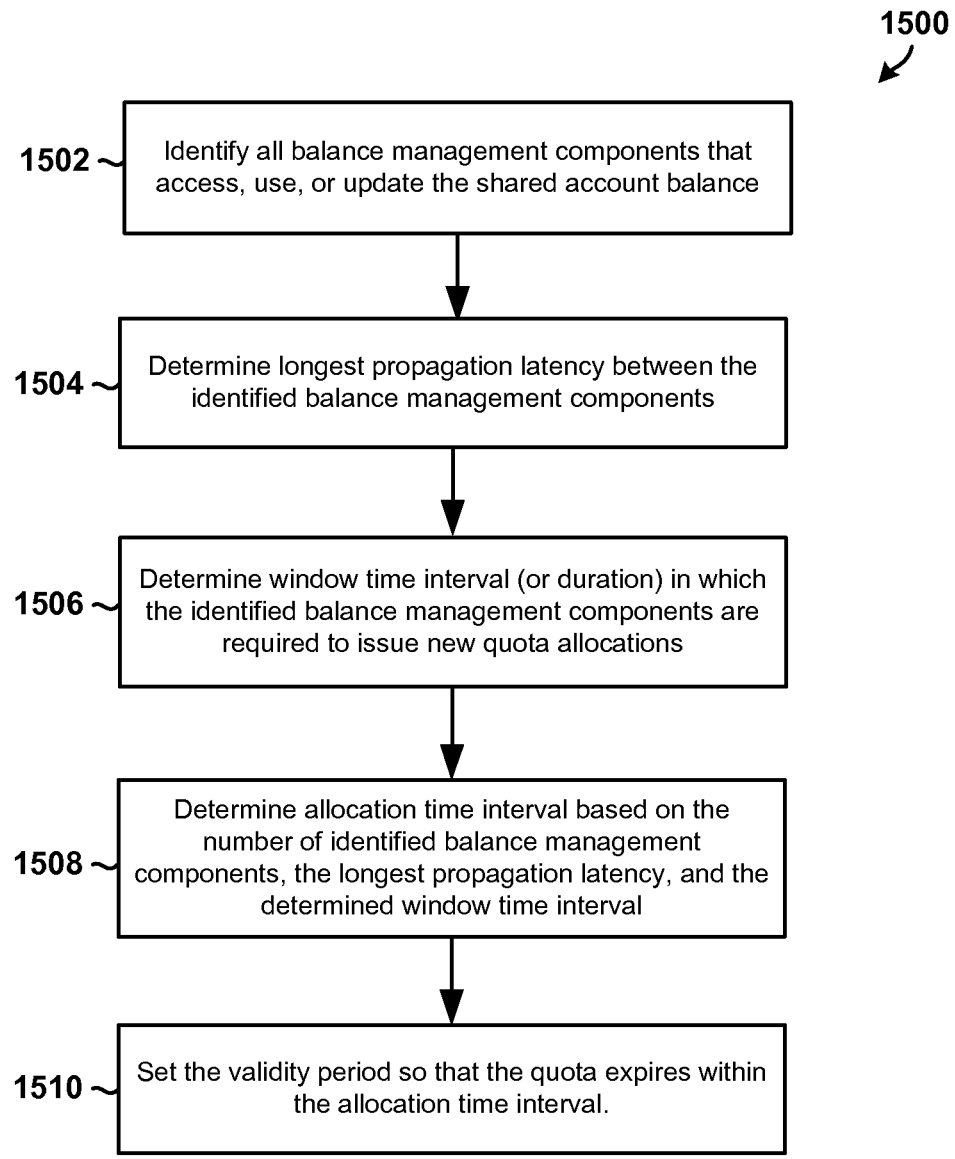
FIG. 15 is a process flow diagram illustrating a method of determining the validity period of a quota allocation in accordance with an embodiment.

FIG. 15 illustrates a method 1500 for determining a validity period for a quota allocation in accordance with an embodiment. Method 1500 may be performed by a processor in a server computing device that implements all or portions of a balance management component. In an embodiment, method 1500 may be performed as part of block 1404 (illustrated in FIG. 14).

With reference to FIG. 15, in block 1502 the processor may identify all of the balance management components that allocate quota from the shared balance account. In block 1504, the processor may determine longest propagation latency between the identified balance management components. In block 1506, the processor may determine/compute a window time interval (or duration) in which all of the identified balance management components have sufficient time to allocate quota and/or meet various quota allocation requirements. In block 1508, the processor may determine/compute an allocation time interval (e.g., a duration value, an interval value, a period of time, etc.) based on the number of identified balance management components, the longest propagation latency, and the determined window time interval. In block 1510, the processor may set the validity period or expiration time of the quota allocation based on the determined/computed allocation time interval. For example, the processor may set the validity period of the quota allocation so that the quota expires within the allocation time interval.

In an embodiment, the balance management component may be configured to determine the validity period based on the formula:

$$w = n(a+p)$$

where:
w=the window time interval during which all balance management components have some time to issue new quota allocations
n=the number of balance management components
a=the allocation time interval for a single balance management component during which its quota allocations expire and it issues new quota allocations
p=the maximum propagation latency between balance management components As an example, if a mobile network operator has three balance management components (i.e., n=3) that each have a propagation latency of five seconds (i.e., p=5), and all three balance management components are required to issue new quota allocations at least once every sixty seconds (i.e., w=60), then the balance management components may determine/compute the quota allocation time interval (or quota allocation duration) as follows:

$$60=3(a+5) \Rightarrow a=15$$

That is, each balance management component may have an allocation time interval of fifteen (15) seconds. In some situations, the balance management components may have different allocation time intervals and/or different propagation latencies. That is, a and p may have different values for each of the n balance management components. As such, in an embodiment, the balance management components may be configured to determine the validity periods for the quota allocations based on the formula:

$$w = \sum_{i=1}^{n}(a_i + p_i)$$

In an embodiment, the balance management components may be configured to determine the times when they begin their quota allocation time intervals (i.e., the start time of their respective quota allocation durations) based upon a property associated with the shared account balance such that the allocation time intervals are approximately evenly distributed throughout the window time interval (w). Examples of such properties include a balance identity (e.g., a balance ID value, etc.) and the identity of the consumer associated with the balance. This, in turn, reduces the probability that conflicts or discrepancies will occur between different instances of the same shared account balance. This coordination also helps ensure that the balance management components are more fully utilized.

In an embodiment, to ensure that the all the balance management components use different allocation time intervals, and that all these allocation time intervals are separated by the propagation latency of the notification messages, the clocks/times of the balance management components may be synchronized (e.g., using a protocol such as Network Time Protocol (NTP), etc.).

In an embodiment, the balance management components may be configured to determine their respective allocation time intervals based on the formula:

$$t_i = e + mw + (i-1)(a+p) + (k \bmod w)$$

where:
$t_i$=the time when balance management component i begins its allocation time interval
e=a system epoch such as of 00:00 on 1/1/2000
m=an integer multiple
w=the window time interval during which all balance management components have time to issue new quota a=the allocation time interval for a single balance management component during which its quota allocations expire and it issues new quota p=the maximum propagation latency between balance management components k=a unique property associated with the balance (or a hash of the property when the property is not numeric)

Continuing the previous example, if the mobile network operator uses the balance identity as the property, then the times when the balance management components begin their allocation time intervals for the identity of "123" are as follows:

$$t_1 = 0 + 60m + (1-1)(15+5) + (123 \bmod 60)$$
$$= 60m + 3$$

$$t_2 = 0 + 60m + (2-1)(15+5) + (123 \bmod 60)$$
$$= 60m + 23$$

$$t_3 = 0 + 60m + (3-1)(15+5) + (123 \bmod 60)$$
$$= 60m + 43$$

Thus, in this example, the first balance management component will begin its allocation time intervals at three (3) seconds past every minute, the second balance management component will begin its allocation time intervals at twenty three (23) seconds past each minute, and the third balance management component will begin its allocation time intervals at forty three (43) seconds past each minute. As such, the first balance management component will set the quota validity periods/expiration times of its quota allocations so that they expire between 3 and 18 seconds past the minute. Similarly, the second balance management component will set the quota validity periods/expiration times of its quota allocations so that they expire between 23 and 38 seconds past the minute. The third balance management component will set the quota validity periods/expiration times of its quota allocations so that they expire between 43 and 58 seconds past the minute.

As another example, if the balance identity value is "117," then the times when the balance management components begin their allocation time intervals are as follows:

$$t_1 = 0 + 60m + (1-1)(15+5) + (117 \bmod 60)$$
$$= 60m + 57$$

$$t_2 = 0 + 60m(2-1)(15+5) + (117 \bmod 60)$$
$$= 60m + 17$$

$$t_3 = 0 + 60 + (3-1)(15+5) + (117 \bmod 60)$$
$$= 60m + 37$$

Thus, in this example, the first balance management component will begin its allocation time intervals at fifty seven (57) seconds past every minute, the second balance management component will begin its allocation time intervals at seventeen (17) seconds past each minute, and the third balance management component will begin its allocation time intervals at thirty seven (37) seconds past each minute.

In the embodiments described above (e.g., with reference to FIGS. 14 and 15), the balance management components allocate quotas during allocation time intervals and/or intelligently set the quota expiration times so as to eliminate or reduce conflicts and discrepancies between different instances of a single shared account balance. In further embodiments, the balance management components may be configured to update the shared balance account so as to prevent or resolve such conflicts and discrepancies. In these embodiments, the balance management components may operate in a delay tolerant and conflict tolerant manner, which allows them to provide continuous service to their respective metering and gating components.

In an embodiment, the balance management components may be configured to compute, store, communicate, and use primary data that is deterministic to the extent that it can be calculated independently by any component/node in the system (e.g., based upon previous transaction values). For example, rather than storing or communicating absolute values, the balance management components may be configured to generate, store, and communicate meta-data related to previous transactions (i.e., quota allocations, additions, deductions, etc.), and use this information to determine/compute the quantity of service unit allowances that are available for allocation in a shared balance account. In an embodiment, the balance management components may be configured to communicate such meta-data via change notification messages.

Figure 16A:
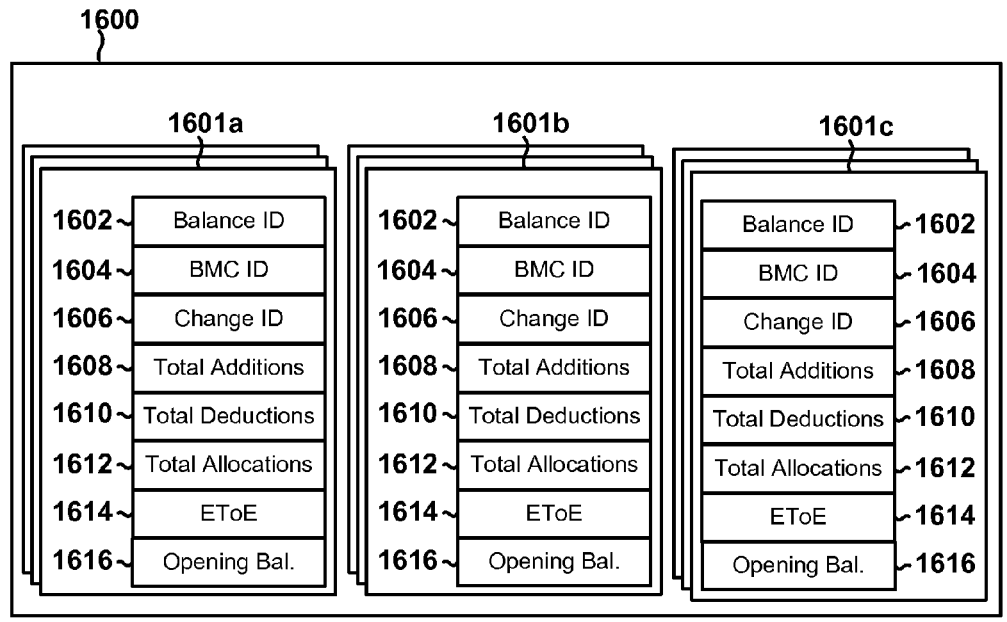
FIG. 16A is an illustration of a change notification message that may be used to synchronize a shared account balance in accordance with the various embodiments.

FIG. 16A illustrates an example change notification message 1600 that may be used to implement various embodiments. The change notification message 1600 may include a record 1601 (e.g., 1601a, 1601b, etc.) for each shared account balance and/or for each balance management component (e.g., BMC-1, BMC-2, BMC-3, etc.) that uses or updates the shared account balance.

Each record 1601 may include a balance ID 1602 value, a BMC ID 1604 value, a change ID 1606 value, a total additions 1608 value, a total deductions 1610 value, a total allocations 1612 value, and an estimated time of exhaustion (EToE) 1614 value. In an embodiment, each record 1601 may also include an opening balance 1666 value. Components that receive the change notification message 1600 may uniquely identify and/or select a record 1601 (e.g., 1601a, 1601b, etc.) based on the BMC ID 1604 value and/or via a combination of the BMC ID 1604 value and the balance ID 1602 value.

The balance ID 1602 value may uniquely identify the shared account balance (e.g., account balance A, account balance B, etc.). The BMC ID 1604 value may identify the balance management component (e.g., BMC-1, BMC-2, etc.) that made the changes to the shared account balance. The change ID 1606 value may be a unique sequential number or symbol that identifies the most recent change to the shared account balance at the balance management component. The total additions 1608 value may identify the total of all balance additions made at the balance management component. The total deductions 1610 value may identify the total of all balance deductions made at the balance management component. The total allocations 1612 value may identify the total of all balance/units allocated/reserved. The EToE 1614 value may be a time value that identifies a future time when it is expected that the balance will be depleted due to local consumption. In an embodiment, change ID 1606 value may be a timestamp value. In some embodiments, the total allocations 1612 value and/or the EToE 1614 value may be used or populated only when the quantity of units that remain in the shared account balance is close to a threshold (e.g., is close to the zero-threshold).

Figure 16B:
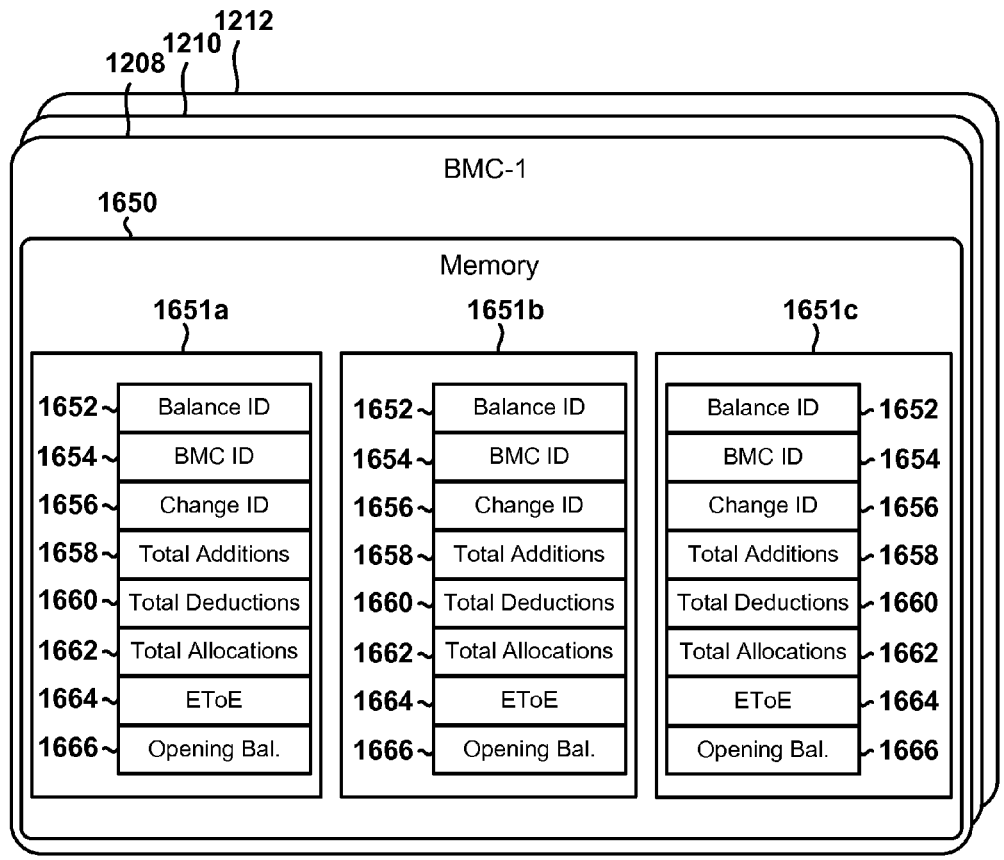
FIG. 16B is a block diagram illustrating the types of information that may be stored in the local memories of the components that use change notification messages in accordance with the various embodiments.

FIG. 16B illustrates that each balance management component may include a local memory 1650 that includes/ stores the same information as the change notification message 1600 discussed above. Specifically, FIG. 16B illustrates that the local memory 1650 may store a local record 1651 (e.g., 1651a, 1651b, 1651c, etc.) for each shared account balance and/or for each balance management component (e.g., BMC-1, BMC-2, BMC-3, etc.) that uses or updates the shared account balance. Each local record 1651 may include a local balance ID 1652 value, a local BMC ID 1654 value, a local change ID 1656 value, a local total additions 1658 value, a local total deductions 1660 value, a local total allocations 1662 value, and a local estimated time of exhaustion (EToE) 1664 value. In an embodiment, each local record 1651 may also include a local opening balance 1666 value.

As mentioned above, each change notification message 1600 may include a record 1601 for each of the balance management components that access, use, or update a shared account balance. Thus, if balance management components BMC-1, BMC-2, and BMC-3 all use shared account balance A, then a change notification message 1600 sent from BMC-1 to BMC-2 will include a record 1601a for balance A for BMC-1, a record 1601b for balance A for BMC-2, and a record 1601c for balance A for BMC-3. Similarly, the local memory 1650 of each of the balance management components BMC-1, BMC-2, and BMC-3 may store a local record 1651a for balance A for BMC-1, a local record 1651b for balance A for BMC-2, and a local record 1651b for balance A for BMC-3.

Each balance management component (e.g., BMC-1, BMC-2, and BMC-3) may be the controller, authority, master, or owner of one of the local records 1651 that are stored in its local memory 1650. For example, BMC-1 may be the authority of local record 1651a, BMC-2 may be the authority of local record 1651b, and BMC-3 may be the authority of local record 1651c. Said another way, in the local memory 1650 of in BMC-1, local record 1651a may be an authoritative record, whereas local records 1651b and 1651c are non-authoritative records. Similarly, in the local memory 1650 of in BMC-2, local record 1651a is a non-authoritative record, local record 1651b is the authoritative record, and local record 1651c is a non-authoritative record. In the local memory 1650 of in BMC-3, local records 1651a and 1651b are non-authoritative records, and local record 1651c is the authoritative record.

Thus, only one authoritative record is stored for each shared account balance in each local memory 1650, and the authoritative record may only be altered by the balance management component that is the controller, authority, master or owner of that local record 1651. Said another way, changes may be owned exclusively by the balance management component that made the changes, and a definitive/authoritative record of the changes may be held at a balance management component that made the changes.

Each time a balance management component updates a shared account balance, that component updates the authoritative local record 1651 in its local memory 1650, generates a change notification message 1600 that includes all the information stored in all the relevant locals records 1651 (e.g., 1651a, 1651b, and 1651c), and sends the change notification message 1600 to every other balance management component that uses or updates that same shared account balance. Thus, continuing the previous example, BMC-1 may allocate quota from the shared account balance A, update the information stored in local record 1651a in its local memory 1650, generate a change notification message 1600 that includes the information stored in local records 1651a, 1651b and 1651c, and send the change notification message 1600 to balance management components BMC-2 and BMC-3.

Each balance management component that receives a change notification message 1600 (e.g., BMC-2 and BMC-3) may update its non-authoritative local records 1651 with the information included in the corresponding records 1601 in the change notification message 1600. Yet, the additions, deductions, and allocations/reservations identified in the change notification message 1600 are not balanced, aggregated, consolidated, or otherwise merged before those values are stored in the local memory 1650 (an exception to this rule may be implemented for caching purposes). Thus, continuing the previous example, BMC-2 may receive a change notification message 1600 from BMC-1, determine whether the information included in the message 1600 is up-to-date, and update non-authoritative local records 1651a and 1651c (stored in the local memory 1650 on BMC-2) to include the same information as records 1651a and 1651c included in the received change notification message 1600. BMC-2 may then determine the quantity of units available in the shared account balance based on the information stored in its local memory 1650. These operations are discussed in further detail below.

FIGS. 17A through 17F illustrate example change notification messages that may be generated and communicated between balance management components BMC-1 and BMC-2 when updating a shared balance account in accordance with various embodiments.

Figure 17A:
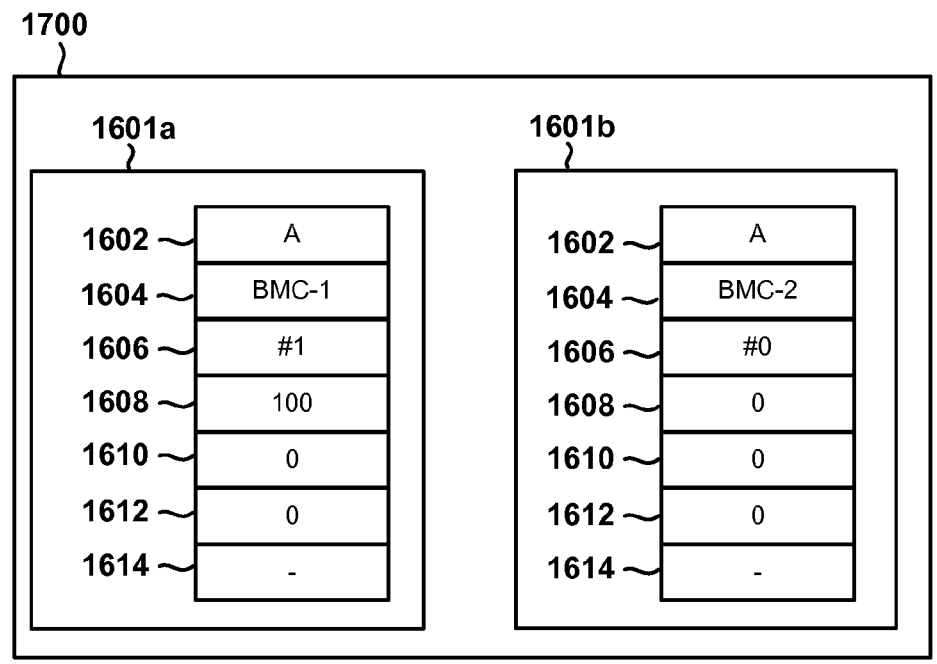
FIGS. 17A through 17F are illustrations of example change notification messages that may be generated by components that access, update or use a shared account balance in accordance with the various embodiments.
Figure 17B:
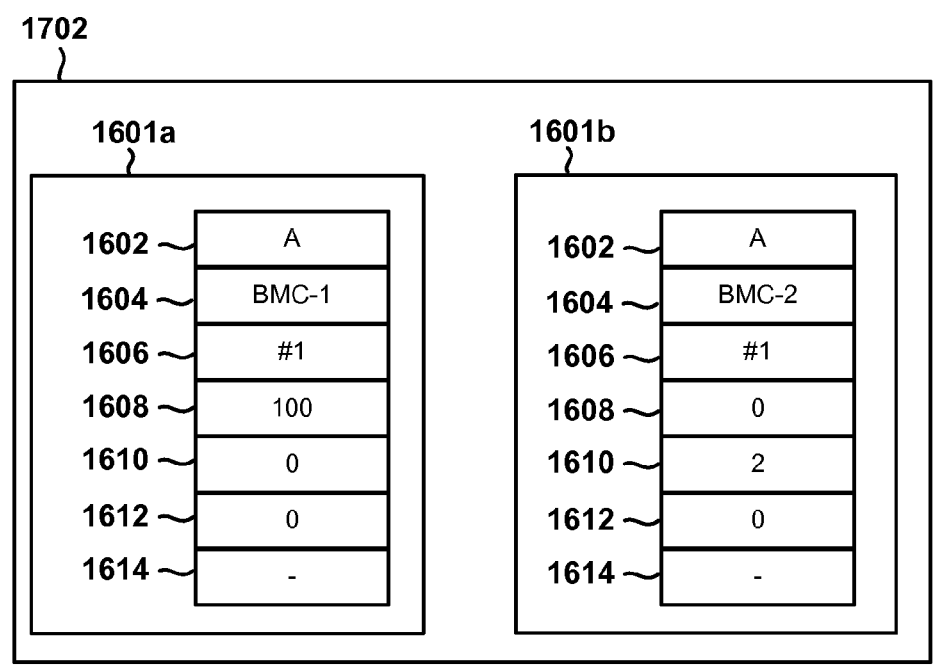

FIG. 17A illustrates an example change notification message 1700 that may be generated by BMC-1 after it adds 100 units to shared account balance A. Specifically, FIG. 17A illustrates that BMC-1 generates the change notification message 1700 to include a first record 1601a having a balance ID 1602 value of "A," a BMC ID 1604 value of "BMC-1," a change ID 1606 value of "#1," a total additions 1608 value of "100," a total deductions 1610 value of "0," and a total allocations 1612 value of "0." The change notification message 1700 may also include a second record 1601b having a having a balance ID 1602 value of "A," a BMC ID 1604 value of "BMC-2," a change ID 1606 value of "#0," a total additions 1608 value of "0," a total deductions 1610 value of "0," and a total allocations 1612 value of "0."

BMC-1 may send the change notification message 1700 to BMC-2. BMC-2 may receive the message 1700, select the first record 1601a in the message, determine that the selected record 1601a has a balance ID 1602 value of "A" and a BMC ID 1604 value of "BMC-1," and use these values to select local record 1651a from its local memory 1650.

BMC-2 may compare the value of the change ID 1606 of the selected record 1601a with the value of the local change ID 1656 of the local record 1651a to determine whether the change ID 1606 value included in the received change notification message 1700 is greater than the change ID 1656 value of the local record 1651a stored in its local memory 1650. That is, BMC-1 may compare its stored local change ID 1656 to the received change ID 1606 to determine the records 1601a and 1651a that store the most current (i.e., last changed) information.

Thus, if the value of the local change ID 1656 value is "#0," BMC-2 may determine that the value of the change ID 1606 value of the selected record 1601a (i.e., "#1") is greater than the change ID 1656 value of the local record 1651a (i.e., "#0"). In response, BMC-2 may update the values of local balance ID 1652, local BMC ID 1654, local change ID 1656, local total additions 1658, local total deductions 1660, a local total allocations 1662, and local EToE 1664 in the local record 1601*a* with their corresponding values in record 1601*a* of message 1700.

When allocating quotas, BMC-2 may update the information stored in its authoritative local record 1651*b* (which is stored in its local memory 1650). For example, if BMC-2 receives an update quota notification message that indicates two (2) of the service unit allowances allocated from shared balance account A have been consumed, it may increment the local total deductions 1660 value in record 1651*b* by two (2) units. BMC-2 may then increment the change ID 1656 value record 1651*b* from "#0" to "#1," and generate the change notification message 1702 illustrated in FIG. 17B. Specifically, BMC-2 may generate a change notification message 1702 that includes all of the relevant information stored in its local memory 1650. As a result, record 1601*a* of message 1702 will include the same information included in record 1601*a* of message 1700. In addition, record 1601*b* of message 1702 will include a total deductions 1610 value of "2" and a change ID 1656 value of "#1."

BMC-2 may send the change notification message 1702 to BMC-1, which may receive message 1702 and update the information stored in its local memory 1650 by performing the same operations discussed above. For example, BMC-1 may determine that change ID 1606 value of the selected record 1601*b* is higher than the local change ID 1656 value of corresponding local record 1651*b* (i.e., #1 is higher than #0). In response, BMC-1 may update local record 1651*b* with the information included in the selected record 1601*b*. In addition, BMC-1 may calculate the quantity of units available in shared account balance A.

In an embodiment, the balance management components (e.g., BMC-1, BMC-2, etc.) may be configured to determine or calculate the quantity of units available in shared account balance based on the formula:

$$\text{available units} = \sum_{i=1}^{n} (a_i - (d_i + r_i))$$

where
a=the total of all balance additions made at the balance management component
d=the total of all balance deductions made at the balance management component
r=the total of all balance allocations/reservations made at the balance management component
n=the number of balance management components Thus in the above example, BMC-1 will determine/calculate the quantity of units available in shared account balance A as:

$$A = (100 - (0 + 0)) + (0 - (2 + 0))$$
$$= 98$$

In most scenarios, a balance will only be created in a single balance management component. However, it is possible in some circumstances that two balance management components will create the same balance at the same time. This may result in the subscriber receiving additional service unit allowances. Since this could be a revenue loss to the mobile network operator, in some embodiments, the change notification messages 1600 and the local memories 1650 could include/store an initial opening balance value (o) that is assigned when the balance is created. For example, the opening balance 1616 and local opening balance 1666 attributes may store the initial opening balance value (o). In these embodiments, BMC-1 would compute the quantity of units available in shared account balance A based on the formula:

$$\text{available units} = o + \sum_{i=1}^{n} (a_i - (d_i + r_i))$$

where
o=the initial opening balance

If two or more balance management components create the initial opening balance at the same time then there could be multiple values of o (e.g., $o_1, o_2, \ldots o_n$). If all of these initial opening balances are the same, then any one of them can be used as the initial opening balance value (o) when calculating the balance. If at least one of these initial opening balance values differs, then a conflict resolution procedure could be performed. For example, the BMC-1 could use the smallest initial opening balance as the initial opening balance value (o) when calculating the quantity/balance, and log an alert for later review by the mobile network operator.

Continuing the previous example, BMC-1 may receive a message that indicates that thirty-seven (37) service unit allowances should be added to balance A (e.g., in response to the subscriber buying additional service unit allowances, the network operator applying a complementary bonus, etc.). In response, BMC-1 may increment the local total additions 1658 value in record 1651*a* from 100 units to 137 units, increment the local change ID 1656 value of record 1651*a* from "#1" to "#2," generate the change notification message 1704 illustrated in FIG. 17C, and send the message 1704 to BMC-2. Prior to receiving this message 1704, BMC-2 may receive an update quota notification message that indicates that twelve (12) of its previously allocated service unit allowance were consumed. In response, BMC-2 may increment the local total deductions 1660 value in record 1651*b* from two (2) units to fourteen (14) units and increment the change ID 1656 value of record 1651*b* from "#1" to "#2." BMC-2 may then generate and send the change notification message 1706 illustrated in FIG. 17D to BMC-1.

Figure 17C:
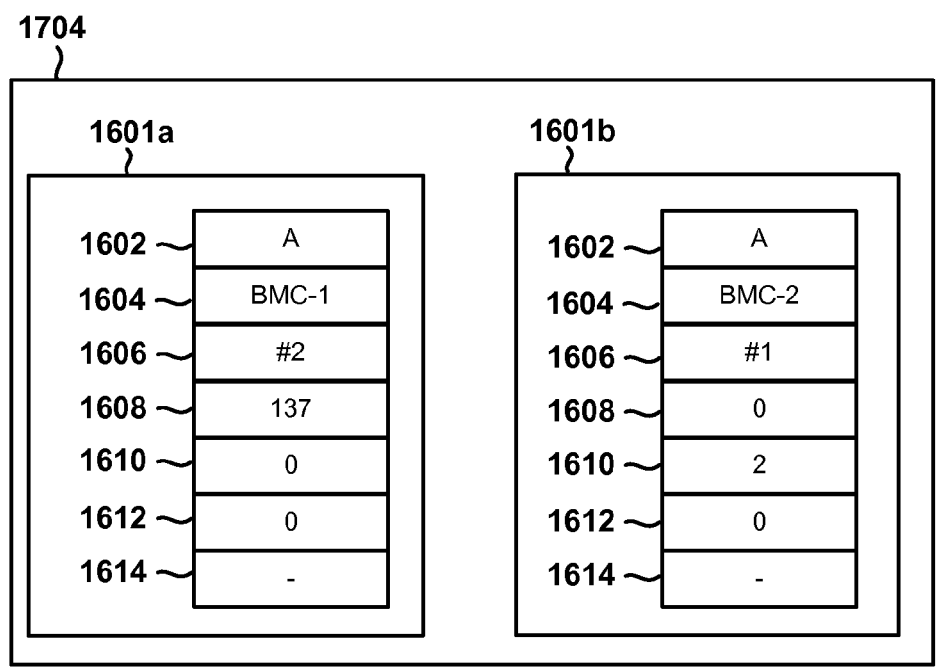

With reference to FIG. 17C, BMC-2 may receive change notification message 1704 from BMC-1, select the first record 1601*a*, and determine that the change ID 1606 value (i.e., "#2") of record 1601*a* is higher than the local change ID 1666 value (i.e., "#1") of corresponding local record 1601*a*. In response, BMC-2 may update the values of local balance ID 1652, local BMC ID 1654, local change ID 1656, local total additions 1658, local total deductions 1660, local total allocations 1662, and local EToE 1664 attributes in the local record 1601*a* with their corresponding values in record 1601*a* of message 1704. On the other hand, BMC-2 may determine that value of change ID 1606 of record 1601*b* (i.e., "#1") is lower than its corresponding local change ID value (i.e., "#2") in local record 1651*b*. In response, BMC-2 may discard record 1601*b*. In an embodiment, BMC-2 may also determine that local record 1651*b* is the authoritative record, and send an updated change notification message to BMC-1 (e.g., after it finishes processing message 1704, after a certain period of time, in response to determining that the differences are significant, etc.) so that BMC-1 may update its information.

Figure 17D:
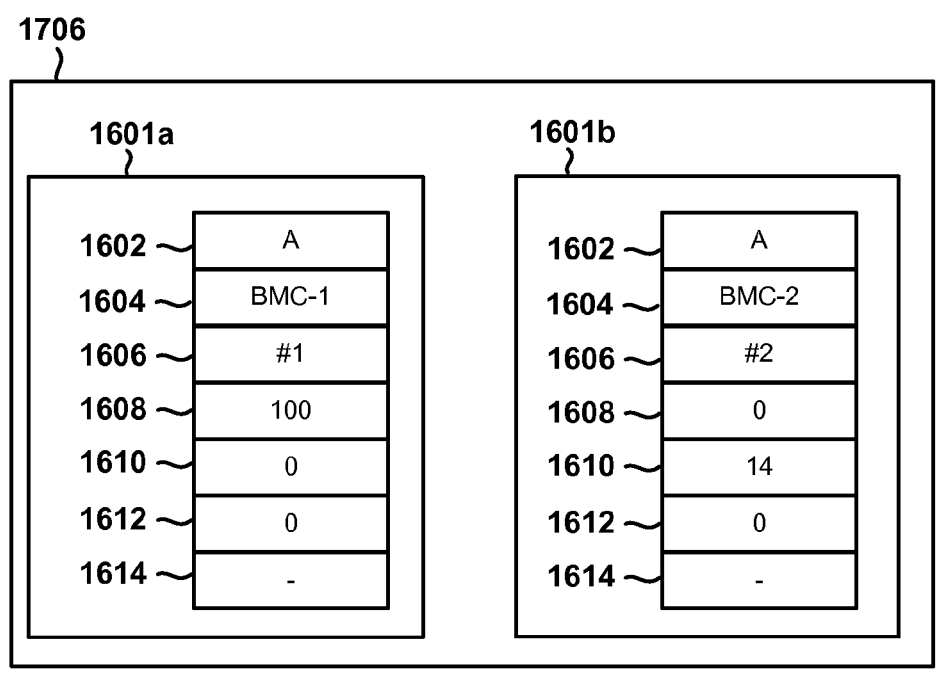

With reference to FIG. 17D, BMC-1 performs the same operations described above when it receives change notification message 1706 from BMC-2. Namely, BMC-1 determines that it should update the local record 1651b with the information included in record 1601b of message 1706 and discard/ignore the information included in record 1601a of message 1706 based on the change IDs 1606. As a result, the local memories 1650 in BMC-1 and BMC-2 will store the same information.

Thus, while the information included in the messages 1704 and 1706 differ, the various embodiments allow the components (i.e., BMC-1 and BMC-2) to analyze and process messages 1704 and 1706 so that the information stored in their respective local memories 1650 is the same. The various embodiments also allow these components to better tolerate and better respond to lost messages.

Figure 17E:
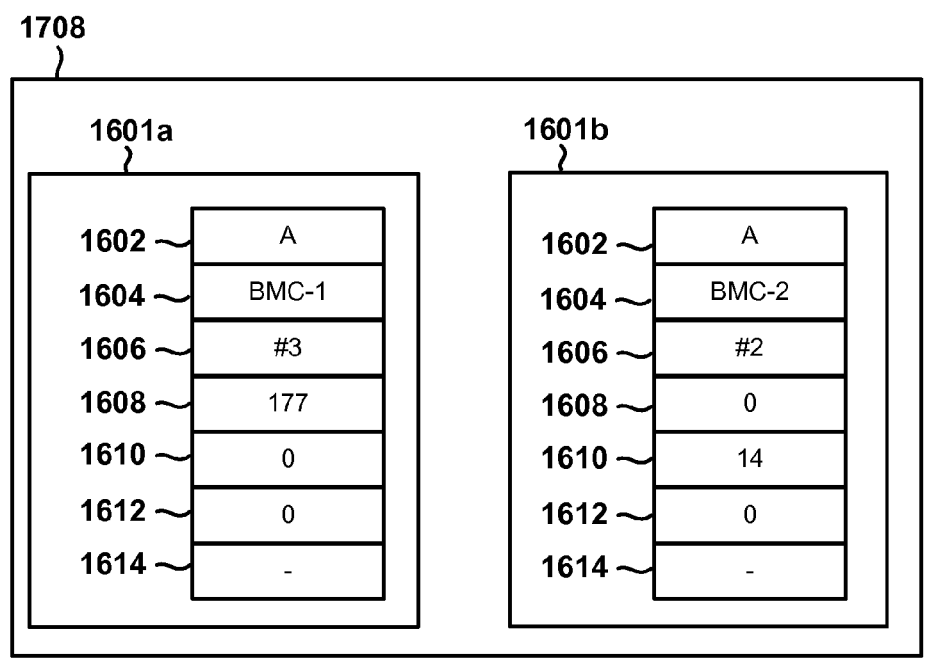
Figure 17F:
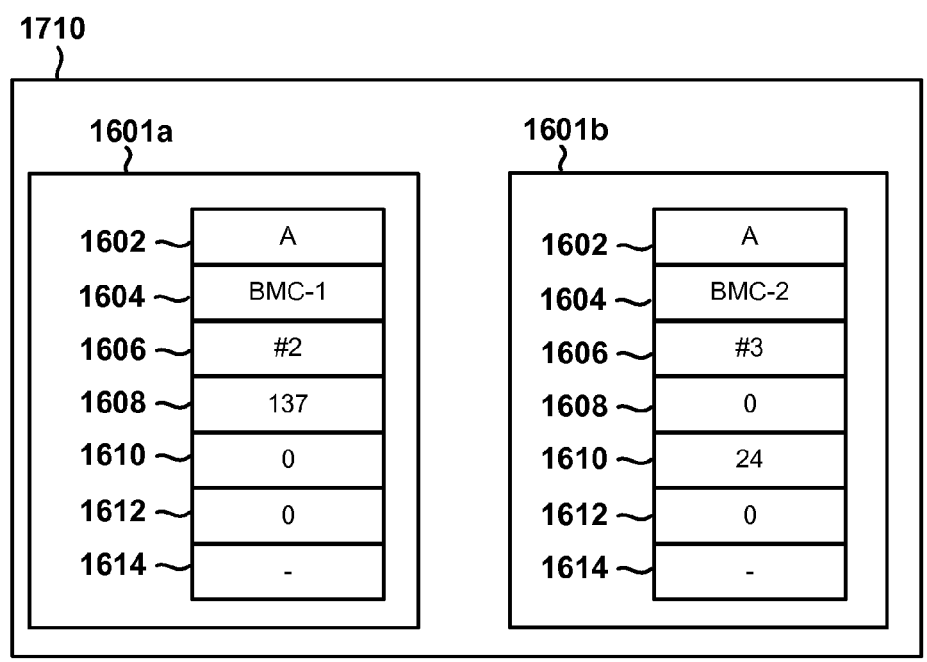

Continuing the previous example, BMC-1 may add 40 service unit allowances by incrementing the local total additions 1658 value in record 1651a from 137 units to 177 units, increment the local change ID 1656 value of record 1651a from "#2" to "#3," generate the change notification message 1708 illustrated in FIG. 17E, and send message 1708 to BMC-2. However, in this example, BMC-2 never receives message 1708 because it is lost during the transmission. Meanwhile, BMC-2 receives an update quota notification message that indicates that ten (10) additional service unit allowances were consumed, and in response, increments the local total deductions 1660 value in record 1651b from fourteen (14) units to twenty-four (24) units, increments the change ID 1656 value of record 1651b from "#2" to "#3," generates the change notification message 1710 illustrated in FIG. 17F, and sends message 1710 to BMC-1.

When BMC-1 receives change notification message 1710 from BMC-2, it determines that the values of the change ID 1606 of record 1601b is greater than the value of the corresponding local change ID 1666 of local record 1651b (i.e., #3 is higher than #2). In response, BMC-1 updates local record 1651b with the information included in record 1601b of message 1710. BMC-1 may then compute/determine the quantity of units available in shared account balance A as follows:

$$A = (177 - (0 + 0)) + (0 - (24 + 0))$$
$$= 153$$

At some point (perhaps based upon a time based trigger), BMC-2 will receive a change notification message from BMC-1 with more recent balance changes (i.e., with a higher balance change identity) relating to BMC-1. At that time, BMC-2 can adjust its stored balance information accordingly. If there is a third balance management component BMC-3, then the more recent changes relating to BMC-1 could come from BMC-3. Thus, regardless of whether the balance management components send additional change notification messages when they determine that another component includes incorrect information, conflicts and disparities between the different instances of the shared account balance will eventually be resolved. Further, due to the high volume of transactions in high-speed telecommunication networks, the conflicts and disparities will be resolved relatively quickly.

When the change notification messages arrive out of sequence, the changes with the low change ID could be ignored and discarded. This enables the use of multiple channels of communication that operate at different speeds. So, when a low threshold is crossed and change notification messages are propagated to other balance management components faster than normal change notification messages, the most recently sent change notification message will be used by the recipient balance management component rather than the most recently received change notification message. This does not require change messages from every balance management component, but may require messages from the balance management components that updated the shared account balance.

In an embodiment, the balance management components may be configured to compute the total additions 1608 value and the total deductions 1610 value based on a system-wide epoch time to the present time. This epoch may be redefined occasionally (e.g., once every five years) in order to keep the balance additions and the balance deductions relatively small. In an embodiment, the balance management components may be configured to compute these values so that they are less than the maximum value (e.g., less than $2^{64}$, etc.) that the underlying programming language and/or database can support.

As described above, the EToE 1614, 1664 values may be time values that identify a future time when it is expected that the balance will be depleted due to local consumption. The balance management component with the earliest EToE may obtain exclusive control of a shared account balance when it falls below a certain threshold. Each balance may be associated with a level (e.g., 5% of average monthly usage) at which the balance management component may calculate the EToE, and a further level (e.g., 0.5% of monthly usage) at which the first expiring EToE determines which balance management component can allocate the remaining balance.

When the balance falls below the level at which EToEs are used, the modifying balance management component may send a change notification message that includes a populated EToE value 1614 to the other balance management components. This ensures that by the time that the balance declines to the point where EToEs are actually used, all of the balance management components will have reasonably up-to-date balances. When the balance is critically low, only the balance management component with the earliest EToE may allocate quota from the available balance. The other balance management components will report the balance as zero (0) units, but may re-use unused portions of allocated/reserved balance.

Figure 18:
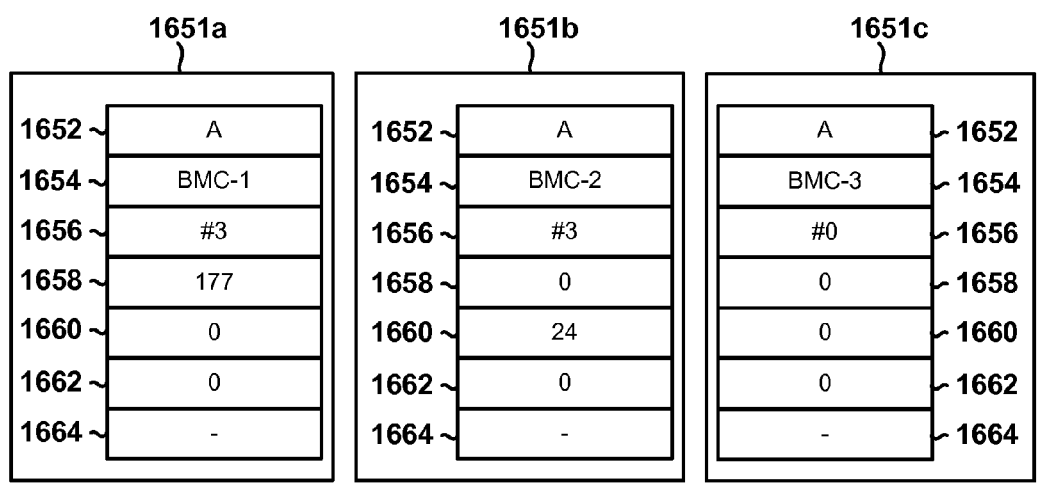
FIG. 18 is a block diagram illustrating example values that may be stored in local memories of components that use change notification messages in accordance with various embodiments.

Thus, when the balance falls below the level at which EToEs are used, the modifying balance management component will send a change notification message containing an EToE to the other balance management components, and when the balance is critically low only the balance management component with the earliest EToE can allocate it. Continuing the above example, the level at which EToEs are used is when a balance decreases below 100 units, and a balance becomes critically low when it decreases below 25 units. The information stored in each of BMC-1, BMC-2, and BMC-3 is illustrated in FIG. 18. A metering and gating component associated with BMC-2 then consumes 63 units of shared account balance A, and BMC-2 calculates the quantity of units available in shared account balance A as follows:

$$A = (177 - (0 + 0)) + (0 - (87 + 0)) + (0 - (0 + 0))$$
$$= 90$$

Figure 19A:
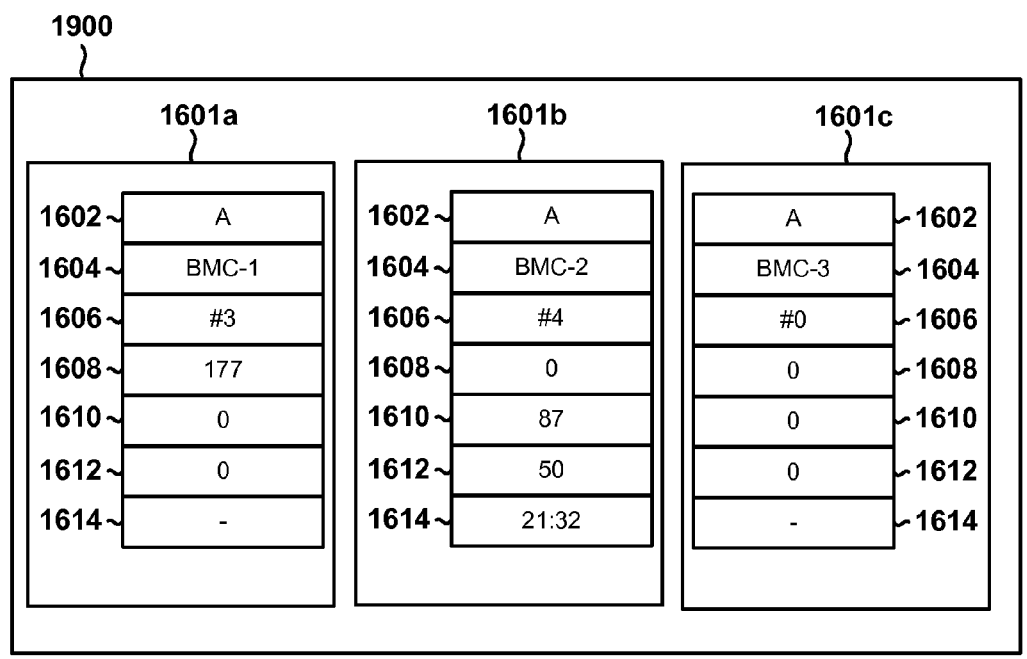
FIGS. 19A through 19B are illustrations of additional change notification messages that may be generated by components that access, update or use a shared account balance in accordance with the various embodiments.

BMC-2 further allocates/reserves 50 units, calculates its EToE (i.e., 21:32) because the balance has decreased below 100 units, generates the change notification message 1900 illustrated in FIG. 19A, and sends the message 1900 to both BMC-1 and BMC-3. The quantity of units available in shared account balance A may then be calculated by BMC-1, BMC-2, and BMC-3 as follows:

$$A = (177 - (0 + 0)) + (0 - (87 + 50)) + (0 - (0 + 0))$$
$$= 40$$

A metering and gating component associated with BMC-1 then consumes 20 units of A, and BMC-1 calculates the quantity of units available in shared account balance A as follows:

$$A = (177 - (20 + 0)) + (0 - (87 + 50)) + (0 - (0 + 0))$$
$$= 20$$

Figure 19B:
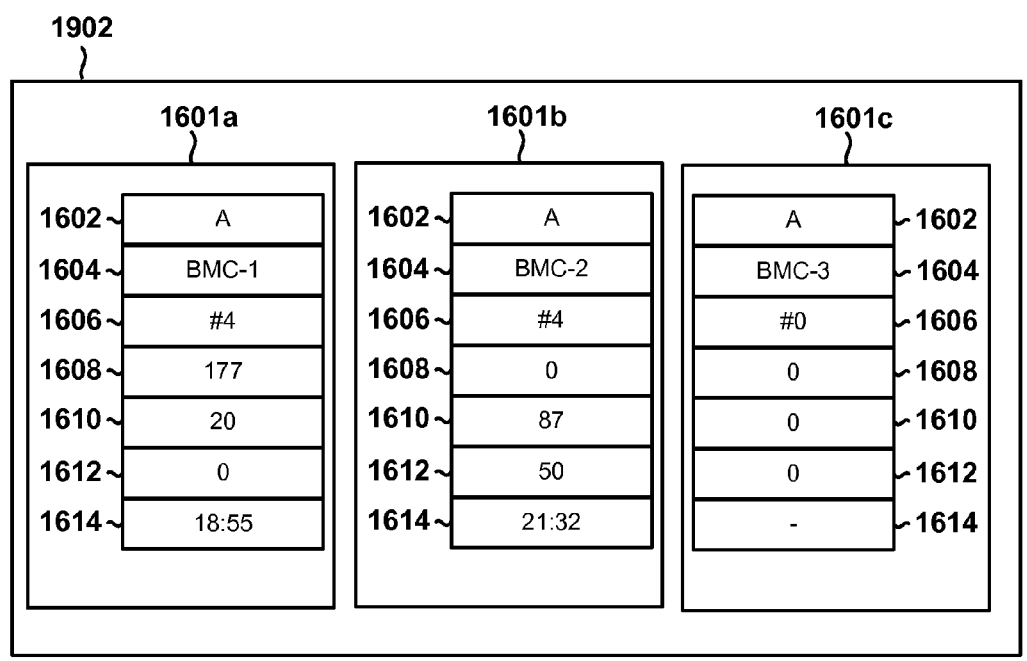

BMC-1 calculates its EToE (i.e., 18:55) because the balance is still below 100 units, generates the change notification message 1902 illustrated in FIG. 19B, and sends message 1902 to both BMC-2 and BMC-3. BMC-2 and BMC-3 may calculate the quantity of units available in shared account balance A as follows:

$$A = (177 - (20 + 0)) + (0 - (87 + 50)) + (0 - (0 + 0))$$
$$= 20$$

The balance A has now become critically low because it has decreased below 25 units, and therefore only the balance management component with the earliest EToE (i.e., BMC-1) can allocate it. A metering and gating component associated with BMC-2 can still consume the 50 units of allocation/reservation identified in the total allocations 1612 value of record 1601b.

In an embodiment, a balance management component may be configured to deduct the same amount from both the total of all balance additions (i.e., the total additions value 1608) and the total of all balance deductions (i.e., the total deductions value 1610) for a balance with which it is associated, and subsequently transmit a change notification message 1600 with a new balance change ID 1606 value to the other balance management components. For example, if a balance management component has a total of all balance additions of 1,979,122,419,780,817, and a total of all balance deductions of 1,979,122,419,780,800 for a balance with which it is associated, then it can subtract the lesser value (i.e., 1,979,122,419,780,800) from both totals to create a new total of all balance additions of seventeen (17) and a new total of all balance deductions of zero (0). By using the total of all balance additions and the total of all balance deductions, the balance management component may ensure that its values remain relatively small, and hence are faster and less resource consuming to store and transmit to other balance management components.

Similarly, if a balance management system has a total of all balance additions of zero (0), and a total of all balance deductions of 2,011,091,720,130,522 for a balance with which it is associated, then it can subtract half the difference (i.e., 1,005,545,860,065,261) from both totals to create a new total of all balance additions of −1,005,545,860,065,261 and a new total of all balance deductions of 1,005,545,860,065,261. This may be particularly desirable when the underlying programming language and/or database supports signed numbers and not unsigned numbers.

When a balance management component receives a change notification message 1600 from another balance management component, it may determine whether the balance change ID 1606 value in the change notification message 1600 is higher that than the balance change identifier currently in the recipient balance management component's records for that balance at the sender balance management component. If it is higher, the balance management component may keep the received balance change values for the purpose of calculating the balance, and discard all other balance changes that have a lower identity. Otherwise the received balance change message may be discarded.

In some circumstances (e.g., in systems where the balance management components cannot individually deduct the same amount from both the total of all balance additions and the total of all balance deductions), the balance management components may not need to create and send balance change identifiers (i.e., balance change ID 1606 values) as part of the change notification messages 1600. Instead, when a balance management component receives a balance change message 1600 from another balance management component, it may compare the totals of all balance additions and deductions in order to determine if the received balance change should be used in place of the existing balance changes. In an embodiment, the balance management component may be configured to use the balance change with either the largest total of all balance additions or the largest total of all balance deductions.

The balance changes associated with a particular balance management component do not need to originate from that balance management component. For example, BMC-1 may send a change notification message 1600 to BMC-2 that includes a balance change relating to BMC-3, and BMC-2 may use this balance change to update its balance information for BMC-3.

Due to system assumptions, a balance management component may never receive a balance change relating to itself in which the balance change identity (i.e., balance change ID 1606 value) is higher than the balance change identity currently in its records.

The change notification messages may arrive out of sequence and/or may be lost in transit (and hence never arrive). In addition, several balance management components may change the same balance simultaneously, in which case, the resulting change notification messages may pass each other as they propagate between those respective balance management components. To reduce the number of messages that communicated in the network, in an embodiment, the balance management components may be configured to exchange change notification messages on a regular basis or when certain conditions occur. For example, a change notification message may be held (i.e., not generated or sent) when the most recent balance change was an increase in the total of all balance deductions, and the change was relatively small compared to the current value of the balance. That is, small deductions could be held until there are a significant number of deductions (e.g., 10 small deductions) or until a predefined amount of time has elapsed (e.g., 5 minutes).

In an embodiment, a balance management component may be configured to aggregate the most up-to-date balance changes. This prevents a lost, missing, or out-of-order communication messages from causing the components to compute the balances incorrectly.

Some change notification messages may be more important than others. As such, in an embodiment, the balance management components may be configured to identify the important change notification messages, and communicate the identified messages so that they are propagated to other balance management components faster (e.g., using a higher priority on a common communications channel, using a faster communications channel that can handle a small percentage of the overall traffic). Examples of important change notification messages include balance creation, configuration, and deletion messages. Further examples include change notification messages related to a balance change that could cause the balance to be within a predetermined range of a threshold (e.g., within 100 units of having zero remaining units) or a balance change that, if lost, could negatively impact the subscriber (e.g., a balance change that increases the subscriber's balance, etc.).

In an embodiment, each balance management component may be assigned a unique identity (e.g., BMC-1, BMC-2, etc.). The balance management components may be configured to periodically synchronize their clocks. In an embodiment, the balance management components synchronize their clocks via a protocol, such as the Network Time Protocol (NTP).

Figure 20A:
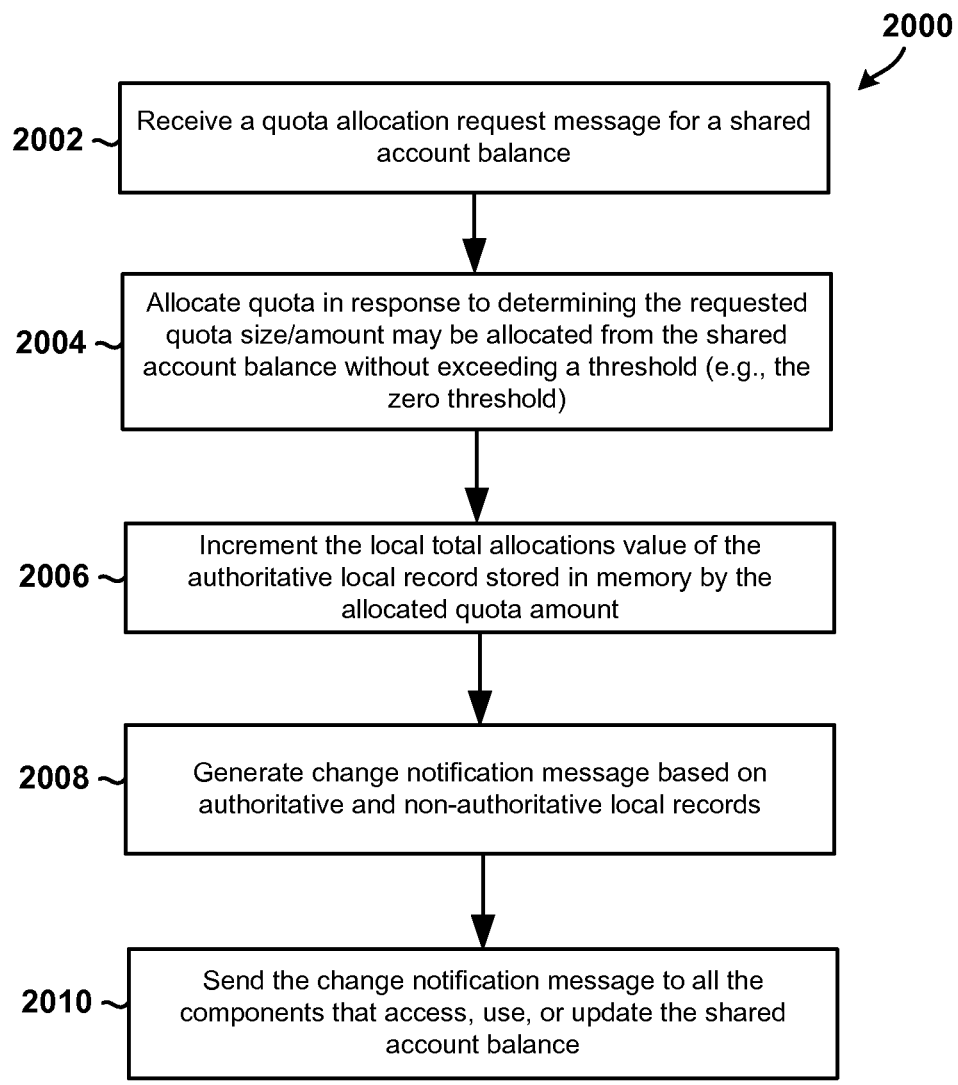
FIGS. 20A and 20B are process flow diagrams illustrating methods of allocating quota in accordance with various embodiments.

FIG. 20A illustrates an embodiment method 2000 of allocating quota in a multi-site balance management system. Method 2000 may be performed by one or more processors in a server computing device/system deployed in a telecommunication system, and which implements all or portions of a balance management component to reduce the probability of conflicts or discrepancies occurring between different instances of a single shared account balance. In block 2002, a processor in the server computing device may receive a quota allocation request message from a metering and gating component. In block 2004, the processor may allocate the quota, such as in response to determining that the default or requested quota size/amount may be allocated from the shared account balance without exceeding a threshold (e.g., the zero threshold, etc.). In block 2006, the processor may increment the local total allocations value of the authoritative local record stored in memory by the allocated quota amount. In block 2008, the processor may generate a change notification message based on the authoritative local record and other, non-authoritative, local records stored and maintained in the memory for that shared account balance. In block 2010, the processor may send the generated change notification message to all the components that access, use or update the shared account balance.

Figure 20B:
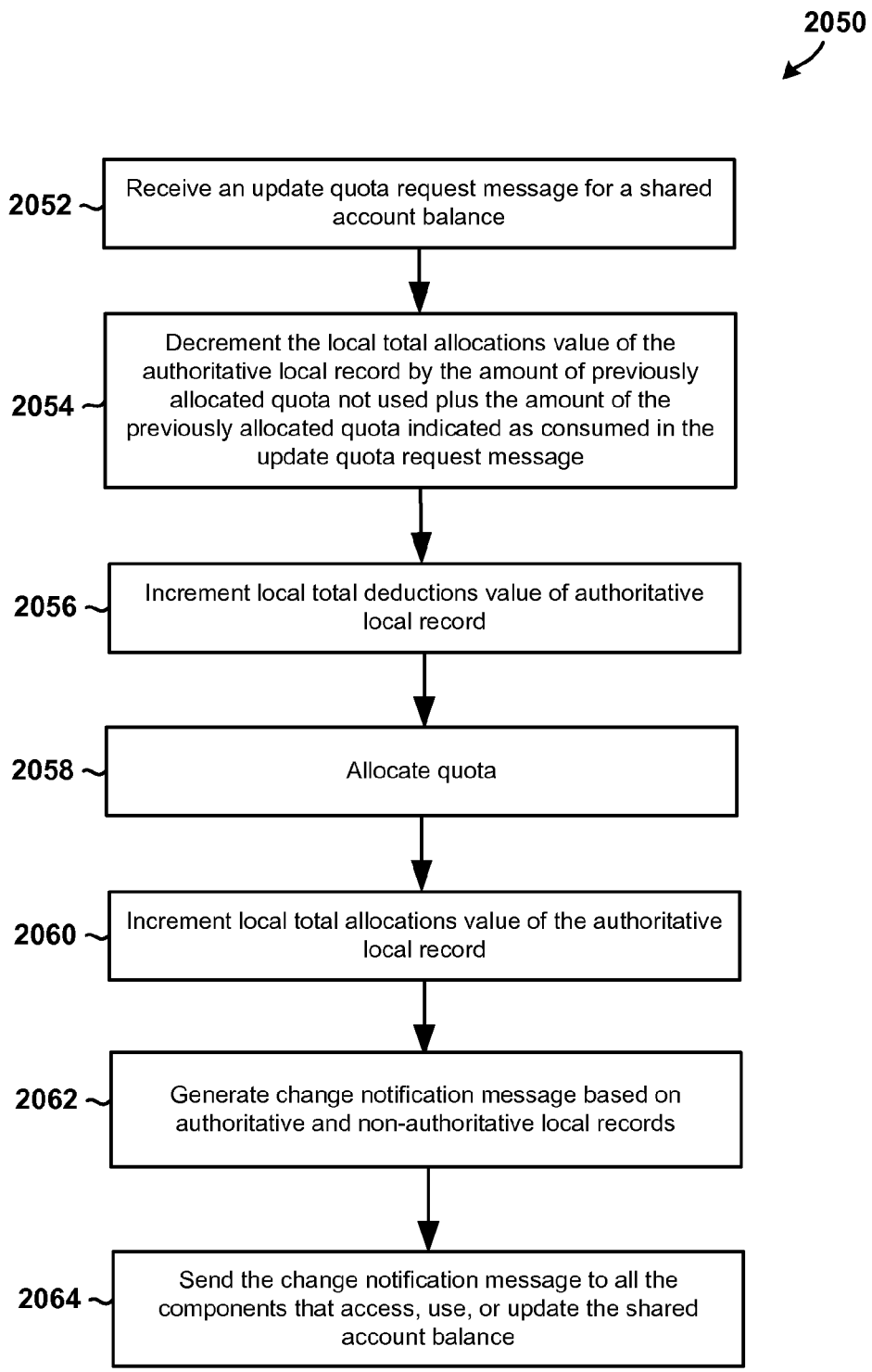

FIG. 20B illustrates another embodiment method 2050 of allocating quota in the multi-site balance management system. Method 2050 may be performed by one or more processors in a server computing device/system deployed in a telecommunication system, and which implements all or portions of a balance management component. In block 2052, a processor of the server computing device may receive an update quota request message that includes a request for the allocation of additional quota, information identifying the amount of the previously allocated quota that was consumed, and information identifying the amount of previously allocated quota that has not been used.

In block 2054, the processor may decrement the local total allocations value of the authoritative local record by the amount of previously allocated quota indicated as not used, plus the amount of the previously allocated quota indicated as consumed, in the update quota request message. In block 2056, the processor may increment the local total deduction value of the authoritative local record by the amount of the previously allocated quota indicated as consumed in the update quota request message. In block 2058, the processor may allocate quota (e.g., in response to determining that the default or requested quota size/amount may be allocated from the shared account balance without exceeding the threshold). In block 2060, the processor may increment the local total allocations value of the authoritative local record by the allocated quota size/amount. In block 2062, the processor may generate a change notification message based on the authoritative local record and other, non-authoritative, local records stored in the memory. In block 2064, the processor may send the generated change notification message to all the components that access, use or update the shared account balance.

Figure 21:
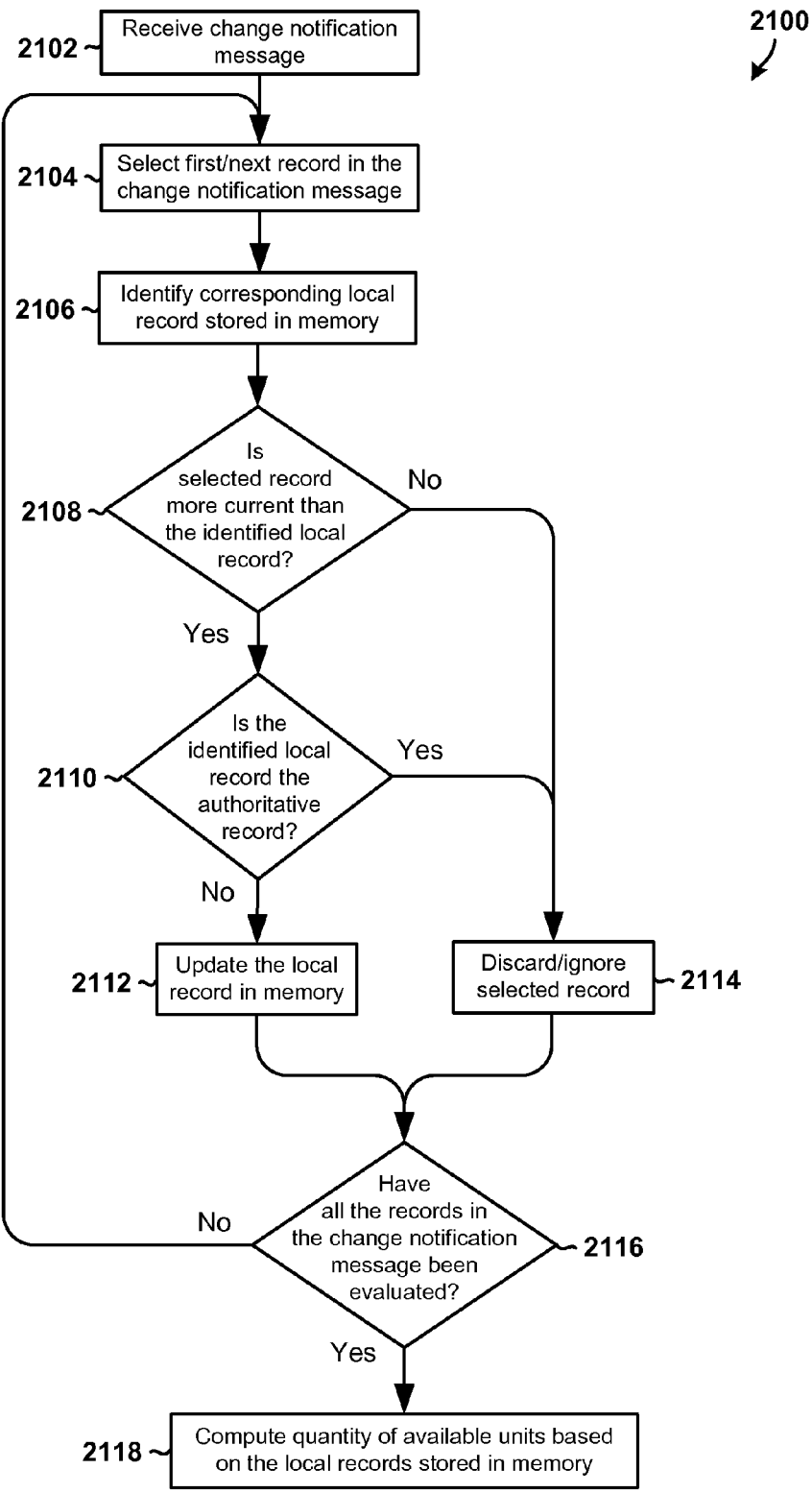
FIGS. 21 and 22 are process flow diagrams illustrating methods of using a change notification message to update a local instance of a shared balance account in accordance with various embodiments.

FIG. 21 illustrates an embodiment method 2100 of using a change notification message to update a local instance of a shared account balance to include changes to other instances of the shared balance account by other components in the multi-site balance management system. Method 2100 may be performed by one or more processors in a server computing device/system deployed in a telecommunication system, and which implements all or portions of a balance management component.

In block 2102, a processor of the server computing device may receive a change notification message from another component in the multi-site balance management system (e.g., a component that updated a different instance of the shared account balance). The change notification message may include multiple records. For example, the change notification message may include a record for each component in the multi-site balance management system that uses or updates a shared account balance. Each of these records may include a balance identifier, a component identifier, a change identifier, a total additions value, a total deductions value, a total allocations value, and an estimated time of exhaustion (EToE) value.

In block 2104, the processor may select the first record in the change notification message. In block 2106, the processor may identify a local record (stored in memory) that corresponds to the selected record. For example, the processor may identify a local record that includes the same balance and component identifiers as the selected record. In determination block 2108, the processor may determine whether the selected record is more current or up-to-date than the identified local record by determining whether the change identifier of the selected record is higher than the change identifier of the identified local record.

In response to determining that the selected record is more current than the identified local record (i.e., determination block 2108="Yes"), in determination block 2110, the processor may determine whether the identified local record is the authoritative record. In response to determining that the identified local record is not the authoritative record (i.e., determination block 2110="No"), in block 2112, the processor may update the values of identified local record based on the values included in the selected record. For example, the processor may replace the local record with the selected record. As a further example, the processor may overwrite the change identifier, total additions value, total deductions value, total allocations value, and EToE value of the local record with the change identifier, total additions value, total deductions value, total allocations value, and EToE value of the selected record.

In response to determining that the selected record is not more current than the identified local record (i.e., determination block 2108="No") or that the identified local record is the authoritative record (i.e., determination block 2110="Yes"), in block 2114, the processor may disregard, ignore or discard the selected record. In determination block 2116, the processor may determine whether all of the records included in the change notification message have been selected and evaluated.

In response to determining that all of the records in the change notification message have not been selected and evaluated (i.e., determination block 2116="No"), the processor may select the next record in block 2104 and repeat the operations discussed above. In response to determining that all of the records in the change notification message have been selected and evaluated (i.e., determination block 2116="Yes"), in block 2118, the processor may determine or compute the quantity of units that are available in the shared balance account based on the authoritative and non-authoritative local records stored in memory.

Figure 22:
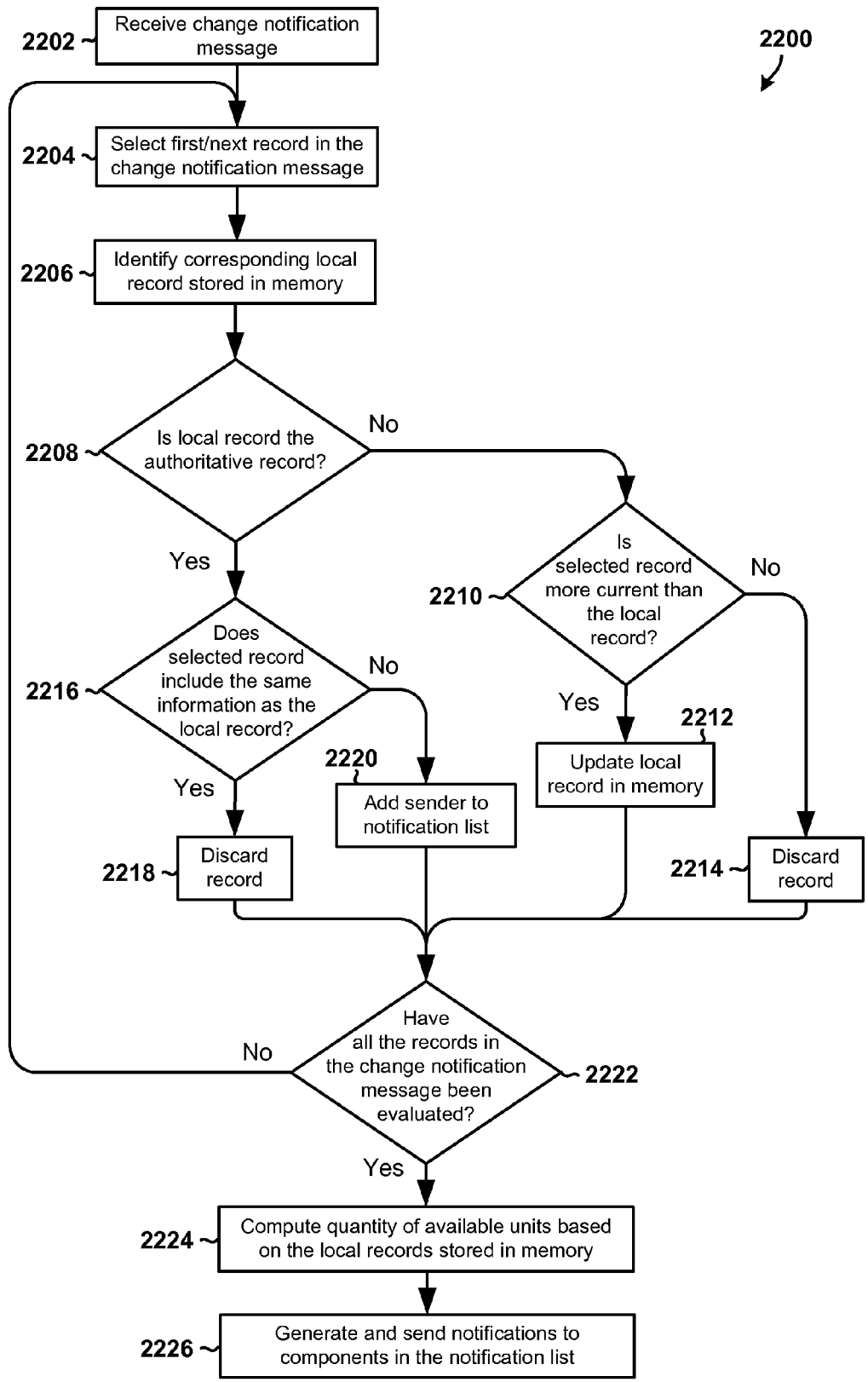

FIG. 22 illustrates another embodiment method 2200 of using a change notification message to update a local instance of a shared account balance to include changes made to other instances by other components in the multi-site balance management system. Method 2200 may be performed by one or more processors in a server computing device/system deployed in a telecommunication system, and which implements all or portions of a balance management component.

In block 2202, a processor of the server computing device may receive a change notification message from a component in the multi-site balance management system. In block 2204, the processor may select first record in the change notification message. In block 2206, the processor may identify a local record stored in memory that corresponds to the selected record. In determination block 2208, the processor may determine whether the identified local record is the authoritative record.

In response to determining that the identified local record is not the authoritative record (i.e., determination block 2208="No"), in determination block 2210, the processor may determine whether the selected record is more current or up-to-date than the identified local record. For example, the processor may determine whether the change identifier of the selected record is higher than the change identifier of the identified local record. In response to determining that the selected record is more current or up-to-date than the identified local record (i.e., determination block 2210="Yes"), in block 2212, the processor may update identified local record based on the selected record. In response to determining that the selected record is not more current or up-to-date than the identified local record (i.e., determination block 2210="No"), in block 2214, the processor may discard or ignore the selected record (i.e., for including outdated information).

In response to determining that the identified local record is the authoritative record (i.e., determination block 2208="Yes"), in determination block 2216, the processor may determine whether the selected record includes the same information as the local record. In an embodiment, this may be accomplished by determining whether the change identifier of the selected record is equal to the change identifier of the identified local record. In other embodiments, different or more detailed error checks could be performed. In response to determining that the selected record does not include the same information as the local record (i.e., determination block 2216="No"), the processor may add the sender of the message to a notification list in block 2220. In response to determining that the selected record includes the same information as the local record (i.e., determination block 2216="Yes"), the processor may ignore or discard the selected record in block 2218.

In determination block 2222, the processor may determine whether all of the records included in the change notification message have been selected and evaluated. In response to determining that all of the records in the change notification message have not yet been selected and evaluated (i.e., determination block 2222="No"), the processor may select the next record in block 2204 and repeat the operations discussed above. In response to determining that all of the records in the change notification message have been selected and evaluated (i.e., determination block 2222="Yes"), in block 2224, the processor may determine or compute the quantity of units that are available in the shared balance account based on the authoritative and non-authoritative local records stored in memory. In optional block 2226, the processor may generate and send notification messages (e.g., change notification messages) to the components in the notification list.

Figure 23:
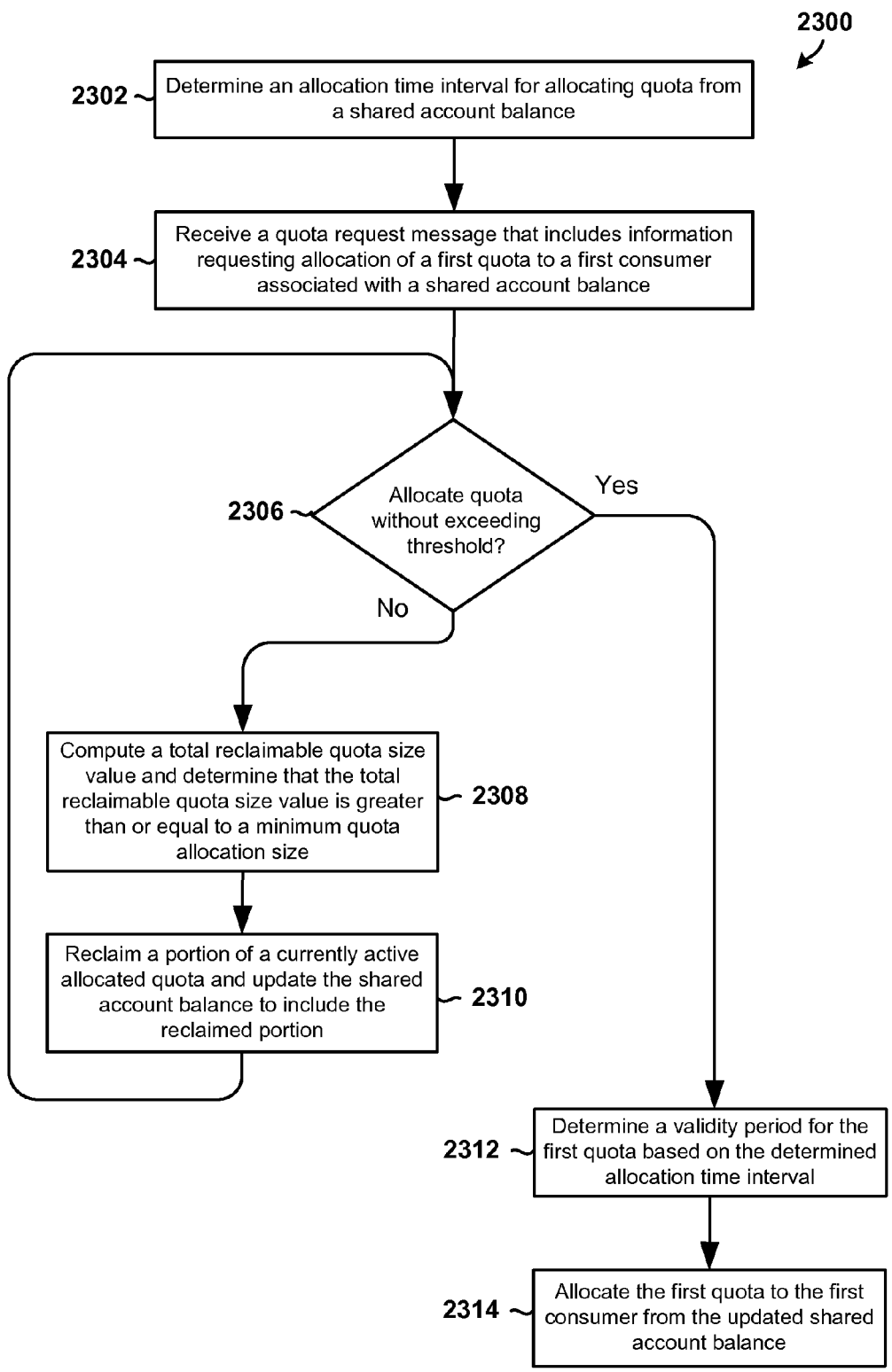
FIG. 23 is a process flow diagram illustrating a method of allocating quota in accordance with another embodiment.

FIG. 23 illustrates a method 2300 of allocating quotas in accordance with another embodiment. Method 2300 may be performed by one or more processors in a server computing device/system deployed in a telecommunication system. In block 2302, a processor of the server computing device may determine an allocation time interval for allocating quota from a shared account balance. In an embodiment, determining the allocation time interval for allocating quota from the shared account balance may include identifying one or more balance management components that use the shared account balance, determining a longest propagation latency time for communicating message between the identified balance management components, determining a window time interval in which the identified balance management components may allocate quota, and setting the allocation time interval based on the number of identified balance management components, longest propagation latency time, and window time interval.

In block 2304, the processor may receive a quota request message that includes information requesting allocation of a first quota to a first consumer associated with a shared account balance. In determination block 2306, the processor may determine whether the first quota may be allocated to the first consumer from the shared account balance without exceeding a threshold (e.g., a balance threshold, a quantity threshold, a zero threshold, etc.).

In response to determining that the first quota may not be allocated to the first consumer from the shared account balance without exceeding a threshold (i.e., determination block 2306="No"), in block 2308, the processor may compute a total reclaimable quota size value. Also in block 2308, the processor determines that the total reclaimable quota size value is greater than or equal to a minimum quota allocation size. In block 2310, the processor may reclaim a portion of a currently active allocated quota and update the shared account balance to include the reclaimed portion in response to determining that the total reclaimable quota size value is greater than or equal to the minimum quota allocation size. The processor may then determine whether the first quota may be allocated to the first consumer from the updated shared account balance without exceeding a threshold in determination block 2306.

In an embodiment, reclaiming the portion of the currently active allocated quota in block 2310 may include determining a priority value for each of a plurality of elements in an eligible quota list (one of the plurality of elements being the currently active allocated quota), sorting the eligible quota list based on the determined priority values, and traversing the sorted eligible quota list sequentially to select an element from the eligible quota list, reduce an allocated quota size of the selected element, and increment the shared account balance by reclaimed quota or by the size of the reduction of the allocated quota.

In response to determining that the first quota may be allocated to the first consumer from the shared account balance without exceeding the threshold (i.e., determination block 2306="Yes"), in block 2312, the processor may determine a validity period for the first quota based on the determined allocation time interval. In an embodiment, determining the validity period for the first quota based on the determined allocation time interval may include setting an expiration time value of the quota allocation so that the quota will expire within the allocation time interval. In an embodiment, determining the validity period for the first quota based on the determined allocation time interval may include setting an expiration time value of the quota allocation so that the quota will expire with sufficient time to allow a notification message to propagate to the identified balance management components.

In block 2314, the processor may allocate the first quota to the first consumer from the updated shared account balance. In an embodiment, allocating the first quota to the first consumer from the updated shared account balance may include incrementing a total allocations value of an authoritative local record stored in memory, generating a change notification message that includes values of the authoritative local record and values of at least one non-authoritative local record, and sending the change notification message to one or more balance management components that use the shared account balance.

Figure 24:
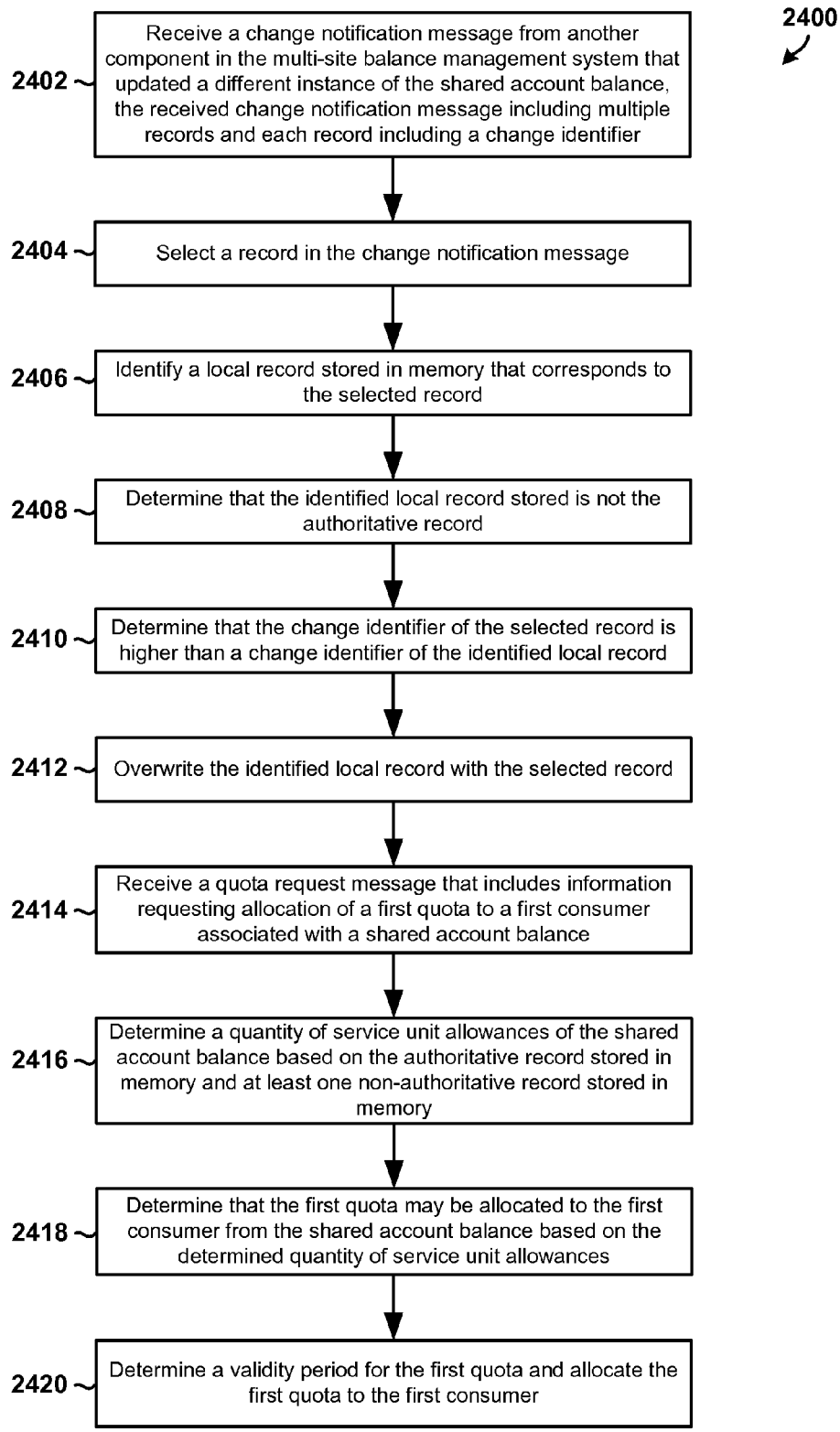
FIG. 24 is a process flow diagram illustrating a method of updating a local instance of a shared account balance in a multi-site balance management system and allocating quota from the updated shared account balance in accordance with another embodiment.

FIG. 24 illustrates a method 2400 of updating a local instance of a shared account balance in a multi-site balance management system and allocating quota from the updated shared account balance in accordance with an embodiment. Method 2400 may be performed by a processor in a server computing device deployed in a telecommunications network. In block 2402, the processor may receive a change notification message from another component in the multi-site balance management system that updated a different instance of the shared account balance, the received change notification message including multiple records and each record including a change identifier. In block 2404, the processor may select a record in the change notification message. In block 2406, the processor may identify a local record stored in memory that corresponds to the selected record. In block 2408, the processor may determine that the identified local record stored is not the authoritative record.

In block 2410, the processor may determine that the change identifier of the selected record is higher than a change identifier of the identified local record in response to determining that the identified local record stored is not the authoritative record. In block 2412, the processor may overwrite the identified local record with the selected record in response to determining that the change identifier of the selected record is higher than a change identifier of the identified local record.

In block 2414, the processor may receive a quota request message that includes information requesting allocation of a first quota to a first consumer associated with a shared account balance. In block 2416, the processor may determine a quantity of service unit allowances of the shared account balance based on the authoritative record stored in memory and at least one non-authoritative record stored in memory. In an embodiment, the processor may be configured to determine a quantity of service unit allowances of the shared account balance in block 2416 in response to receiving the quota request message in block 2414. In another embodiment, the processor may be configured to determine a quantity of service unit allowances in block 2416 independent of receiving the quota request message in block 2414.

In block 2418, the processor may determine that the first quota may be allocated to the first consumer from the shared account balance based on the determined quantity of service unit allowances (i.e., the quantity of service unit allowances determined in block 2416). In block 2420, the processor may determine a validity period for the first quota and allocate the first quota to the first consumer.

Figure 25:
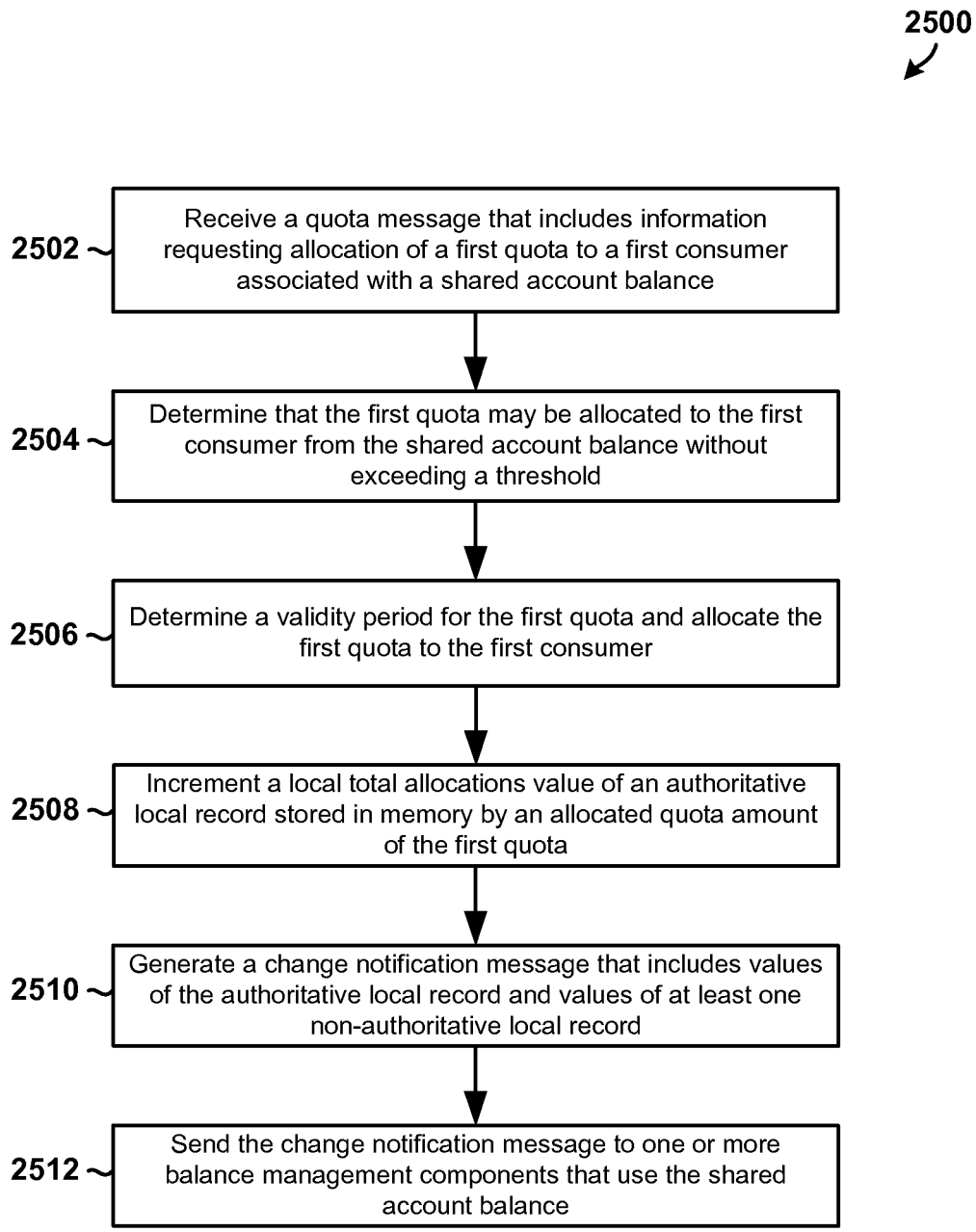
FIG. 25 is a process flow diagram illustrating a method of allocating quota in accordance with another embodiment.

FIG. 25 illustrates a method 2500 of allocating quotas in accordance with yet another embodiment. Method 2500 may be performed by a processor in a server computing device deployed in a telecommunications network. In block 2502, the processor may receive a quota message that includes information requesting allocation of a first quota to a first consumer associated with a shared account balance. In block 2504, the processor may determine that the first quota may be allocated to the first consumer from the shared account balance without exceeding a threshold. In block 2506, the processor may determine a validity period for the first quota and allocate the first quota to the first consumer. In block 2508, the processor may increment a local total allocations value of an authoritative local record stored in memory by an allocated quota amount of the first quota. In block 2510, the processor may generate a change notification message that includes values of the authoritative local record and values of at least one non-authoritative local record. In block 2512, the processor may send the change notification message to one or more balance management components that use the shared account balance.

Further embodiments include methods, and server computing devices configured with processor executable instructions to implement the methods, of allocating quota by receiving a quota message from a metering and gating component (the quota message including information requesting allocation of a first quota to a first consumer associated with a shared account balance), determining whether the first quota may be allocated to the first consumer from the shared account balance without exceeding a threshold, allocating the first quota to the first consumer from the updated shared account balance in response to determining that the first quota may be allocated to the first consumer from the shared account balance without exceeding the threshold, incrementing a local total allocations value of an authoritative local record stored in memory by an allocated quota amount of the first quota, generating a change notification message that includes values of the authoritative local record and values of at least one non-authoritative local record, and sending the change notification message to one or more balance management components that use the shared account balance. In an embodiment, receiving the quota message from the metering and gating component may include receiving an update quota request message, and the method may include decrementing a local total allocations value of the authoritative local record stored in memory by the amount of previously allocated quota identified as not used, plus the amount of the previously allocated quota identified as used, in the received update quota request message, and incrementing a local total deductions value of the authoritative local record stored in memory by the amount of the previously allocated quota identified as used in the received update quota request message.

Further embodiments include methods, and server computing devices configured with processor executable instructions to implement the methods, of updating a local instance of a shared account balance in a multi-site balance management system by receiving a change notification message from another component in the multi-site balance management system that updated a different instance of the shared account balance (the received change notification message including multiple records, each record including a change identifier), selecting a record in the change notification message, identifying a local record stored in memory that corresponds to the selected record, determining whether the identified local record stored is an authoritative record, determining whether the change identifier of the selected record is higher than a change identifier of the identified local record in response to determining that the identified local record stored is not the authoritative record, and overwriting the identified local record with the selected record in response to determining that the change identifier of the selected record is higher than the change identifier of the identified local record. In an embodiment, the method may include determining a quantity of service unit allowances of the shared account balance based on the authoritative record stored in memory and at least one non-authoritative record stored in memory.

Further embodiments may include a non-transitory processor-readable storage medium having stored thereon processor-executable instructions configured to cause a processor to perform various operations corresponding to the method operations discussed above.

Further embodiments include a computing device that may include various means for performing functions corresponding to the method operations discussed above.

While various embodiments are described above within the context of telecommunication network, the methods and systems described in this application may be used in many other systems. For example, the embodiments described in the application may be implemented and used as part of a commodity tracking solution. For instances, a chain of retail shops may be operated on a franchise basis so that each shop is operated independently in terms of ordering and selling its inventory or stock. However, individual shops are often able to obtain a system-wide view of their inventories. This may enable them to serve customers that request items that are not stocked locally and/or customers who wish to place large orders. In this example, a single shop is analogous to a balance management component and a single stock item is analogous to a single subscriber's account balance. The shops can increment and decrement their local stock/inventory as required (e.g., by updating total additions 1658 and total deductions 1660 values), and the total available stock could be determined at any time by any of the franchise based on this information. That is, by exchanging the cumulatitive purchase quantities and sales quantities, any shop can calculate the total stock of any item in the chain.

As another example, the embodiments described in the application may be implemented and used as part of a transportation system. For example, bus or trucking companies get updates on odometer and trip meter readings from the vehicles in their fleet. The balance management component could use the total additions 1658 and total deductions 1660 values to track and monitor the trip information.

Figure 26:
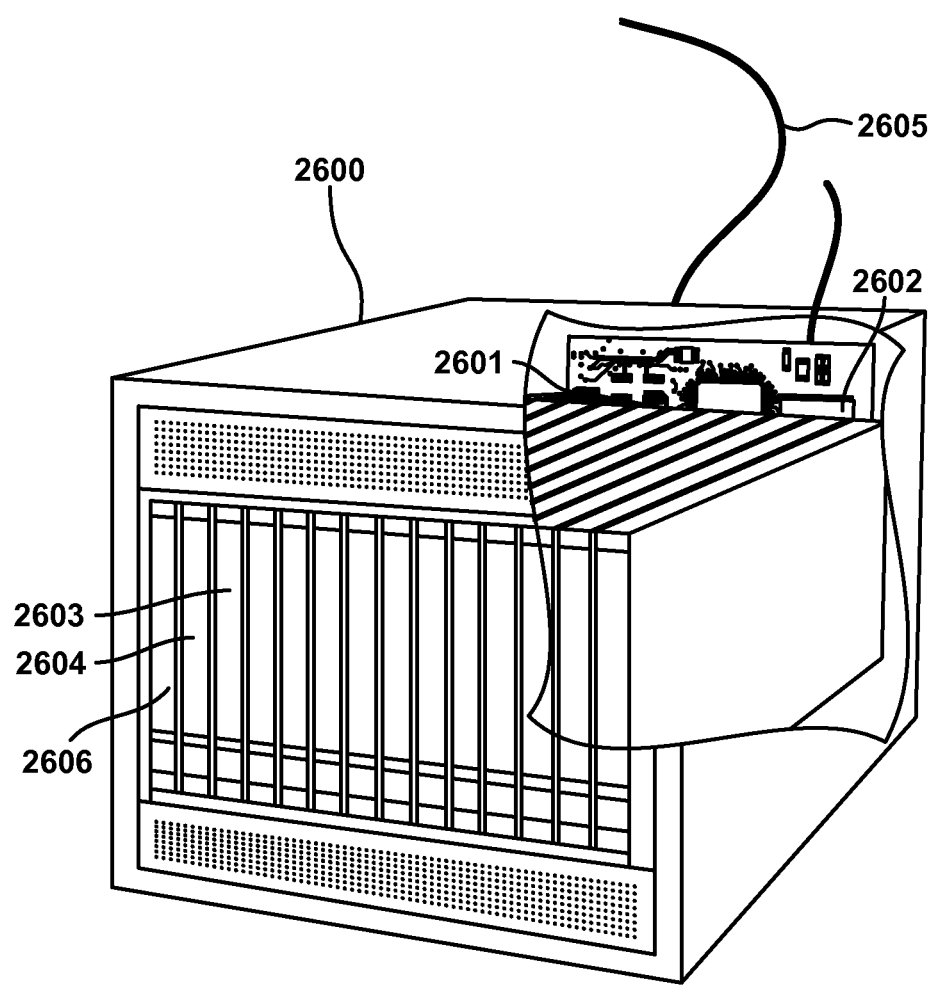
FIG. 26 is a component block diagram of server computing device suitable for implementing various embodiments.

The various embodiments may be implemented on any of a variety of commercially available server devices, such as the server 2600 illustrated in FIG. 26. Such a server 2600 typically includes a processor 2601 coupled to volatile memory 2602 and a large capacity nonvolatile memory, such as a disk drive 2603. The server 2600 may also include a floppy disc drive, compact disc (CD) or DVD disc drive 2604 coupled to the processor 2601. The server 2600 may also include network access ports 2606 coupled to the processor 2601 for establishing data connections with a network 2605, such as a local area network coupled to other operator network computers and servers.

The processor 2601 may be any programmable microprocessor, microcomputer or multiple processor chip or chips that can be configured by software instructions (applications) to perform a variety of functions, including the functions of the various embodiments described below. Multiple processors 2601 may be provided, such as one processor dedicated to wireless communication functions and one processor dedicated to running other applications. Typically, software applications may be stored in the internal memory 2602, 2603 before they are accessed and loaded into the processor 2601. The processor 2601 may include internal memory sufficient to store the application software instructions.

As used in this application, the terms "component," "module," "system," "engine," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of allocating quotas to consumers in a shared services group by a telecommunications server device that is deployed in a telecommunications network in which multiple components update or use a distributed datastore associated with the shared services group, the method comprising:
    determining, via a processor of the telecommunications server device, a first time value, the first time value identifying a time sufficient to allow notification messages to propagate through the telecommunications network to at least one of the multiple components that update or use the distributed datastore;
    determining, via the processor, a second time value based on the first time value, the second time value identifying an allocation time interval for allocating quota from the distributed datastore;
    receiving, via the processor, a quota request message from a metering and gating component, the received quota request message including information requesting allocation of a first quota to a first consumer in the shared services group that is associated with the distributed datastore;
    determining a third time value based on the second time value, the third time value identifying a validity period for the requested first quota; and
    allocating the requested first quota to the first consumer from the distributed datastore, the allocation including:
        updating the distributed datastore based on the second time value;
        generating a quota allocation response message that includes the third time value; and
        sending the generated quota allocation response message to the metering and gating component.

2. The method of claim 1, further comprising setting an expiration time value of the first quota so that the first quota will expire within the allocation time interval.

3. The method of claim 1, wherein determining the second time value based on the first time value comprises:
    identifying one or more balance management components that use the distributed datastore;
    determining a fourth time value that identifies a longest propagation latency time for communicating message between the identified balance management components;
    determining a fifth time value that identifies a window time interval in which the identified balance management components may allocate the quota; and
    setting the second time value based on:
        a number of identified balance management components,
        the determined fourth time value, and
        the determined fifth time value.

4. The method of claim 3, further comprising setting an expiration time value of the first quota so that the quota will expire with sufficient time to allow a notification message to propagate to the identified balance management components.

5. The method of claim 1, wherein allocating the first quota to the first consumer from the distributed datastore comprises:

incrementing a total allocations value of an authoritative local record stored in memory;
generating a change notification message that includes:
two or more values of the authoritative local record; and
values of at least one non-authoritative local record; and
sending the change notification message to one or more components that use the distributed datastore.

6. The method of claim 1, further comprising:
determining whether the first quota may be allocated to the first consumer from the distributed datastore without exceeding a threshold,
wherein allocating the requested first quota to the first consumer from the distributed datastore comprises allocating the requested first quota in response to determining that the first quota may be allocated to the first consumer from the distributed datastore without exceeding the threshold.

7. The method of claim 6, further comprising:
computing a total reclaimable quota size value and determining whether the total reclaimable quota size value is greater than or equal to a minimum quota allocation size in response to determining that the first quota may not be allocated to the first consumer from the distributed datastore without exceeding the threshold; and
reclaiming a portion of a currently active allocated quota and updating the distributed datastore to include the reclaimed portion in response to determining that the total reclaimable quota size value is greater than or equal to the minimum quota allocation size.

8. The method of claim 7, wherein reclaiming the portion of the currently active allocated quota and updating the distributed datastore to include the reclaimed portion comprises:
determining a priority value for each of a plurality of elements in an eligible quota list, wherein one of the plurality of elements is the currently active allocated quota;
sorting the eligible quota list based on the determined priority values; and
traversing the sorted eligible quota list sequentially to:
select an element from the eligible quota list;
reduce an allocated quota size of the selected element by a quota reduction amount; and
increment the distributed datastore by the quota reduction amount.

9. A telecommunications server device deployed in a telecommunications network in which multiple components update or use a distributed datastore associated with a shared services group, comprising:
a processor configured with processor-executable instructions to perform operations comprising:
determining a first time value, the first time value identifying a time sufficient to allow notification messages to propagate through the telecommunications network to at least one of the multiple components that update or use the distributed datastore;
determining a second time value based on the first time value, the second time value identifying an allocation time interval for allocating quota from the distributed datastore;
receiving a quota request message from a metering and gating component, the received quota request message including information requesting allocation of a first quota to a first consumer in the shared services group that is associated with the distributed datastore;
determining a third time value based on the second time value, the third time value identifying a validity period for the requested first quota; and
allocating the requested first quota to the first consumer from the distributed datastore, the allocation including:
updating the distributed datastore based on the second time value;
generating a quota allocation response message that includes the third time value; and
sending the generated quota allocation response message to the metering and gating component.

10. The telecommunications server device of claim 9, wherein the processor is configured with processor-executable instructions to perform operations further comprising setting an expiration time value of the first quota so that the first quota will expire within the allocation time interval.

11. The telecommunications server device of claim 9, wherein the processor is configured with processor-executable instructions to perform operations such that determining the second time value based on the first time value comprises:
identifying one or more balance management components that use the distributed datastore;
determining a fourth time value that identifies a longest propagation latency time for communicating message between the identified balance management components;
determining a fifth time value that identifies a window time interval in which the identified balance management components may allocate the quota; and
setting the second time value based on:
a number of identified balance management components,
the determined fourth time value, and
the determined fifth time value.

12. The telecommunications server device of claim 11, wherein the processor is configured with processor-executable instructions to perform operations further comprising setting an expiration time value of the first quota so that the first quota will expire with sufficient time to allow a notification message to propagate to the identified balance management components.

13. The telecommunications server device of claim 9, wherein the processor is configured with processor-executable instructions to perform operations such that allocating the first quota to the first consumer from the distributed datastore comprises:
incrementing a total allocations value of an authoritative local record stored in memory;
generating a change notification message that includes:
two or more values of the authoritative local record; and
values of at least one non-authoritative local record; and
sending the change notification message to one or more components that use the distributed datastore.

14. The telecommunications server device of claim 9, wherein:
the processor is configured with processor-executable instructions to perform operations further comprising determining whether the first quota may be allocated to the first consumer from the distributed datastore without exceeding a threshold; and the processor is configured with processor-executable instructions to perform operations such that allocating the first quota to the first consumer from the distributed Ghared datastore comprises allocating the requested first quota in response to determining that the first quota may be allocated to the first consumer from the distributed datastore without exceeding the threshold.

15. The telecommunications server device of claim 14, wherein the processor is configured with processor-executable instructions to perform operations further comprising:
computing a total reclaimable quota size value and determining whether the total reclaimable quota size value is greater than or equal to a minimum quota allocation size in response to determining that the first quota may not be allocated to the first consumer from the distributed datastore without exceeding the threshold;
reclaiming a portion of a currently active allocated quota and updating the distributed datastore to include the reclaimed portion in response to determining that the total reclaimable quota size value is greater than or equal to the minimum quota allocation size.

16. The telecommunications server device of claim 15, wherein the processor is configured with processor-executable instructions to perform operations such that reclaiming the portion of the currently active allocated quota and updating the distributed datastore to include the reclaimed portion comprises:
determining a priority value for each of a plurality of elements in an eligible quota list, wherein one of the plurality of elements is the currently active allocated quota;
sorting the eligible quota list based on the determined priority values; and
traversing the sorted eligible quota list sequentially to:
select an element from the eligible quota list;
reduce an allocated quota size of the selected element by a quota reduction amount; and
increment the distributed datastore by the quota reduction amount.

17. A non-transitory computer readable storage medium having stored thereon processor-executable software instructions configured to cause a processor to perform operations for allocating quotas by a telecommunications server device deployed in a telecommunications network in which multiple components update or use a distributed datastore associated with a shared services group, the operations comprising:
determining a first time value, the first time value identifying a time sufficient to allow notification messages to propagate through the telecommunications network to at least one of the multiple components that update or use the distributed datastore;
determining a second time value based on the first time value, the second time value identifying an allocation time interval for allocating quota from the distributed datastore;
receiving in the processor a quota request message from a metering and gating component, the received quota request message including information requesting allocation of a first quota to a first consumer in the shared services group that is associated with the distributed datastore;
determining a third time value based on the second time value, the third time value identifying a validity period for the requested first quota; and
allocating the requested first quota to the first consumer from the distributed datastore, the allocation including:
updating the distributed datastore based on the second time value;
generating a quota allocation response message that includes the third time value; and
sending the generated quota allocation response message to the metering and gating component.

18. The non-transitory computer readable storage medium of claim 17, wherein the stored processor-executable software instructions are configured to cause a processor to perform operations further comprising setting an expiration time value of the first quota so that the first quota will expire within the allocation time interval.

19. The non-transitory computer readable storage medium of claim 17, wherein the stored processor-executable software instructions are configured to cause a processor to perform operations such that determining the second time value based on the first time value comprises:
identifying one or more balance management components that use the distributed datastore;
determining a fourth time value that identifies a longest propagation latency time for communicating message between the identified balance management components;
determining a fifth time value that identifies a window time interval in which the identified balance management components may allocate the quota; and
setting the allocation time interval based on:
a number of identified balance management components,
the determined fourth time value, and
the determined fifth time value.

20. The non-transitory computer readable storage medium of claim 19, wherein the stored processor-executable software instructions are configured to cause a processor to perform operations further comprising setting an expiration time value of the first quota so that the first quota will expire with sufficient time to allow a notification message to propagate to the identified balance management components.

21. The method of claim 1, wherein generating the quota allocation response message comprises generating the quota allocation response message to include:
the determined validity period, and
an allocated quota size value that identifies an amount of service unit allowances that are available for use by the first consumer when consuming one or more telecommunications services provided by the telecommunications network.

22. The method of claim 1, wherein sending the generated quota allocation response message to the metering and gating component comprises:
sending the generated quota allocation response message to the metering and gating component so as to reduce the probability of negative balances or discrepancies occurring between different instances of the distributed datastore.

* * * * *